June 29, 1965 J. R. STEWART 3,192,365

HIGH SPEED BINARY DIVIDER

Filed June 13, 1961 39 Sheets-Sheet 1

INVENTOR
JOSEPH R. STEWART

BY *Thomas & Crickenberger*

ATTORNEYS

June 29, 1965 J. R. STEWART 3,192,365

HIGH SPEED BINARY DIVIDER

Filed June 13, 1961 39 Sheets-Sheet 3

June 29, 1965 J. R. STEWART 3,192,365

HIGH SPEED BINARY DIVIDER

Filed June 13, 1961 39 Sheets-Sheet 5

June 29, 1965 J. R. STEWART 3,192,365

HIGH SPEED BINARY DIVIDER

Filed June 13, 1961 39 Sheets-Sheet 8

HIGH SPEED BINARY DIVIDER

Filed June 13, 1961

June 29, 1965 J. R. STEWART 3,192,365

HIGH SPEED BINARY DIVIDER

Filed June 13, 1961 39 Sheets-Sheet 10

HIGH SPEED BINARY DIVIDER

Filed June 13, 1961 39 Sheets-Sheet 14

June 29, 1965 J. R. STEWART 3,192,365

HIGH SPEED BINARY DIVIDER

Filed June 13, 1961 39 Sheets-Sheet 17

HIGH SPEED BINARY DIVIDER

June 29, 1965 J. R. STEWART 3,192,365

HIGH SPEED BINARY DIVIDER

Filed June 13, 1961 39 Sheets-Sheet 20

June 29, 1965 J. R. STEWART 3,192,365

HIGH SPEED BINARY DIVIDER

Filed June 13, 1961 39 Sheets-Sheet 24

June 29, 1965 J. R. STEWART 3,192,365

HIGH SPEED BINARY DIVIDER

Filed June 13, 1961 39 Sheets-Sheet 27

June 29, 1965 J. R. STEWART 3,192,365

HIGH SPEED BINARY DIVIDER

Filed June 13, 1961 39 Sheets-Sheet 29

June 29, 1965 J. R. STEWART 3,192,365

HIGH SPEED BINARY DIVIDER

Filed June 13, 1961 39 Sheets-Sheet 34

HIGH SPEED BINARY DIVIDER

HIGH SPEED BINARY DIVIDER

Filed June 13, 1961 39 Sheets-Sheet 36

June 29, 1965 J. R. STEWART 3,192,365

HIGH SPEED BINARY DIVIDER

Filed June 13, 1961 39 Sheets-Sheet 37

June 29, 1965 J. R. STEWART 3,192,365

HIGH SPEED BINARY DIVIDER

Filed June 13, 1961 39 Sheets-Sheet 38

3,192,365

HIGH SPEED BINARY DIVIDER

Joseph R. Stewart, Lexington, Ky., assignor to International Business Machines Corporation, New York, N.Y., a corporation of New York Filed June 13, 1961, Ser. No. 125,323
6 Claims. (Cl. 235—164)

This invention relates to an arithmetic device and more particularly to a high speed binary divider.

There are several methods of varying complexity and speed by which division may be performed in a data processing device. The time required to perform a division is proportional to the number of additions required to complete the division. The term "addition" is used to include both addition and subtraction. In some dividers the divisor is complemented and repeatedly added to successive portions of the dividend until the division is complete. The successive additions of the complemented divisor are continued until the dividend becomes negative, which may be termed overdrawings. The overdrawing may be compensated for by adding the divisor back into the dividend and subtracting one from the quotient. The number of additions required to perform the division is related to the number of bits in the dividend and the divisor.

The speed of the divide operation is increased by the divider of the present invention. The number of additions required to perform a division is dependent upon the bit distribution of the dividend. Following an addition cycle, the dividend is shifted and the next addition cycle is begun. These addition and shifting operations are continued until the division is complete. However, the length of the shift is not fixed but it is variable to allow successive like dividend bits to be shifted across during a shift operation. Hence, the length of the shift following an addition cycle is dependent upon this bit distribution and, therefore, the speed of the division process is increased.

According to a feature of the present invention, the true or the complement form of the divisor may be utilized as such or altered before being added to the dividend in order to increase the number of bits to be shifted across. This is accomplished by performing the addition with the true or the complement value of a multiple (including one times) of the divisor.

In an illustrative embodiment of the present invention a divider is provided which includes a means to store the dividend, a means to store the divisor, and adders for adding a multiple of the divisor to successive portions of the dividend. A decoding arrangement is employed to control the length of shifts, and to select the particular multiple of the divisor that will result in the greatest shift in the following add cycle. The multiples of the divisor that are utilized are three-fourths, one, and three-halves. A quotient generator generates the quotient bits as the division progresses.

The divider of the present invention includes a dividend-quotient register which stores the dividend and the quotient bits as they are generated. A divisor register is provided which stores the true value of the one times divisor. Means are connected with the divisor register to make available to the adders the true or the complement value of the one times divisor, the three-fourths times divisor or the three-halves times divisor. A shifting arrangement is provided for shifting the dividend and the quotient along the dividend-quotient register, and for providing a particular portion of the dividend to the adders, which portion is determined by the length of the shift made. A circuit is provided for storing the total number of shifts to be made during a divide operation. A decoder senses the output of the adders and determines the number of shifts to be made. A quotient generator senses certain conditions during a cycle and generates a particular group of quotient bits. In certain instances, some of the quotient bits are generated to agree with the bits being shifted across. The quotient bits are entered into the dividend-quotient register as the division progresses. An arrangement is provided for selecting the desired multiple, and its selection is determined by which multiple will provide the greatest shift during the next cycle.

The foregoing and other objects, features and advantages of the invention will be apparent from the following more particular description of a preferred embodiment of the invention, as illustrated in the accompanying drawings.

FIGS. 1 through 3, when mechanically arranged as illustrated in FIG. *4a*, show in block form a divider constructed in accordance with the principles of this invention;

Figure 1:
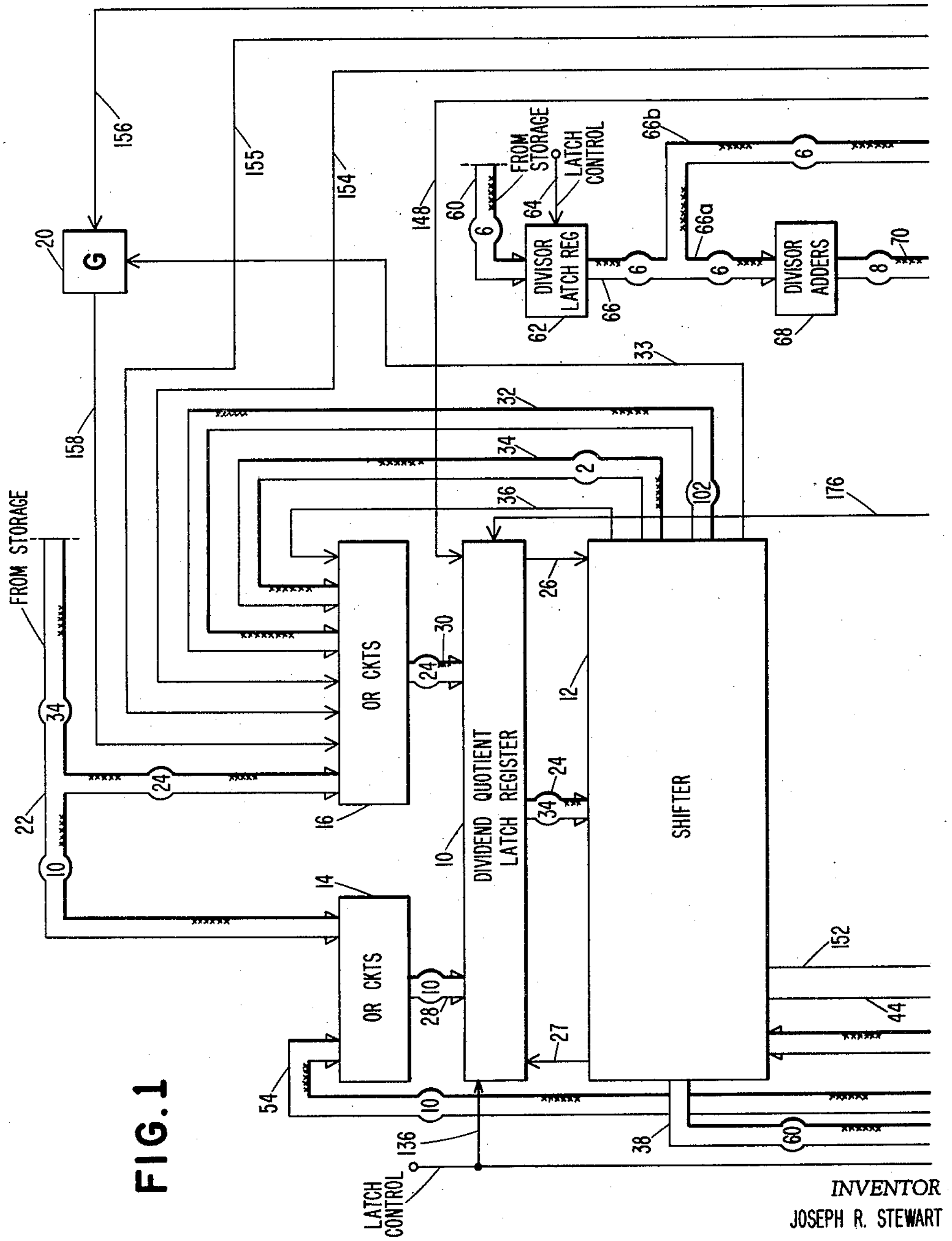
Figure 2:
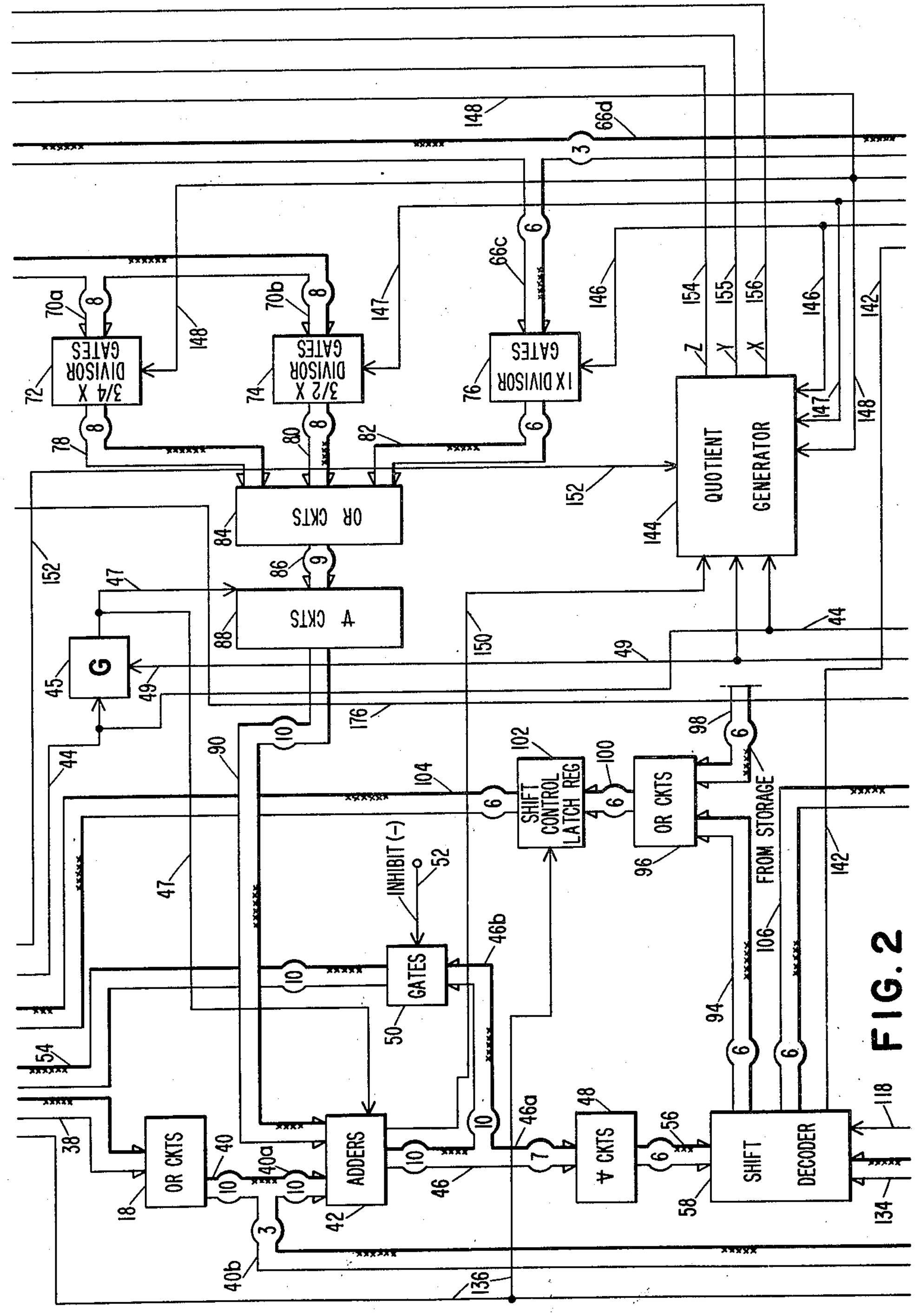
Figure 3:
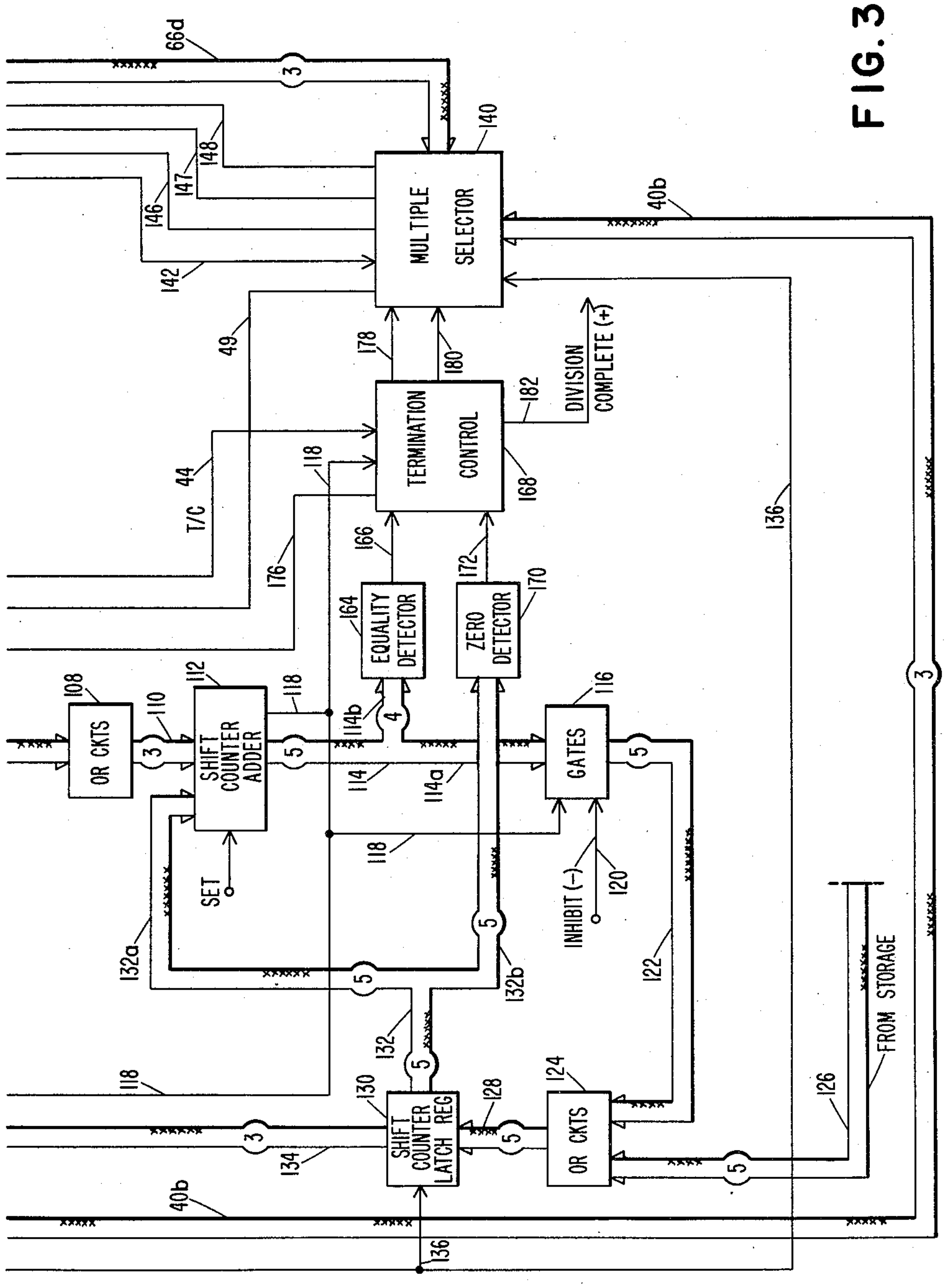
Figure 37:
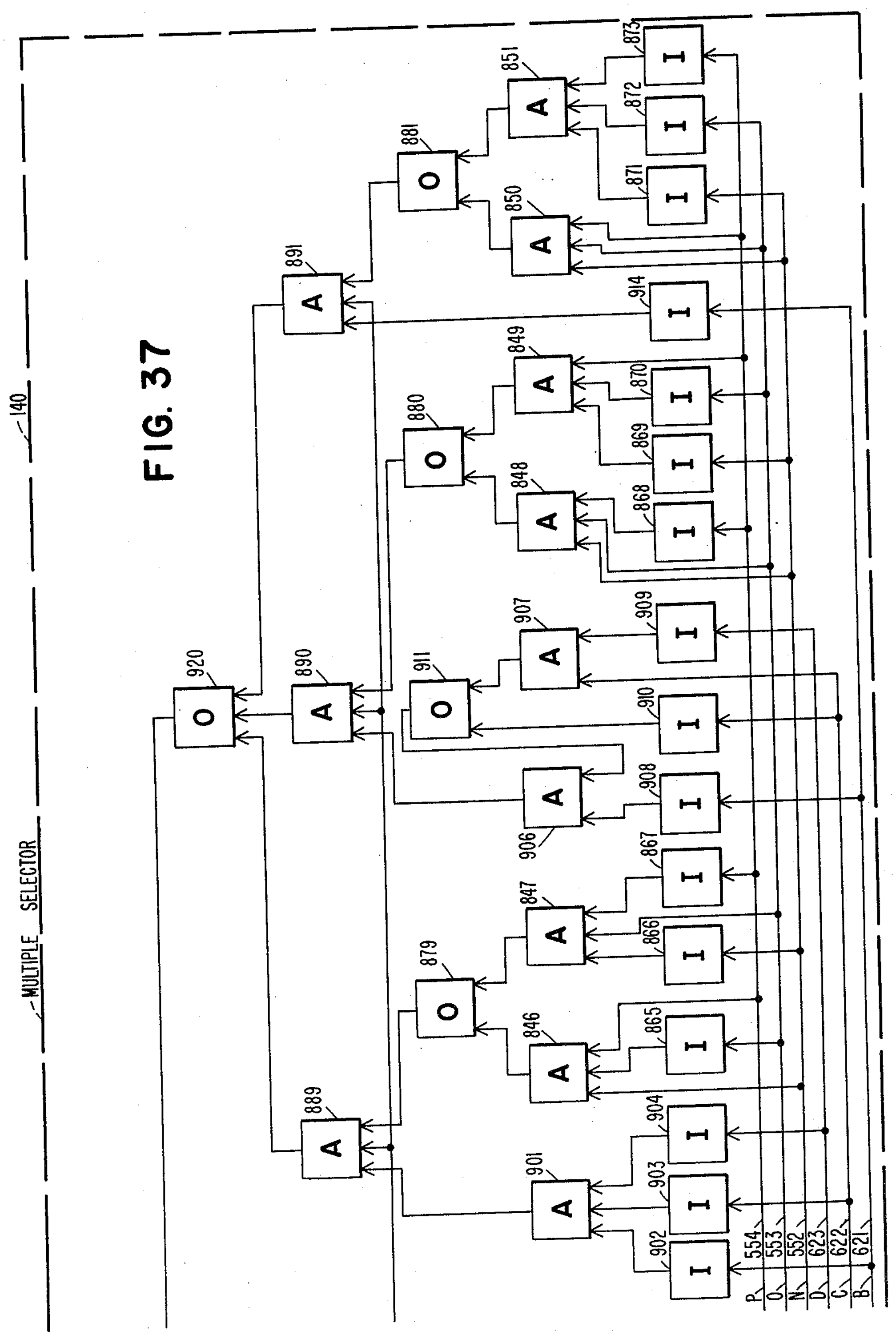
Figure 38A:
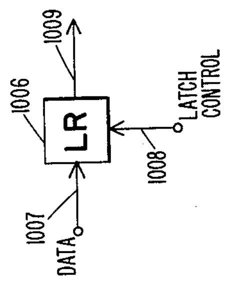
Figure 38B:
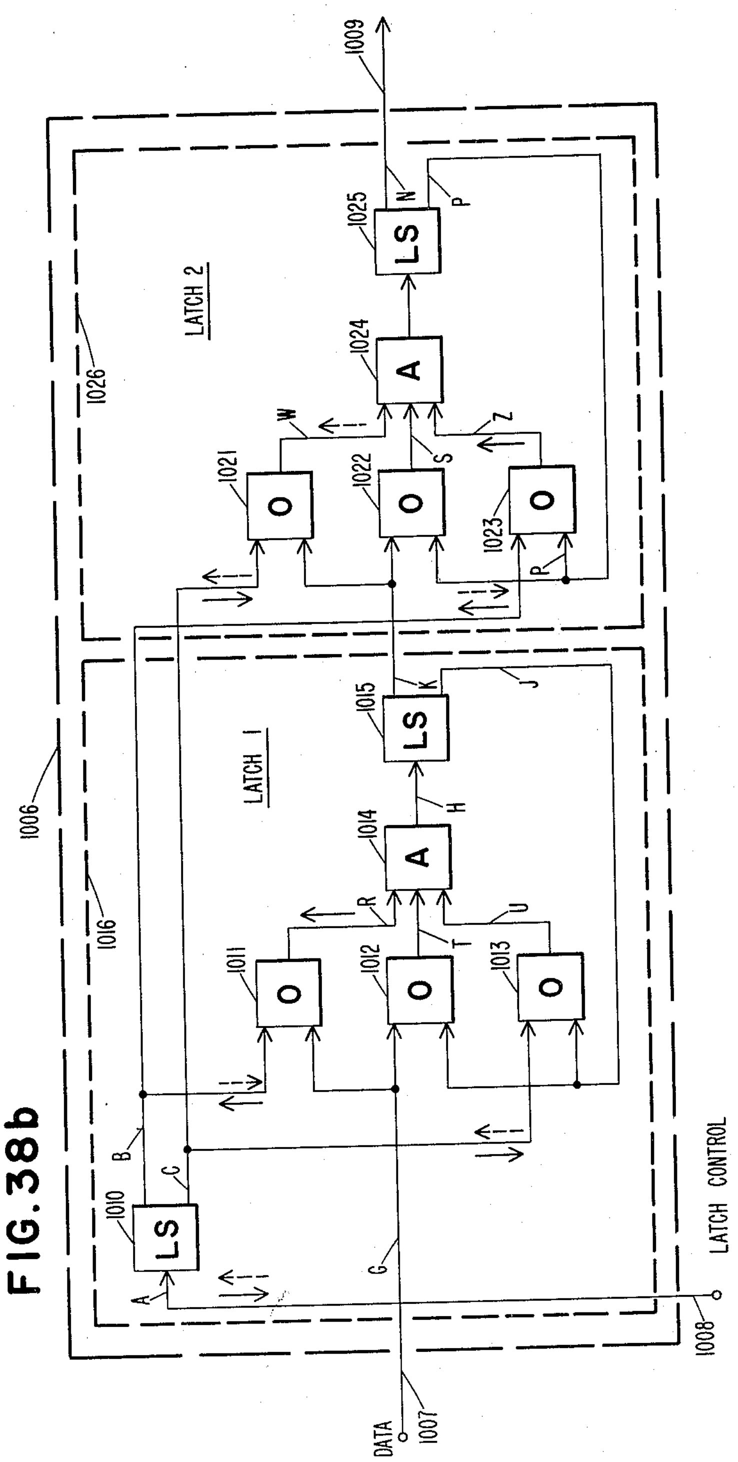
Figure 41:
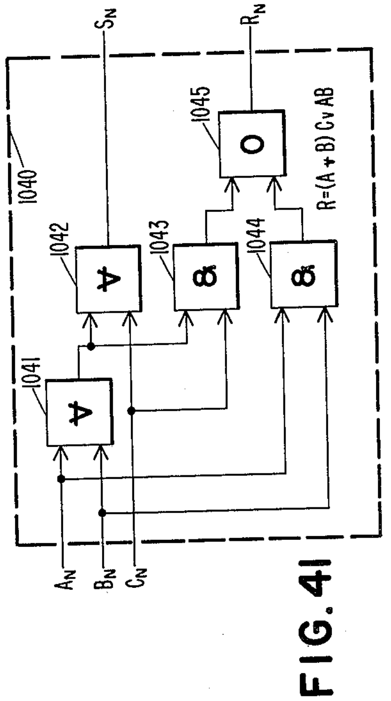
Figure 40:
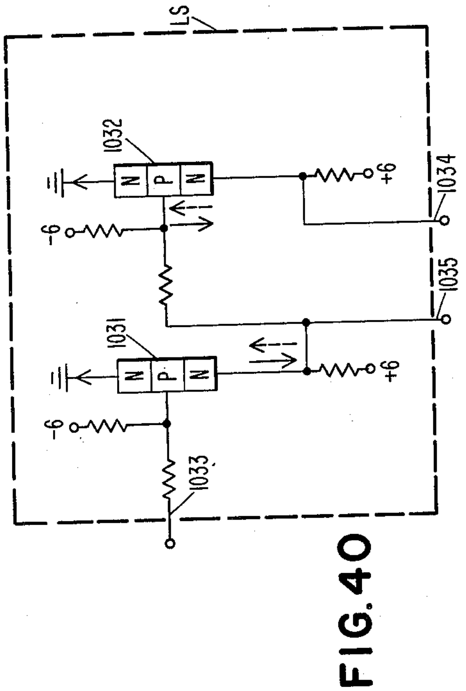
Figure 39:
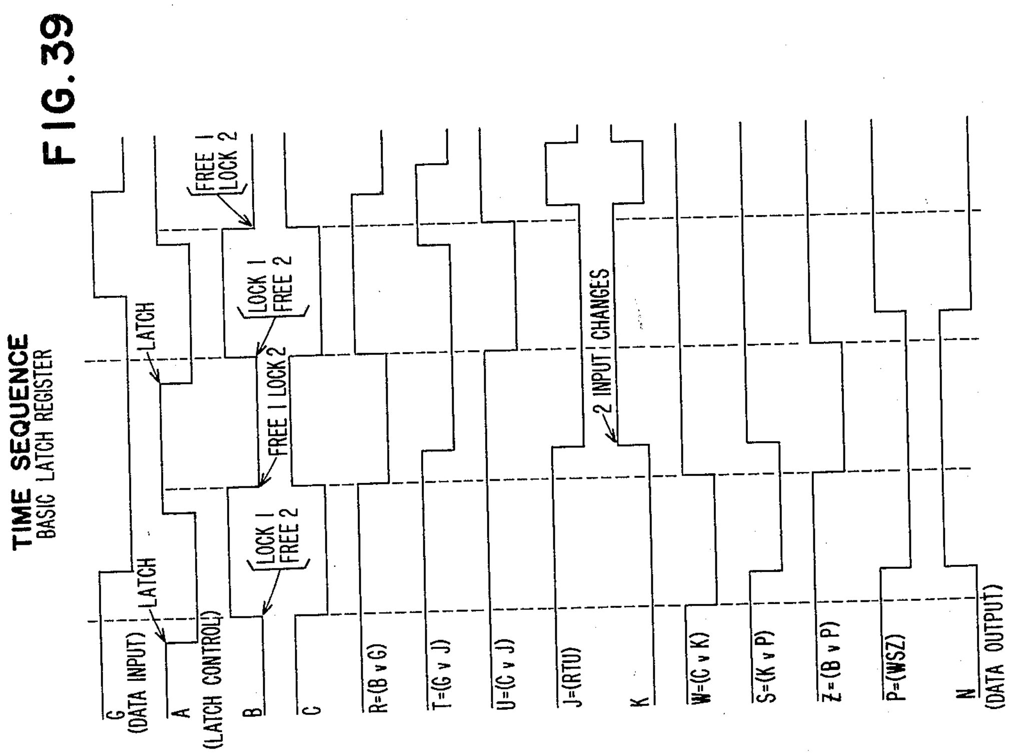

FIGS. 12 through 37, when arranged as shown in FIG. *4b*, illustrate in detail the divider shown in block form in FIGS. 1 through 3;

FIG. 38*a* is a block diagram of an individual latch register employed throughout the FIGS. 12 through 37;

FIG. 38*b* is a detail logical block diagram of the latch register in FIG. 38*a*;

FIG. 39 is a timing diagram used in conjunction with the explanation of the latch register illustrated in FIG. 38*b*;

FIG. 40 is a circuit diagram of a level setter employed in the latch register in FIG. 38*b*; and FIG. 41 is a detail logic diagram of an individual adder utilized throughout the various FIGS. 12 through 37.

In the following discussion of the illustrative divider of the present invention, D.C. rather than pulse type logic is employed. The term "addition" is used to include both addition and subtraction, and the same adders are utilized for both. Subtraction is performed by the use of the two's complement of the number to be subtracted from the other. The two's complement is obtained by inserting all bits in the number and also forcing an additional one into the carry position of the low order bit position of the adder when performing the addition. The dividend and the divisor are normalized before they are entered into the divider. These numbers are fractions, and they are normalized by shifting the fraction in a register until the high order one in the fraction is located just to the right of the binary point and the exponent (such as, $2^{-2}$, $2^{-3}$, etc.) is adjusted accordingly. Hence, the normalized fraction has a value less than one and equal to or greater than one-half.

Cables are used throughout the drawings to transfer data, and they are illustrated as two parallel lines with arrowheads at one end thereof and at some point intermediate the ends of the cables, the two parallel lines are widened in the form of a circle and numbers appear within the circle. The numbers appearing within the circle indicate the number of conductors within the cable. The input and the output lines of the block symbols are connected to the most convenient side of the block including the same side in some cases. An input line to a corner of a block symbol and an output line from the adjacent corner of that block symbol indicates that the signals are applied to the input of the circuit represented by the block and the input conductor is electrically connected to the output conductor of the adjacent corner. The bold face character symbols appearing within a block symbol identify the common name for the circuit represented, that is, G identifies a gate circuit, O a logical OR circuit, A a logical AND circuit, and so forth.

In the description of the divider of the present invention a general discussion of the theory of operation is set forth, followed by an illustrative arrangement of a divider utilizing these principles. The general arrangement of the illustrative divider is first described in connection with overall block system diagrams with respect both to the manner in which the various circuit components and apparatus are interconnected and in respect to the general overall operation which is performed by these components and apparatus. This general description is followed by a separate and detailed description of the overall system, along with descriptions of various components and apparatus which so require it.

As noted before, the time required to perform a division is proportional to the number of additions required to complete it. The present invention is concerned with increasing the speed of division by reducing the required number of additions. This is accomplished by utilizing a variable length shift across dividend bits, and the number of additions required for any particular division problem is dependent on bit distribution. For purposes of describing the basic concepts of the present invention, it is assumed that the divisor and the dividend are binary fractions with the binary points located just to the left of the high order position. Hence, the divisor always has a numerical value less than one but equal to or greater than one-half. This is accomplished by normalizing the fraction as discussed previously. A shift counter is utilized which is set initially with the number of quotient bits to be developed, and means are provided for comparing the shift called for during a given cycle against the number of shifts still allowed by the shift counter.

A divide operation commences by setting the dividend into a dividend-quotient latch register, the divisor into a divisor latch register, and the quotient length into the shift counter, which counts down. The high order bit position of the dividend (assuming a zero shift) and the high order bit position of the divisor enter the same column of the adder. The dividend shifting is to the left which clears the right end of the dividend-quotient latch register as the division operation proceeds. The quotient is developed and placed in the right end of the dividend-quotient register and shifted along with the dividend.

Figure 5:
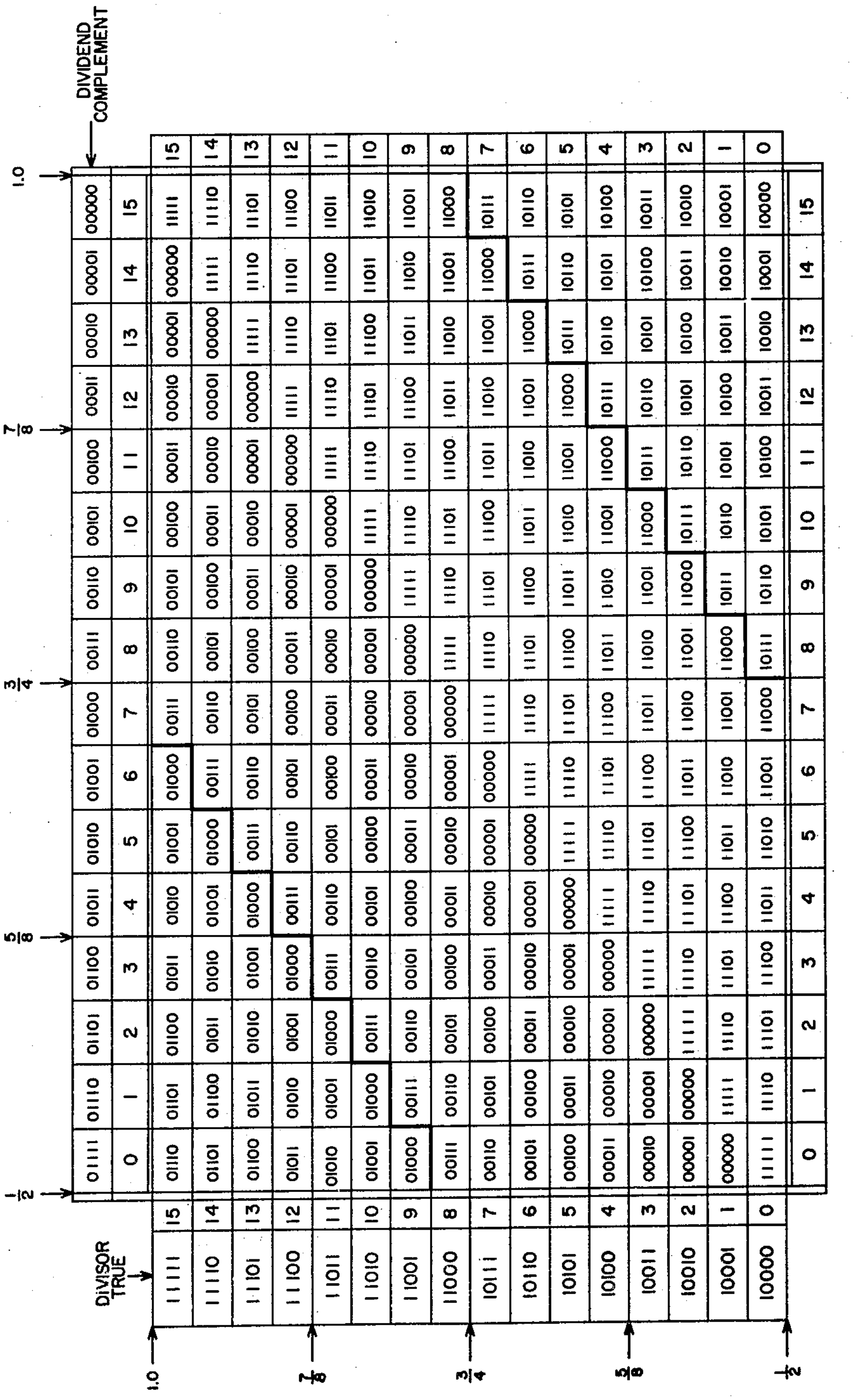
FIGS. 5 through 10 show tables which are employed in explaining certain of the concepts of the present invention.
Figure 6:
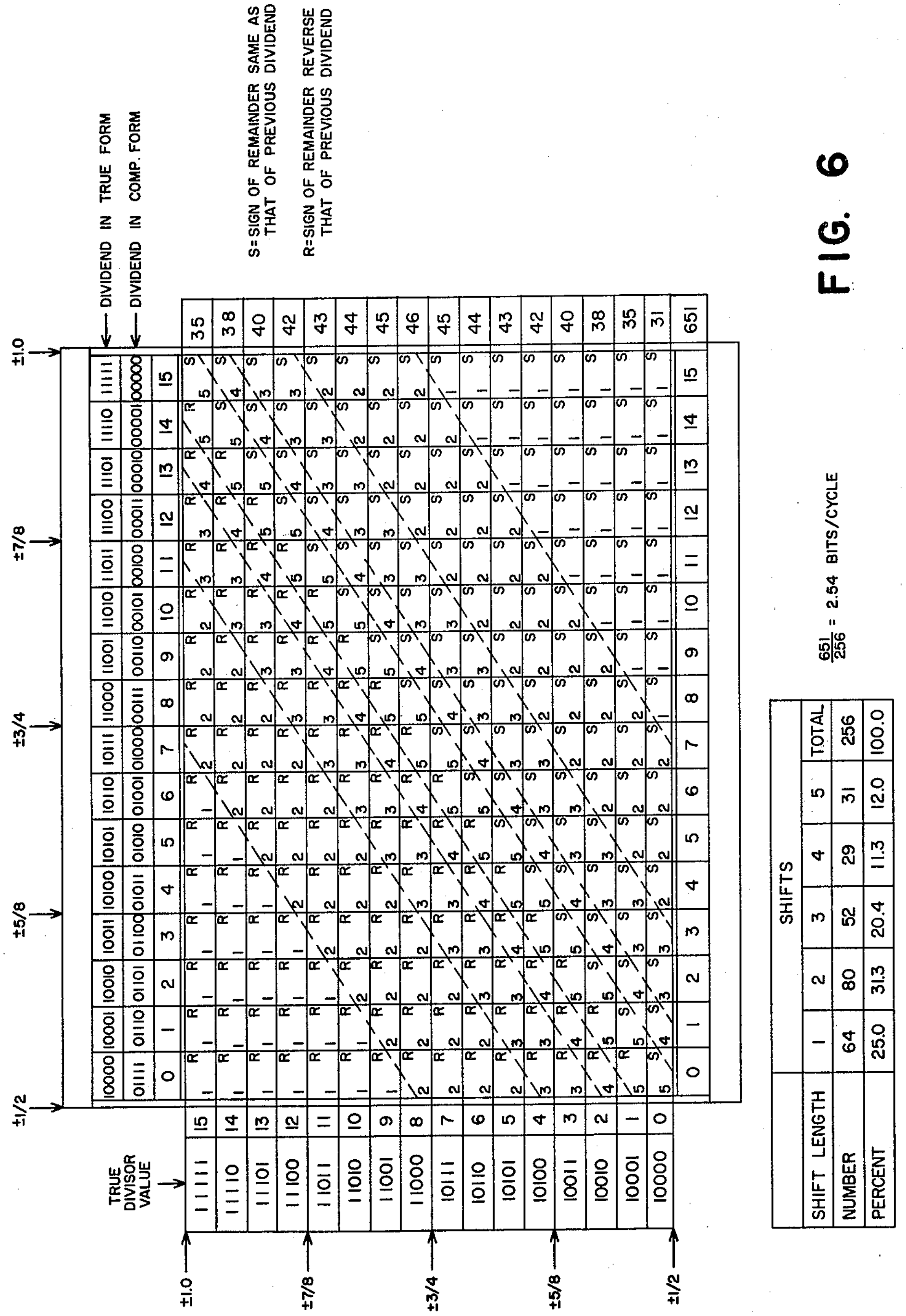

FIG. 5 is a table which shows all possible results that may be obtained for a five-bit true divisor and complement dividend under the restrictions that a true divisor always has a high order one and a complement dividend is always used following shifting across all leading ones, which means that it will always have a high order zero. A corresponding table may be prepared for a complement divisor and a true dividend. If this table were to be compared with the table shown in FIG. 5, it would be found that for the same position the result on one table would be the exact inverse of that on the other table. For example, at column 3, row 10 of the table in FIG. 5 the result is 00110, while the corresponding position of the other table would be 11001. The number of positions to be shifted across is the same in both cases (the two leading zeros or the two leading ones above, which is two bit positions to be shifted across). The information shown in the table in FIG. 6 is derived from the table shown in FIG. 5. The information of primary interest to be obtained from these two tables is the number of shifts which are set forth in the table in FIG. 6. For example, in the table shown in FIG. 5, column 3, row 5 there are four leading zeros and, therefore, the numeral 4 which indicates the number of shifts appears in the corresponding position in the table shown in FIG. 6.

The table shown in FIG. 6 illustrates that the points of maximum shift lie along a diagonal line representing equal values for the divisor and the dividend. If random distribution of divisor bits between problems and dividend bits between and within problems is assumed, then the average shift per cycle is 651 divided by 256=2.54 for a five-bit divisor used with a shifter capable of handling shifts of five or less. The letter *s* appearing in the table in FIG. 6 indicates that the sign of the remainder is the same as that of the previous dividend, and the letter *r* in this figure indicates that the sign of the remainder is the reverse of that of the previous dividend.

Figure 7:
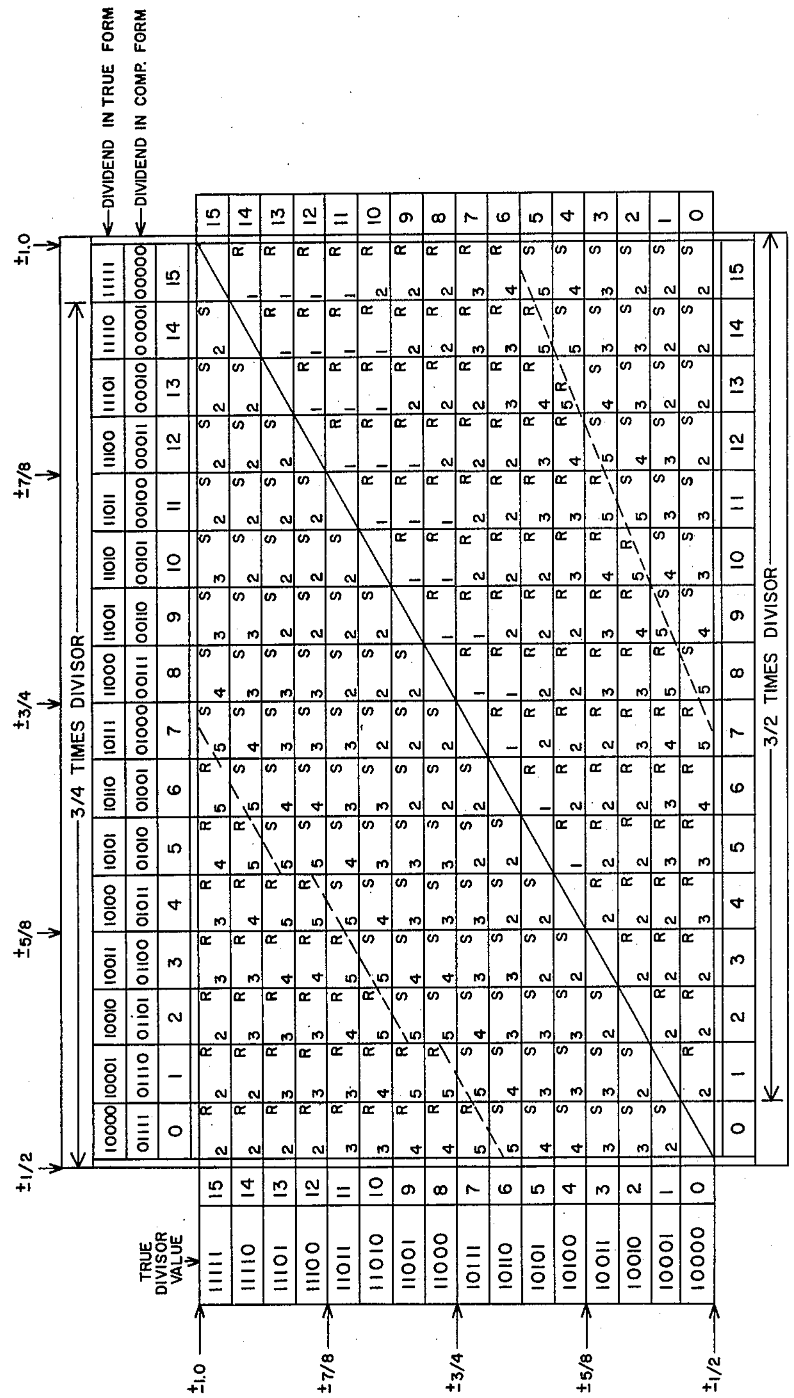

FIG. 7 is a shift table obtained when using three-fourths and three-halves divisor multiplies with five-bit divisors and five-bit dividends. The diagonal line from the lower left hand corner to the upper right hand corner shows the division between the use of the three-fourths times divisor and the three-halves times divisor. The dashed lines on the table indicate the lines of maximum shifts. These lines of maximum shift fall within the three-fourths times area and within the three-halves times area, i.e., the high values of shift fall within the areas on each side of the diagonal line. The use of these multiples along with the one times multiple provides increased operating efficiency because of the greater number of large shifts.

Figure 8:
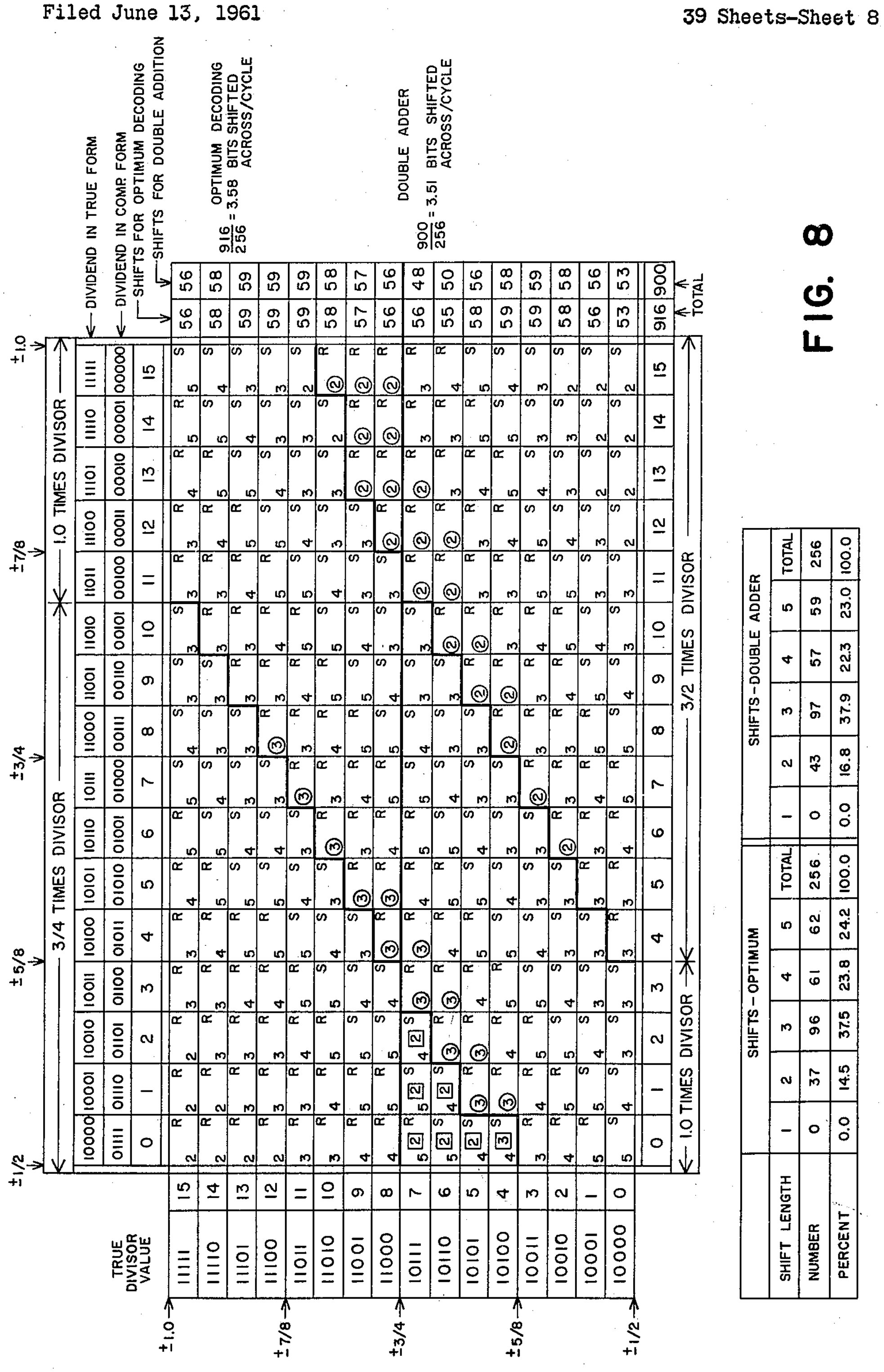

FIG. 8 shows a table which is a combination of FIGS. 6 and 7, and the table shows an optimum when using three-fourths, one, and three-halves multiples. The heavy stepped lines show the separation between the areas of use of the three multiples, and these lines indicate the optimum use of the three multiples. The circled numbers represent shifts that are the same in the two adjacent areas. The heavy separating line could go on either side of these positions without changing the result. The numbers in squares in the seven positions below the heavy horizontal line indicate the shifts that these positions would have as part of the one times divisor area instead of the three-fourths times divisor area. The optimum use of the three multiples (indicated by the heavy stepped lines) here for the five-bit divisor indicates an average of 3.58 bits shifted across per cycle. If a double adder is utilized instead of a single adder, the result is 3.51 bits per cycle. A decoding arrangement is employed to obtain the optimum operation, whereas, if a double adder is utilized this decoding arrangement is not employed. In this latter case (double adder), the one times divisor multiple is used in one adder and the three-fourths times or the three-halves times divisor multiple is used in the second adder, and the output of the adder which indicates the greatest shift is utilized.

Figure 9:
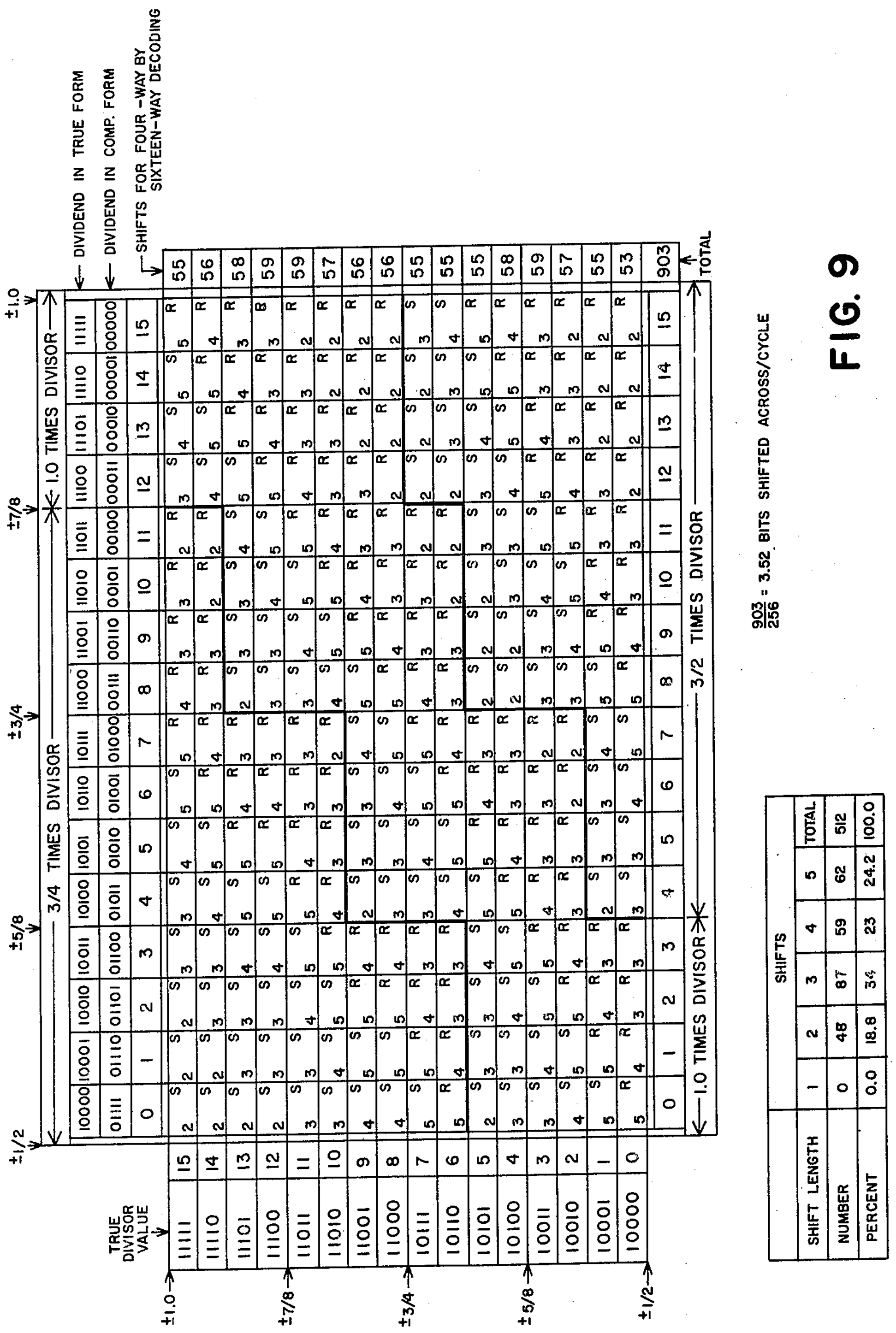

FIG. 9 is a table which shows a decoding coding arrangement for multiple selection that gives substantially the same results as may be obtained from using a double adder. The heavy stepped lines show the separation between the areas of use of the three multiples. This is the decoding arrangement which is utilized in the divider illustrated in the accompanying drawings. This decoding arrangement together with other possible alternatives will be discussed in detail subsequently. As will become apparent, simpler decoding arrangements may be utilized, but these do not result in as efficient operation as the arrangement shown in FIG. 9.

The table in FIG. 8 is obtained by replacing all of the positions in the table shown in FIG. 6 with the shift called for on the corresponding positions of the table in FIG. 7 which are greater than the shifts indicated in those positions in FIG. 6. The table shown in FIG. 9 is obtained in a similar manner except every position in FIG. 6 which is less than the corresponding position in FIG. 7 is not replaced by that shown in FIG. 7. Hence, the decoding arrangement shown in the table in FIG. 9 is not optimum as is that shown in FIG. 8. The decoding arrangement in FIG. 9 is termed four-way by sixteen-way decoding, and this decoding is easier to obtain, or simpler than that shown by the heavy stepped lines in FIG. 8. However, the difference is rather small since the optimum decoding arrangement shown in FIG. 8 results in 3.58 bits shifted across per cycle, whereas, the simpler decoding arrangement shown in FIG. 9 results in 3.52 bits shifted across per cycle. The multiple selection is made by examining, or decoding the high order bits of the divisor and the dividend for each operation. The efficiency of operation is dependent upon the number of bits included as well as the complexity of the decoding system (as will be apparent by a comparison of the decoding arrangements shown in FIGS. 8 and 9) and the time required by it.

The foregoing discussion primarily has dealt with the section of multiples. In addition to this, the quotient bits must be developed and certain termination features must be followed. When the one, three-halves, and three-fourth times divisor multiples are used, three low order register positions in the dividend-quotient register are required. These three positions are designated as X, Y and Z where position Z is the lowest order position in the register. Three definite quotient bits (X, Y and Z) are generated when the three-fourths multiple is used. The use of the three-halves multiple produces two definite quotient bits in positions X and Y, and a tentative bit in the position Z. The use of the one times multiple produces one definite quotient bit in position X and two tentative bits in positions Y and Z. The tentative bit placed in the position Z when the three-halves multiples is used is tentative only if it is followed by a shift of two, because a shift of two would place this bit in the position Y while, at the same time, a new quotient bit (which is definite) is generated for the position X. The newly generated quotient bit for the quotient X is always definite, and since it may be different from the bit shifted from the position Z, the bit in the position Z is not shifted into the position X in the cycle following the use of the three-halves times multiple where a shift of two is indicated. No problem occurs with a shift of one in this case, because a shift of one cannot follow the use of the three-halves times divisor because of the decoding arrangement used. This is shown by the table in FIG. 9, which indicates only shifts of two or greater in the cases where the three-halves times divisor is used. Likewise, a similar problem exists where a shift of one or a shift of two follows the use of one times multiple.

Figure 10:
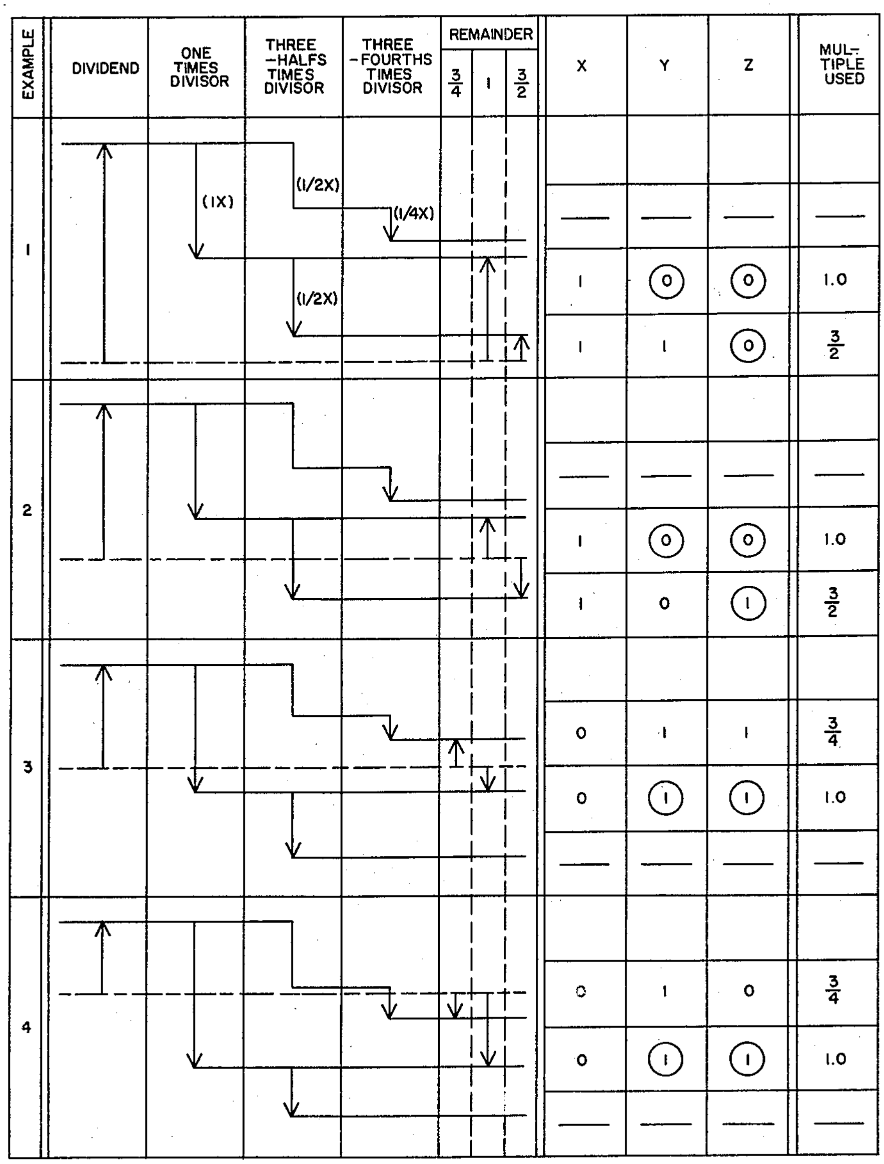

FIG. 10 illustrates graphically the various conditions that may occur when using the three-fourths, the one, and the three-halves divisor multiples. This figure shows an initial true dividend with complement divisor multiples, but the inverse may be found easily by reversing all directions of the lines (which indicate the relative magnitudes of the dividend, and divisors) and interchanging zeros and ones in the quotient bit columns. In the first example (shown by the numeral one appearing in the left hand column) the initial dividend is between one-and-a-half and two times the divisor. It is desired to choose the three-halves times divisor here because it gives two definite quotient bits and one tentative (or indefinite) quotient bit (indicated by the circle in FIG. 10). The one times multiple may be used, but it would be less efficient. It would provide one definite quotient bit and two indefinite quotient bits. The three-fourths times multiple would not be selected for use with this initial condition.

The second example shows the initial dividend is greater than one times the divisor but less than one-and-a-half times the divisor. Either the three halves or the one times divisor multiple may be selected here but not the three-fourths times multiple as it would be less efficient than the use of the one times multiple. The three-halves times multiple provides two definite quotient bits and the one times multiple provides one definite quotient bit.

In example three the dividend is less than one times the divisor but greater than three-fourths the divisor. Either the one times divisor or the three-fourths times divisor may be selected, but not the three-halves times divisor. The three-fourths multiple gives three definite quotient bits, and the one multiple gives one definite quotient bit. In the fourth example the dividend has a value between one-half times and three-fourths times the divisor. In this case the three-fourths times divisor multiple is preferred. It should be noted that the divisor that results in the smaller remainder is the preferred one to use. The magnitude of the remainder is indicated by the length of the arrow in the remainder column of FIG. 10. The circuits for generating the quotient bits will be set forth in more detail later in connection with the illustrative arrangement of the present invention.

Certain rules must be followed in terminating the division operation. These rules affect the generation of the quotient bits and insure that the final remainder will be in true form. The rules stated are based on conditions prevailing during the last cycle of the division operation. If the dividend is true and the shift called for is larger than that remaining, the shift remaining is made, the entry of the divisor into the adder is suppressed, and the low order quotient bits (X, Y and Z) are set to agree with the bits being shifted across. This completes the division operation.

If the dividend is true and the shift called for is equal to that available, the divider is operated in the normal manner. If the resulting adder output is in true form, the division operation is complete. If the resulting adder output is in complement form, one additional cycle is required to get the remainder into a true form. If the dividend is in complement form and the shift called for is equal to or greater than that allowed, the allowed shift is used and the operation proceeds in a normal manner. If the resulting remainder is in true form, the division operation is complete. If the resulting remainder is in the complement form, the resulting quotient is complete but one additional cycle is required to get the remainder in the true form. This latter condition only occurs when the shift called for and the shift allowed are equal. If the dividend is complement and a shift of zero is allowed, the zero shift is made, the true value of the divisor is added, and the entry of quotient bits is suppressed since the bits there (positions X, Y and Z) are already correct. Additionally, if the shift called for is equal to that available, or it is one less than that available (the shift available is one greater than that requested), the choice of the divisor multiple is limited to the one times multiple. These termination rules will be discussed in greater detail in connection with the illustrative embodiment of the present invention. A further description of dividers which utilize the concepts of shifting across bits and employing divisor multiples may be found in an article by O. L. MacSoley entitled "High-Speed Arithmetic in Binary Computer," which appeared in the Proceedings of the IRE, vol. 49, No. 1 (Computer Issue), pages 67 through 91.

Figure 4A:
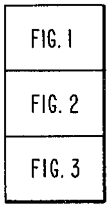

FIGS. 1, 2 and 3, when arranged as illustrated in FIG. 4*a*, show in block form a divider constructed in accordance with the concepts of the present invention. FIG. 1 shows a dividend-quotient latch register 10 interconnected with a shifter 12, OR circuits 14, 16 and 18, and a gate 20. A cable 22 is connected from storage device (not shown) to the OR circuits 14 and 16 to supply the initial dividend through these OR circuits to the dividend quotient latch register 10. The dividend-quotient latch register 10 is connected through a cable 24 and a line 26 to the shifter 12. A line 27 is connected from the shifter 12 to the dividend-quotient latch register 10. The OR circuits 14 are connected to the register 10 through a cable 28, and the OR circuits 16 are connected to the register 10 through a cable 30.

The shifter 12 is connected through cables 32 and 34, and a line 36 to the OR circuit 16. The shifter 12 is connected through a line 33 to the gate 20. The shifter 12 is connected through a cable 38 to the OR circuits 18 in FIG. 2. The OR circuits 18 are connected through cables 40 and 40*a* to adders 42. A true/complement line 44 is connected from the shifter 12 in FIG. 1 through a gate 45 and a line 47 to the adders 42 in FIG. 2. The adders 42 are connected through cables 46 and 46*a* to exclusive OR circuits 48. The adders 42 are connected through cables 46 and **46*b* to gates 50. A gate control line 52 is connected to the gates 50. The outputs of the gates 50 are connected through a cable 54 to the OR circuits 14 in FIG. 1. The exclusive OR circuits 48 are connected through a cable 56 to a shift decoder 58**.

Referring back to FIG. 1, a cable 60 is connected from a storage device (not shown) to a divisor latch register 62. A latch control line 64 is connected to the divisor latch register 62. The divisor latch register 62 is connected through cables 66 and **66*a* to divisor adders 68. The divisor adders 68 are connected through cables 70 and 70*a* to three-fourths times divisor gates 72, and through cables 70 and 70*b* to three-halves times divisor gates 74 in FIG. 2. The divisor latch register 62 in FIG. 1 is connected through cables 66, 66*b* and 66*c* to one times divisor gates 76** in FIG. 2.

The divisor gates 72, 74 and 76 are connected through respective cables 78, 80 and 82 to OR circuits 84. The OR circuits 84 are connected through a cable 86 to exclusive OR circuits 88. The true/complement line 44 is connected through the gate 45 and the line 47 to the exclusive OR circuits 88. The exclusive OR circuits 88 are connected through a cable 90 to the adders 42.

The shift decoder 58 is connected through a cable 94 to OR circuits 96 in FIG. 2. A cable 98 is connected from a storage device (not shown) to the OR circuits 96. The OR circuits 96 are connected through a cable 100 to a shift control latch register 102. This register 102 is connected through a cable 104 to the shifter 12 in FIG. 1.

The shift decoder 58 is connected through a cable 106 to OR circuits 108 in FIG. 3. The OR circuits 108 are connected through a cable 110 to a shift counter adder 112. The shift counter adder is connected through cables 114 and **114*a* to gates 116. A line 118 is connected from the shifter counter adder 112 to the gates 116. A gate control line, or inhibit line, 120 is connected to the gates 116. These gates 116 are connected through a cable 122 to OR circuits 124. A cable 126 is connected from a storage device (not shown) to the OR circuits 124, and these OR circuits 124 are connected through a cable 128 to a shift counter latch register 130. The shift counter latch register 130 is connected through cables 132 and 132*a* to the shift counter adder 112. The shift counter latch register 130 is connected through a cable 134 to the shift decoder 58** in FIG. 2.

Latch control line 136 (FIG. 1) is connected to the dividend-quotient latch register 10 in FIG. 1, to the shift control latch register 102 in FIG. 2, and to the shift counter latch register 130 and the multiple selector 140 in FIG. 3. The OR circuits 18 in FIG. 2 are connected through cables 40 and **40*b* to a multiple selector 140 in FIG. 3. The divisor latch register 62 in FIG. 1 is connected through cables 66, 66*b* and 66*d* to the multiple selector 140 in FIG. 3. A line 142 is connected from the shift decoder 58 in FIG. 2 to the multiple selector 140 in FIG. 3. The multiple selector 140 is connected by lines 146, 147 and 148 to the divisor gates 76, 74 and 72, respectively, in FIG. 2. These lines 146, 147 and 148 also are connected to the quotient generator 144 in FIG. 2. The line 148 also is connected to the dividend-quotient latch register 10 in FIG. 1. A line 49 is connected from the multiple selector 140 to the gate 45 and to the quotient generator 144** in FIG. 2.

A line 150 is connected from the adders 42 in FIG. 2 to the quotient generator 144. The true/complement line 44 is connected to the quotient generator 144. A line 152 is connected from the shifter 12 in FIG. 1 to the quotient generator 144 in FIG. 2. Lines 154 and 155 are connected from the quotient generator 144 to the OR circuits 16 in FIG. 1. A line 156 is connected from the quotient generator 144 to the gate 20 in FIG. 1. A line 158 is connected from the gate 20 to the OR circuits 16.

The shift counter adder 112 in FIG. 3 is connected through cables 114 and **114*b* to an equality detector 164. The output of the equality detector 164 is connected through a line 166 to a termination control circuit 168. The shift counter latch register 130 is connected through cables 132 and 132*b* to a zero detector 170. The output of the zero detector 170 is connected through a line 172 to the termination control circuit 168. The line 118 is connected from the shift counter adder 112 to the termination control circuit 168. The true/complement line 44 is connected to the termination control circuit 168. Two lines 178 and 180 are connected from the termination control circuit 168 to the multiple selector 140. An output line 182 from the termination control circuit 168** provides a signal to indicate when a division is complete.

The specific details of construction and operation of the circuits shown within the blocks in FIGS. 1 through 3, and the detailed system operation, will be discussed subsequently. However, the general discussion of the overall operation of the block diagram system shown in FIGS. 1 through 3 follows. Initially, a dividend is supplied from a storage device (not shown) through the cable 22 to the OR circuits 14 and 16 in FIG. 1. Likewise, a divisor is applied through the cable 60 to the divisor latch register 62 in FIG. 2, zero shift information is applied through the cable 98 to the OR circuit 96, a negative inhibit signal is applied through the lines 52 and 120 to the respective gates 50 and 116, and a number representative of the number of quotient bits to be developed as applied through the cable 126 to the OR circuits 124. The latch control signal is applied through the line 64 to the divisor latch register 62 in FIG. 1 to store the divisor in that latch register. A latch control signal is supplied to the line 136 in FIG. 1 to store the dividend in the dividend-quotient latch register 10 in FIG. 1, to store the initial shift (zero) in the shift control latch register 102 in FIG. 2, and to store the total number of shifts to be made (the number of quotient bits to be developed) in the shift counter latch register 130 in FIG. 3. The latch control signals applied to the line 136 recur throughout the division operation, and these latch control signals control cycles of operation. During one cycle of the operation, a shift is made, an addition is made, information is sensed, or decoded, to indicate the next following shift, and quotient bits are developed. In the next following cycle the indicated shift is performed.

Figure 11:
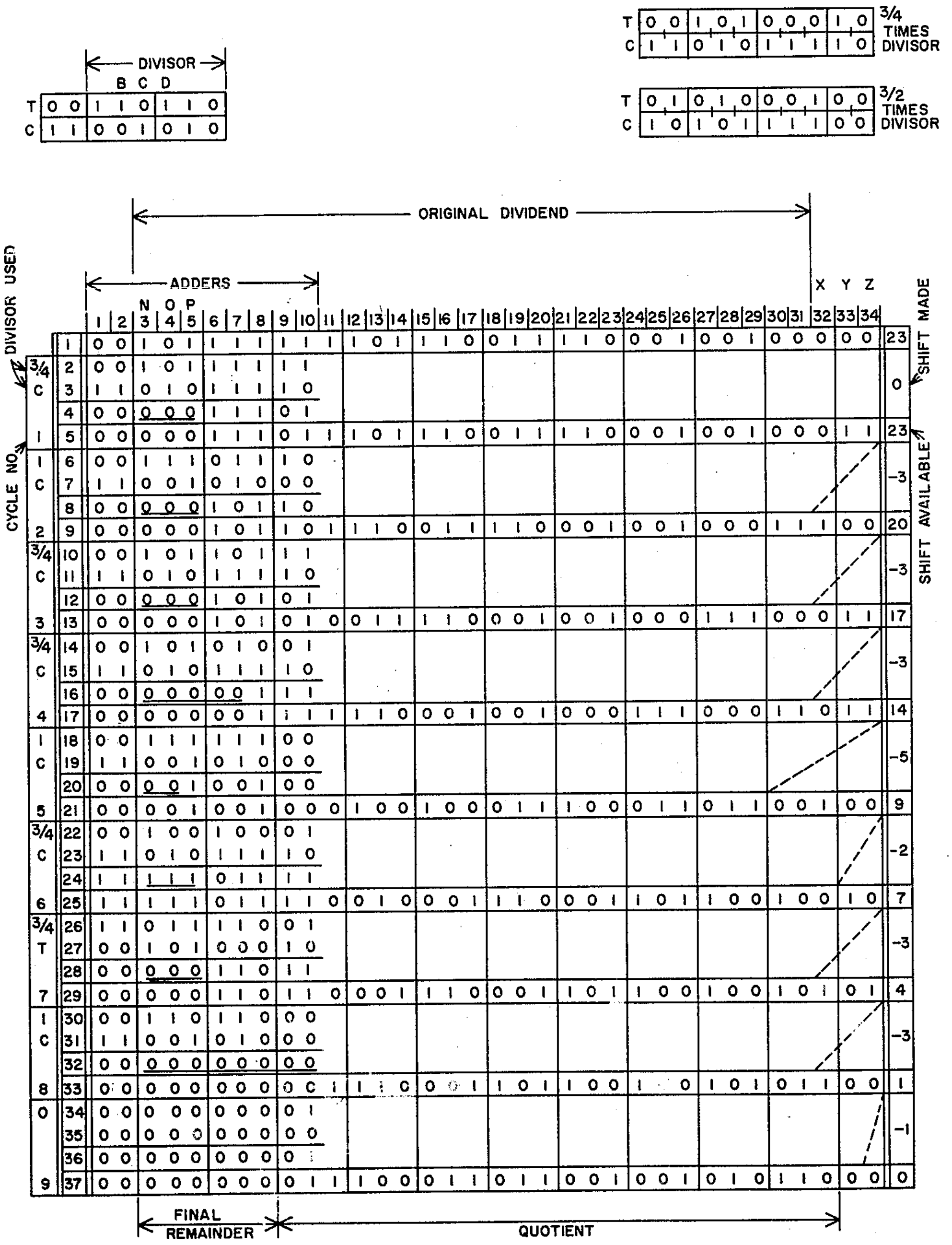
FIG. 11 shows a table which illustrates the additions performed, the multiples used, and the shifts made during a division process by the divider illustrated in FIGS. 1 through 3.

FIG. 11 illustrates the cycles of operation during a divide procedure, the additions performed, the multiples used and the shifts taken. The dividend entered into the dividend-quotient latch register 10 in FIG. 1 is illustrated in row 1, columns 3 through 31 of the table in FIG. 11. The bits in columns 1 and 2 at row 1 indicate whether the dividend is true or complement, at rows 4, 8, 12, 16, 20, 24, 28, 32 and 36 whether the partial dividend (remainder from the particular addition) is true or complement, and at rows 3, 7, 11, 15, 19, 23, 27 and 31 whether the divisor is true or complement. This latter information (whether the divisor is true or complement) also is indicated by a C or a T in the un-numbered left-most column of the table in FIG. 11. This column also indicates which divisor multiple is utilized during a particular cycle, and the cycle numbers appear in this left-most column.

The shift available, and the shifts used in each cycle are shown in the right-most column of the table in FIG. 11. As shown in this column, the division process commences with an available shift of twenty-three and progresses through nine cycles until no shift remain. Columns 32, 33 and 34, respectively, are the X, the Y and the Z quotient bit positions. The quotient bits that are generated are placed in these three positions and shifted (to the left) along with the dividend in the dividend-quotient latch register 10 in FIG. 1.

An example of the operation of the divider illustrated in FIGS. 1 through 3 follows with reference to these figures and the table shown in FIG. 11. FIG. 11 shows in row 1, columns 3 through 31 the original dividend chosen for the following example. The true and the complement of the one times divisor, the three-fourths times divisor and the three-halves times divisor are shown at the top of FIG. 11. At the beginning of the first cycle, the eight high order bits of the dividend (in row 1, columns 3 through 10 in FIG. 11) are gated from the dividend-quotient latch register 10 in FIG. 1 by the shifter 12 through the cable 38 to the OR circuit 18 in FIG. 2. These particular high order bits are gated to the OR circuits 18 because the first shift indicated is zero. This zero shift was supplied to the shift control latch register 102 in FIG. 2 initially. If the shift indicated had been three, for example, the dividend bits gated to the OR circuits 18 would have started with the bit in column 6 in FIG. 11. The bits in columns 1 and 2, which are zeros and indicate that the dividend is true, also are gated to the OR circuits 18 in FIG. 2.

The OR circuits 18 in FIG. 2 apply the bits in row 2, columns 1 through 10 (which are the same as those in row 1) in FIG. 11 through the cable 40 and the cable 40a to the adders 42. Hence, the information shown in row 2 in FIG. 11 indicates the portion of the dividend that is applied to the adders 42. The line 44 provides an indication of whether the dividend is true or complement. When a true dividend is to be added, the two's complement of the divisor is employed. When the dividend is complement, the true value of the particular divisor multiple is employed. The bits in row 2, columns 3 through 5 in FIG. 11 are applied through the cable 40 and the cable 40b to the multiple selector 140. The operation of this selector will be described subsequently.

The true value of the one times divisor that is employed in the present example is 110110. This divisor, as is the dividend, in the present example is a fraction. The initial dividend is true as indicated by the zero in row 1, column 1 of FIG. 11. Hence, the divisor to be used must be the complement. The first divisor that is used in FIG. 11 is the complement of the three-fourths times divisor. The use of this divisor is determined by the multiple selector 140 in FIG. 3 which senses certain bits in the dividend and in the true value of the one times divisor to make a selection. The operation of this circuit will be described subsequently. Since the three-fourths times divisor is selected, the multiple selector 140 in FIG. 3 supplies a gating signal through the line 148 to the three-fourths times divisor gates 72 in FIG. 2.

The divisor adders 68 in FIG. 1 serve to add the true value of the one times divisor to the true value of one-half times this divisor. This results in three-halves times the divisor ($1+\frac{1}{2}=1\frac{1}{2}=\frac{3}{2}$). Hence, three-halves times and the three-fourths times divisor gates 74 and 72, respectively. However, a gating signal is applied only through the line 148 to the three-fourths times divisor gates 72. Information at the inputs of these gates 72 is gated out through the cable 78 to the OR circuits 84. The OR circuits 84 serve to shift the divisor gated by the gates 72 one position to the right with respect to the divisor gated by the gates 74. This causes the three-halves times divisor to be halved or divided by two to provide the three-fourths times divisor. The three-fourths times divisor is applied through the OR circuits 84 and the cable 86 to the exclusive OR circuits 88. These exclusive OR circuits 88 serve to pass the true value of the particular divisor multiple if the dividend is complement, or to pass the complement value (the one's complement) of the particular divisor multiple if the dividend is true. In this particular example the dividend is true and, therefore, the exclusive OR circuits 88 provide the complement of the three-fourths times divisor through the cable 90 to the adders 42. At this same time, a signal is applied through the line 44, the gate 45 and the line 47 to the adders 42 to provide the two's complement of the three-fourths times divisor.

The signal applied through the line 47 to the adders 42 forces a one in the low order adder position in the adders 42 to provide the two's complement (the one's complement plus a one is the two's complement). This divisor that is entered into the adders 42 in FIG. 2 is illustrated in row 3, columns 1 through 10 in FIG. 11.

The adders 42 in FIG. 2 add the dividend and the divisor, and the result of the addition is applied through the cables 46 and 46b, the gates 50 and the cable 54 to the OR circuits 14 in FIG. 1. This result or partial dividend, is applied through the OR circuits 14 and the cable 28 to the dividend-quotient latch register 10 in FIG. 1. The result of the addition is illustrated in row 4, columns 1 through 10 in FIG. 11. Note that there are three high order adjacent bits (zero's) in row 4, columns 3 through 5 in FIG. 11. Since there are three high order adjacent like bits in this partial dividend, the shift during the next cycle will be a shift of three.

After the addition is made, the quotient generator 144 in FIG. 2 senses the necessary condition to generate the X, the Y and the Z quotient bits. The Table I below sets forth the conditions that determine what quotient bits are generated. This table is derived from FIG. 10 which likewise shows the generation of quotient bits.

TABLE I

*Quotient development*

| Divisor Used | Resulting Partial Dividend | Quotient Bits Generated | | |
|---|---|---|---|---|
| | | X | Y | Z |
| ¾C | T | 0 | 1 | 1 |
| | C | 0 | 1 | 0 |
| ¾T | T | 1 | 0 | 1 |
| | C | 1 | 0 | 0 |
| 3/2C | T | 1 | 1 | (0) |
| | C | 1 | 0 | (1) |
| 3/2T | T | 0 | 1 | (0) |
| | C | 0 | 0 | (1) |
| 1C | T | 1 | (0 | 0) |
| | C | 0 | (1 | 1) |
| 1T | T | 1 | (0 | 0) |
| | C | 0 | (1 | 1) |

The result of the addition made during the first cycle is true as indicated by the zero at row 4, column 1 in FIG. 11. The dividend was true, and the complement of the three-fourths times divisor was used. Hence, according to the Table I above, the quotient bits for positions X, Y and Z to be generated are 011, respectively. These quotient bits are shown in row 5, columns 32 through 34 in FIG. 11. The quotient generator 144 in FIG. 2 receives a signal on the line 148 that indicates that the three-fourths times divisor was used, and a signal on the line 44 that this divisor is complement. A signal is applied through the line 150 from the adders 42 to the quotient generator 144 and this signal indicates that the result of the addition was true. The quotient generator 144 generates the X, Y and Z bits (011), and supplies these bits to the lines 156, 155, and 154, respectively. At this time a positive signal is applied through the line 33 from the shifter 12 in FIG. 1 to the gate 20. Hence the X bit is applied through the line 156, the gate 20 and the line 158 to the OR circuits 16 in FIG. 1. Likewise, the Y and Z bits are applied through the respective lines 155 and 154 to the OR circuits 60. These three quotient bits are applied through the OR circuits 16 and the cable 30 to the dividend-quotient latch register 10 in FIG. 1. Upon the occurrence of the next latch control signal on the line 136, the partial dividend from the adders and these quotient bits are entered into the dividend-quotient latch register 10 in FIG. 1.

A portion of the output of the adders 42 in FIG. 2 is applied through cables 46 and 46a, the exclusive OR circuits 48 and the cable 56 to the shift decoder 58. The shift decoder 58 indicates that a shift of three is requested. As noted before, the amount of shift requested is indicated by the underlined bits in row 4, columns 3 through 5 in FIG. 11. The shift decoder 58 supplies the shift three request through the cable 94, the OR circuits 96 and the cable 100 to the shift control latch register 102. The shift control latch register 102 conditions the shifter 12 in FIG. 1 to provide the three position shift in the next cycle. The shift three request also is supplied from the shift decoder 58 in FIG. 2 through the cable 106, the OR circuits 108 and the cable 110 to the shift counter adder 112. The shift available is supplied from the shift counter latch register 130 through the cables 132 and 132*a* to the shift counter adder 112. At this time the shift available is twenty-three since no shifts have been made. The shift counter adder 112 provides an output which is the difference between the shift available and the shift requested (in this case an output of twenty is produced). This output represents the remaining shift available and it is applied through the cables 114 and 114*a*, the gates 116, the cable 122, the OR circuits 124 and the cable 128 to the shift counter latch register 130.

The shift available also is supplied from the shift counter latch register 130 through the cable 134 to the shift decoder 58 in FIG. 2. However, this information concerning the available shift is not utilized within the shift decoder 58 unless the shift requested is larger than the shift available. In this case, the shift decoder 58 is conditioned by the line 118 from the shift counter adder 112 in FIG. 3 to indicate only the shift available is to be made.

The latch control signal on the line 136 which gates the dividend and the quotient bits into the dividend-quotient latch register also is applied to the shift control latch register 102 in FIG. 2 to gate the requested shift into that latch register, and to the shift counter latch register 130 in FIG. 3 to gate the remaining shift available into this latter latch register. Upon the termination of the latch control signal on the line 136, the information gated into the latch registers by this control signal becomes available at the outputs of these latch registers.

Upon the occurrence of the next latch control signal on the latch control line 136 in FIGS. 1 through 3, the next cycle of the divide operation begins. A shift of three is made by the shifter 12 in FIG. 1. This shifter shifts the contents of the dividend-quotient latch register 10 three positions to the left. At the same time, a portion of the dividend is supplied through the cable 38, the OR circuits 18 in FIG. 2, the cables 40 and 40*a* to the adders 42. This portion of the dividend is shown in the table in FIG. 11 in row 6, columns 1 through 10. The bits in row 6, columns 1 through 10 are derived from the fourth through the thirteenth positions in the latch register (shown in row 5, columns 4 through 13 in FIG. 11). The multiple selector 140 in FIG. 3 selects the one times divisor, and the complement value is used since the dividend is true.

The multiple selector 140 in FIG. 3 supplies a signal through the line 146 to the one times divisor gates 76 in FIG. 1. These gates 76 gate through the one times divisors to the OR circuits 84. This divisor is applied from the OR circuits 84 through the cable 86 to the exclusive OR circuits 88. A signal is applied through the line 44, the gate 45 and the line 47 to the exclusive OR circuits 88 to provide the complement of the one times divisor at the outputs of these OR circuits. This complement value of the divisor is the one's complement of the divisor, and this is applied through the cable 90 to the adder 42. At the same time a signal is applied through the line 47 to the adders 42 to force a one in the low order adder position in the adders 42 to provide the two's complement of the one times divisor. The addition is performed by the adders 42, and the result is applied through the cables 46 and 46*b*, the gates 50 and the cable 54 to the OR circuits 14 in FIG. 1. These circuit components supply this new partial dividend back to the dividend-quotient latch register 10 in FIG. 1. Also, the result of the addition, or partial dividend is applied through the cables 46 and 46*a*, the exclusive OR circuits 48 and the cable 56 to the shift decoder 58. The shift decoder 58 senses the three high order zero's (shown in row 8, columns 3 through 5 in FIG. 11), and provides a shift three signal through the cable 94, the OR circuits 96 and the cable 100 to the shift control latch register 102. At the end of this cycle, this shift indication is gated to the shifter 12 in FIG. 1 which in turn shifts the contents of the dividend-quotient latch register 10 three positions to the left in the next cycle.

The shift decoder 58 in FIG. 2 also supplies the shift request through the cable 106, the OR circuits 108 and the cable 110 to the shift counter adder 112 in FIG. 3. At this time the contents of the shift counter latch register 130 indicate that twenty shifts remain (initially twenty-three shifts were available and three shifts were taken at the beginning of the second cycle leaving a remainder of twenty shifts available). Hence, the shift counter latch register 130 supplies signals through cables 132 and 132*a* to the shift counter adder 112 indicating twenty shifts are available. The shift counter adder 112 serves to subtract the shifts requested from the shifts available and provides an output through cables 114 and 114*a*, the gates 116, the cable 122, the OR circuits 124 and the cable 128 to the shift counter latch register 130.

The quotient generator 144 in FIG. 2 receives a signal on the line 146 which indicates that the one times divisor was selected, a signal on the line 44 that the complement value of the divisor was selected, and a signal on the line 150 indicating that the result of the addition by the adders 42 is true. The quotient generator 144 generates the X, Y and Z bits (100 in accordance with the rules set forth in Table I), and supplies the bits through the OR circuits 16 in FIG. 1 to the dividend-quotient latch register 10. The division operation continues in a like manner for the remaining cycles.

In the event of the shift larger than three but not greater than five, quotient bits (other than the X, the Y and the Z bits) must be generated for positions 30 and 31 (columns 30 and 31 in FIG. 11) of the dividend-quotient latch register 10 in FIG. 1. These quotient bits are set to agree with the bits being shifted across, and they are supplied through the cable 34, the OR circuits 16 and the cable 30 to the dividend-quotient latch register 10 in FIG. 1. In the event of a requested shift greater than five, the shift decoder 58 in FIG. 2 supplies a signal through the line 142 to decondition the multiple selector 140 in FIG. 3. This signal prevents the multiple selector 140 from selecting any multiple and, therefore, any of the divisor gates 72, 74 or 76 in FIG. 2. The multiple selector also deconditions the gate 45 in FIG. 2 to prevent the true/complement signal on the line 44 from being applied to the exclusive OR circuits 88 or the adders 42. A shift of five is made and no divisor is entered into the adders 42 in FIG. 2. The signal on the line 49 is applied to the quotient generator 144. This signal conditions a gate within the quotient generator 144 to cause the X, the Y and the Z quotient bits to be generated in agreement with the bits being shifted across. An indication of the bits being shifted across is supplied to the quotient generator 144 by the line 152 which is connected from the second position in the dividend-quotient latch register 10 through the shifter 12 in FIG. 1. When a shift greater than five is requested, the shift of five is taken as just described, and then the remaining shift requested is taken in the normal manner. Should the shift request be greater than ten, for example, two shifts of five are taken in the manner just described followed by the remaining shift made in the normal manner.

As noted before, certain rules must be followed when terminating the division operation. Certain conditions are sensed by the termination control circuit 168 in FIG. 3 and the quotient generator 144 in FIG. 2 to terminate the division properly. These conditions are sensed in the last cycle of the division operation. If the dividend is true and the shift requested is larger than the shift available, the entry of a divisor is suppressed and the bits being shifted across are inserted in the X, the Y and the Z quotient bit positions in the same manner as when a shift greater than five is reqeusted. The shift available is the shift that is made rather than the shift requested. The line 44 supplies a signal to the termination control circuit 168 in FIG. 3 indicative of whether the dividend is true or complement. The line 118 supplies a signal to the termination control circuit 168 indicative of whether the shift requested is larger than the shift available. The bits that are being shifted across are supplied through the line 152 to the quotient generator 144. The termination control circuit 168 supplies a signal through the line 178 to the multiple selector 140 to suppress the entry of a divisor. This signal prevents the multiple selector from conditioning any of the divisor gates 72, 74 or 76 in FIG. 2 or the gate 45. The multiple selector 140 supplies the signal through the line 49 to the quotient generator 144. This signal conditions the quotient generator 144 to generate X, Y and Z bits in agreement with the bits being shifted across.

If the dividend is complement and the shift allowed is zero, the zero shift is made, the true value of the one times divisor is added, and no new X, Y and Z bits are generated since the bits already present in the dividend-quotient latch register 10 in FIG. 1 in positions X, Y and Z are correct. The line 44 supplies a signal to the termination control circuit 168 indicative of whether the dividend is true or complement. The zero detector 170 supplies a signal on the line 172 to the termination control circuit 158 when the shift remaining is zero. The termination control circuit 168 supplies a signal through the line 180 to the multiple selector 140 to cause the multiple selector to select the one times divisor. The termination control circuit 168 also supplies a signal through the line 176 to the dividend quotient latch register 10 in FIG. 1 to suppress the entry of the quotient bits X, Y and Z. The zero shift is made in the normal manner.

If the shift requested is equal to the shift available at termination, or if the shift available is one greater than the shift requested, the one times divisor multiple must be selected. The equality detector 164 in FIG. 3 senses when the shift requested is equal to or one less than the shift available and supplies a signal through the line 166 to the termination control circuit 168. The termination control circuit 168 supplies a signal through the line 180 to the multiple selector 140 to select the one times divisor. If the dividend is true in this latter case, the operation proceeds in the normal manner. If the resulting adder output is in true form, the division process is complete and this is indicated by a signal on the line 182 from the termination control circuit 168. If the resulting adder output is in complement form, one additional cycle is required to get the remainder into true form. In this case, the remaining shift available is zero and the above described circuits for termination when the dividend is complement and the shift available is zero control the termination.

If the dividend is complement and the shift requested is equal to or larger than the shift available, the allowed shift is made and the division proceeds in the normal manner. If the resulting remainder is in true form, the division process is complete which is indicated by the signal on the line 182. If the resulting remainder is in complement form, the resulting quotient is complete but one additional cycle is required to get the remainder into true form. This is obtained in the manner already described from the facts that the shift allowed is now nezo and the remainder is in complement form.

Figure 4B:
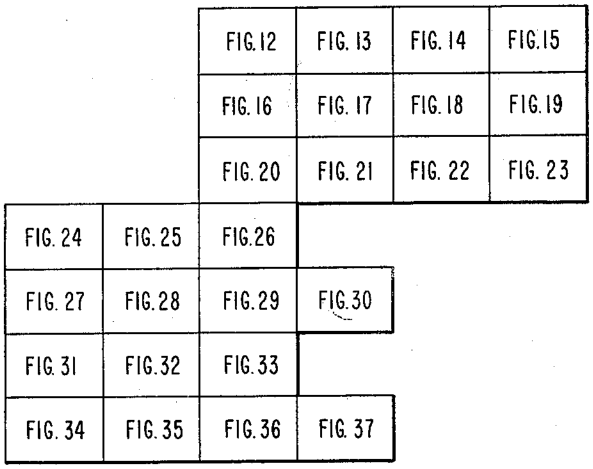

A more detailed showing of the divider example illustrated in FIGS. 1 through 3 is shown in FIGS. 12 through 37. These detailed circuits are discussed below in connection with the Table I and the tables shown in the various figures which were previously explained. FIG. 4*b* illustrate the manner in which FIGS. 12 through 37 are arranged. The reference numerals that appear in FIGS. 1 through 3 also are employed in FIGS. 12 through 37. The circuits in block form in FIGS. 1 through 3 are shown enclosed within dashed lines in FIGS. 12 through 37. The reference numerals on cables and lines in FIGS. 1 through 3 also are used in FIGS. 12 through 37, and where a plurality of cables is shown in FIGS. 12 through 37 which correspond to a single cable in FIGS. 1 through 3, the reference numerals on the plurality of cables are the same as on the single cable but a letter suffix is added. Certain lines within a cable are treated in a similar manner.

The dividend-quotient latch register 10, which is shown in block form in FIG. 1 is shown within a dashed line box 10 in FIGS. 16 through 19. This register includes individual latch register 200 through 234. A latch control line 136 is connected to the individual latch registers 200 through 209, and through a gate 236 and a line **136*a* to the latch registers 231 through 234. The latch control line 136 is connected through a gate 235 and a line 137*a* to the individual latch registers 210 through 230. The individual latch registers 202 through 233 are employed to store the dividend and the quotient. The latch register 200 stores whether the dividend is true or complement, and the latch register 201 is an overflow register. The individual latch register 234 is employed to store whether or not the three-fourths times divisor multiple is used. This operation will be explained in greater detail subsequently. The numerals appearing within the individual latch register boxes 200 through 233** correspond to the column numbers appearing in the table in FIG. 11.

Figure 16:
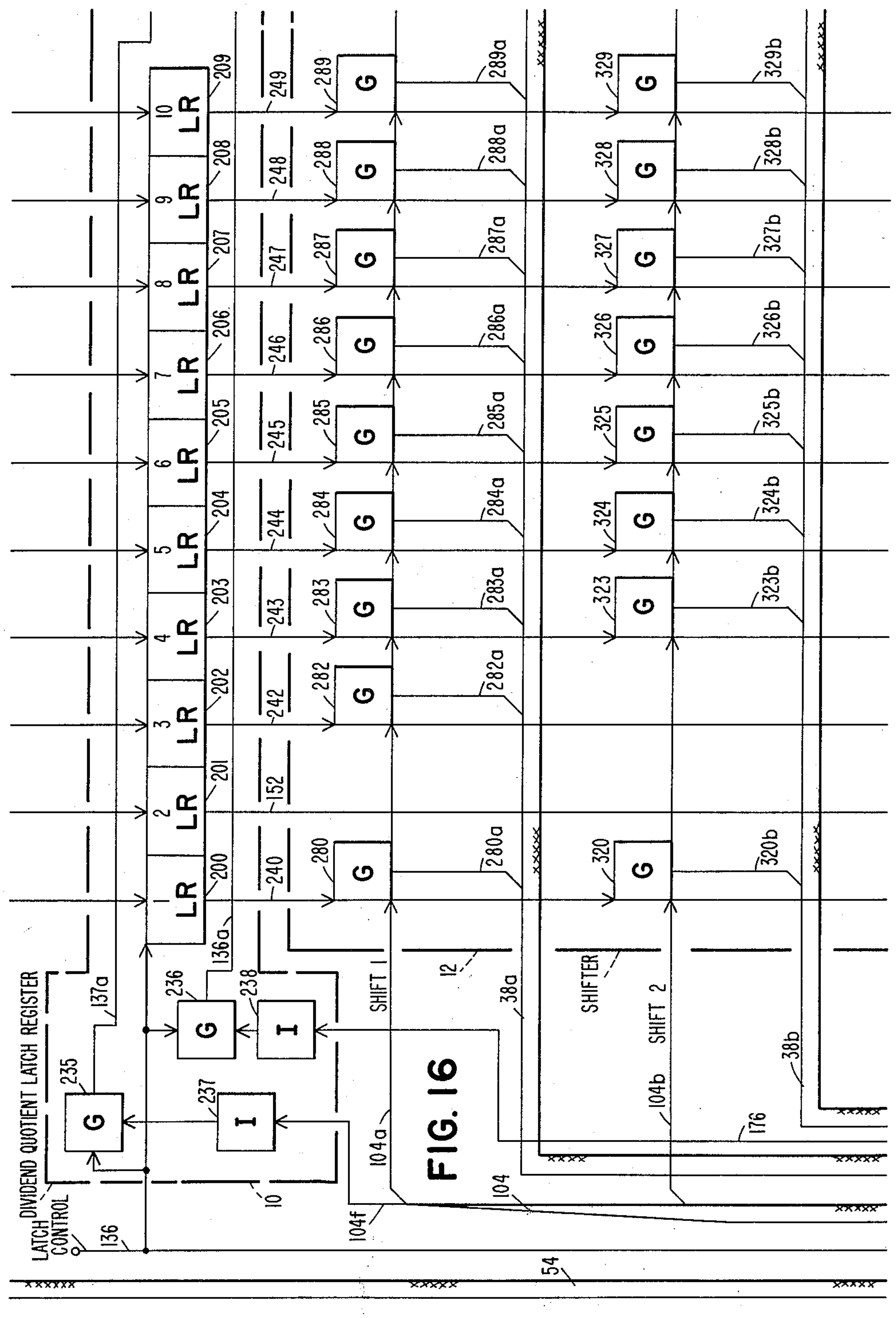

Each output line 240, 152 and 242 through 273 from the individual latch registers 200 through 233 is connected to a vertical string of gates within the shifter 12 which is shown within dashed lines in FIGS. 16 through 23 and 26. For example, the output line 240 from the individual latch register 200 in FIG. 16 is connected to gates 280 and 320 in FIG. 16, to gates 360, 400 and 440 in FIG. 20, and to a gate 480 and 320 in FIG. 16, to gates 360, 400 and 440 in FIG. 20, and to a gate 480 in FIG. 26. The line 152 from the latch register 201 is connected to gates 401 and 441 in FIG. 20, and to a gate 481 in FIG. 26. The line 242 from the latch register 202 is connected to a gate 282 in FIG. 16, and to a gate 482 in FIG. 26. The line 243 from the latch register 203 is connected to gates 283 and 323 in FIG. 16, and to a gate 483 in FIG. 26. The output lines 244 through 273 from the respective latch registers 204 through 233 are connected to the vertical strings of gates in FIGS. 16 through 19, FIGS. 20 through 23, and FIG. 26 in a similar manner. The line 240 from the latch register 200 in FIG. 16 also is connected through an inverter 475 in FIG. 26 to the true/complement line 44.

Figure 18:
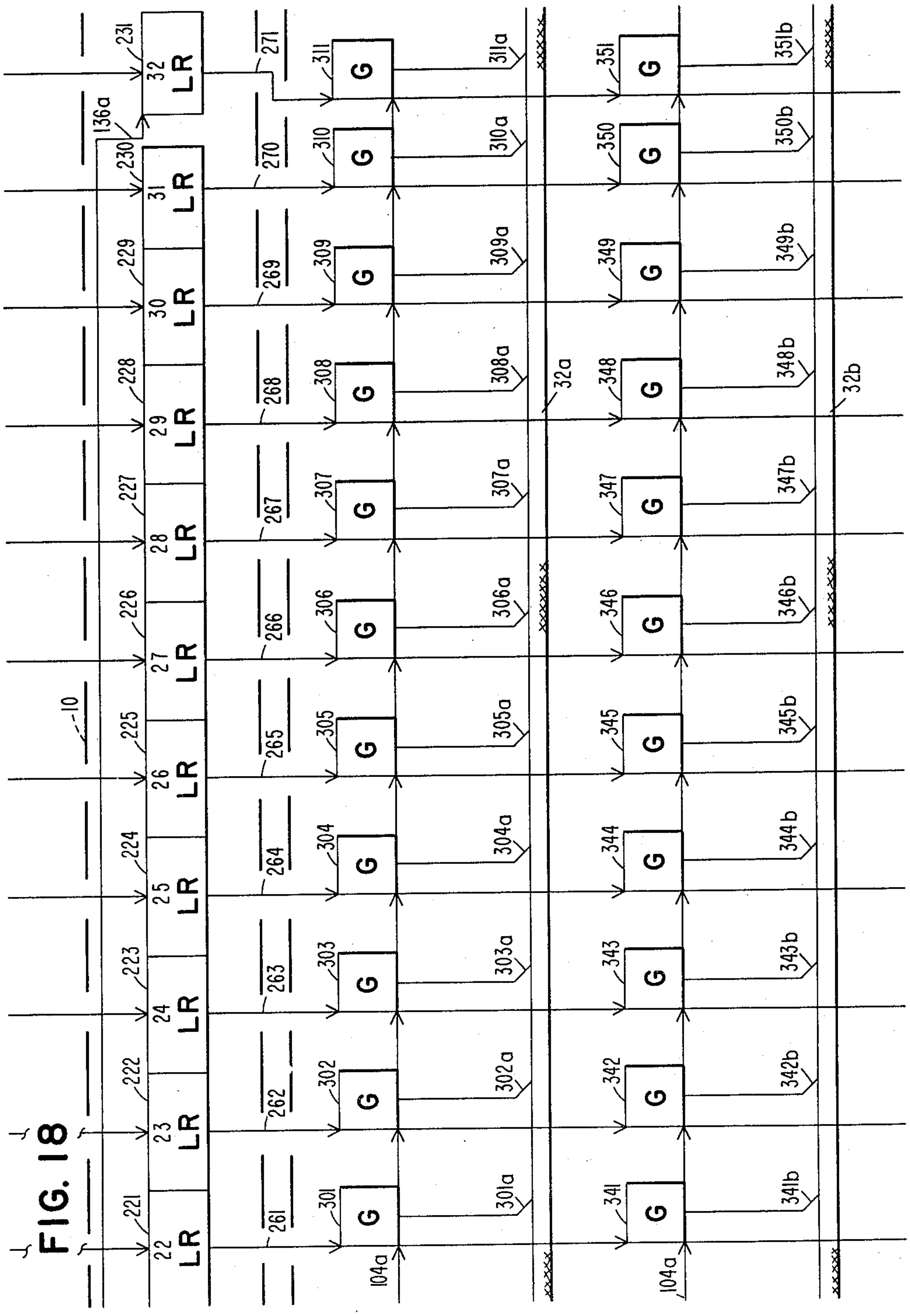
Figure 19:
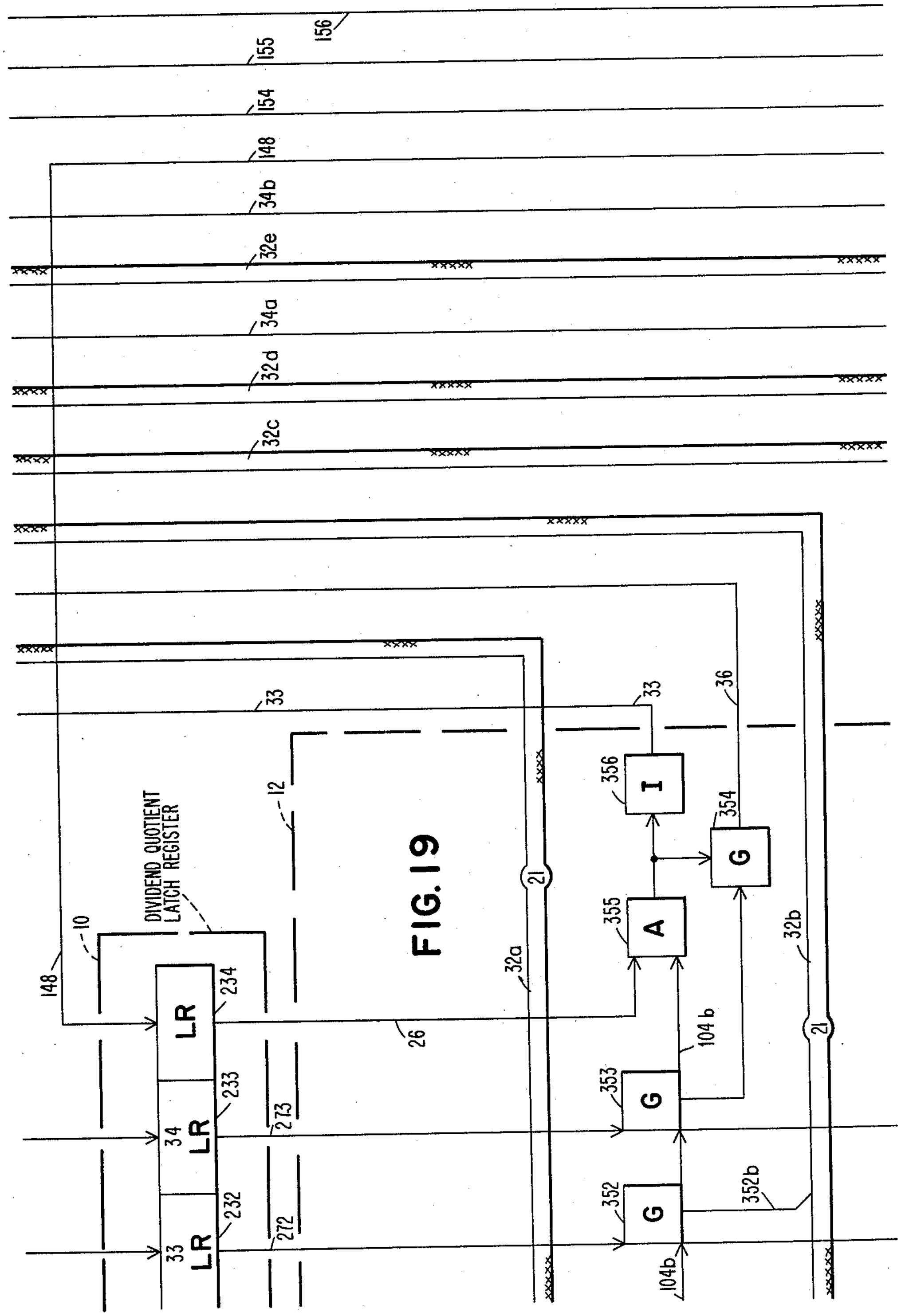
Figure 20:
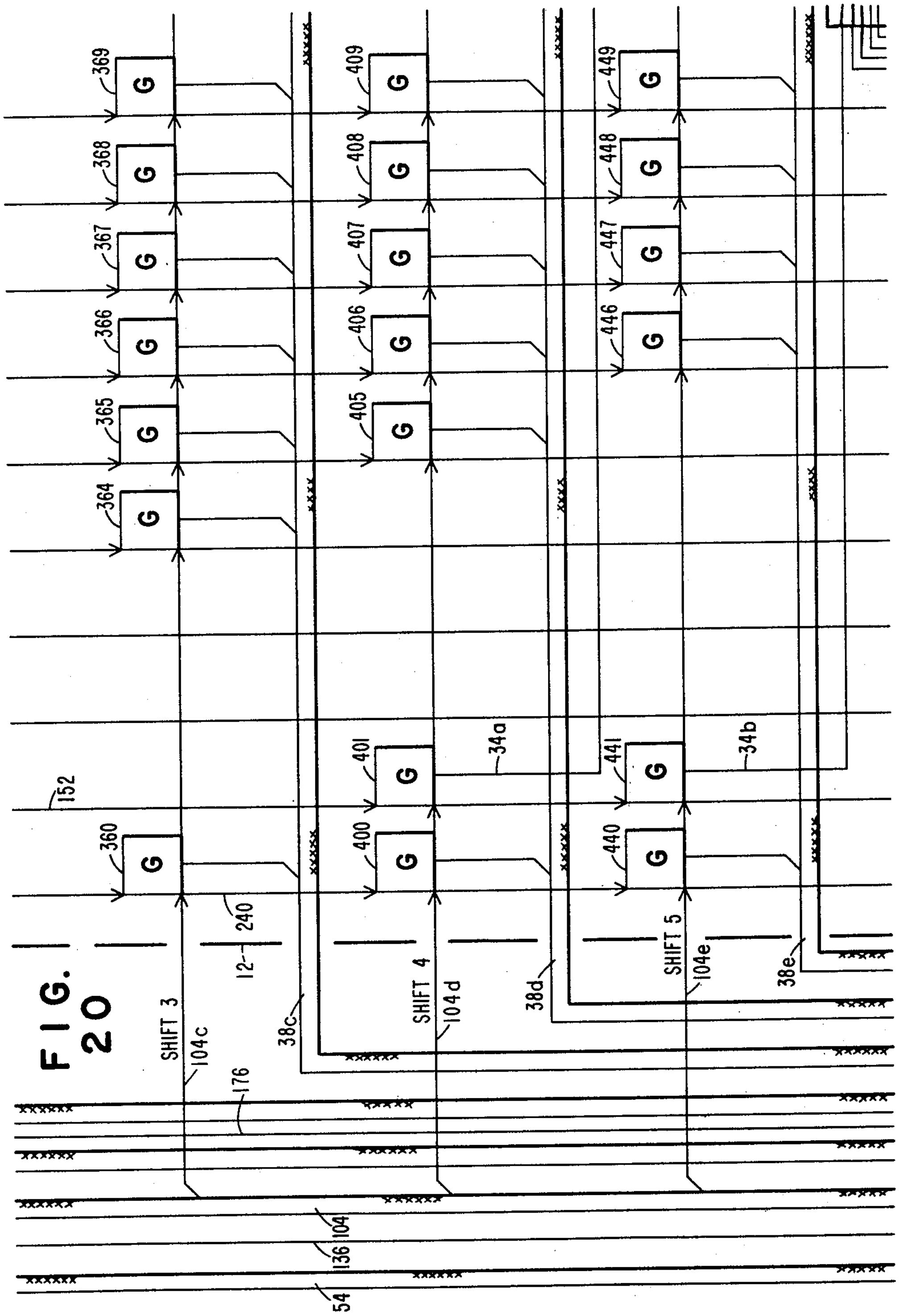
Figure 26:
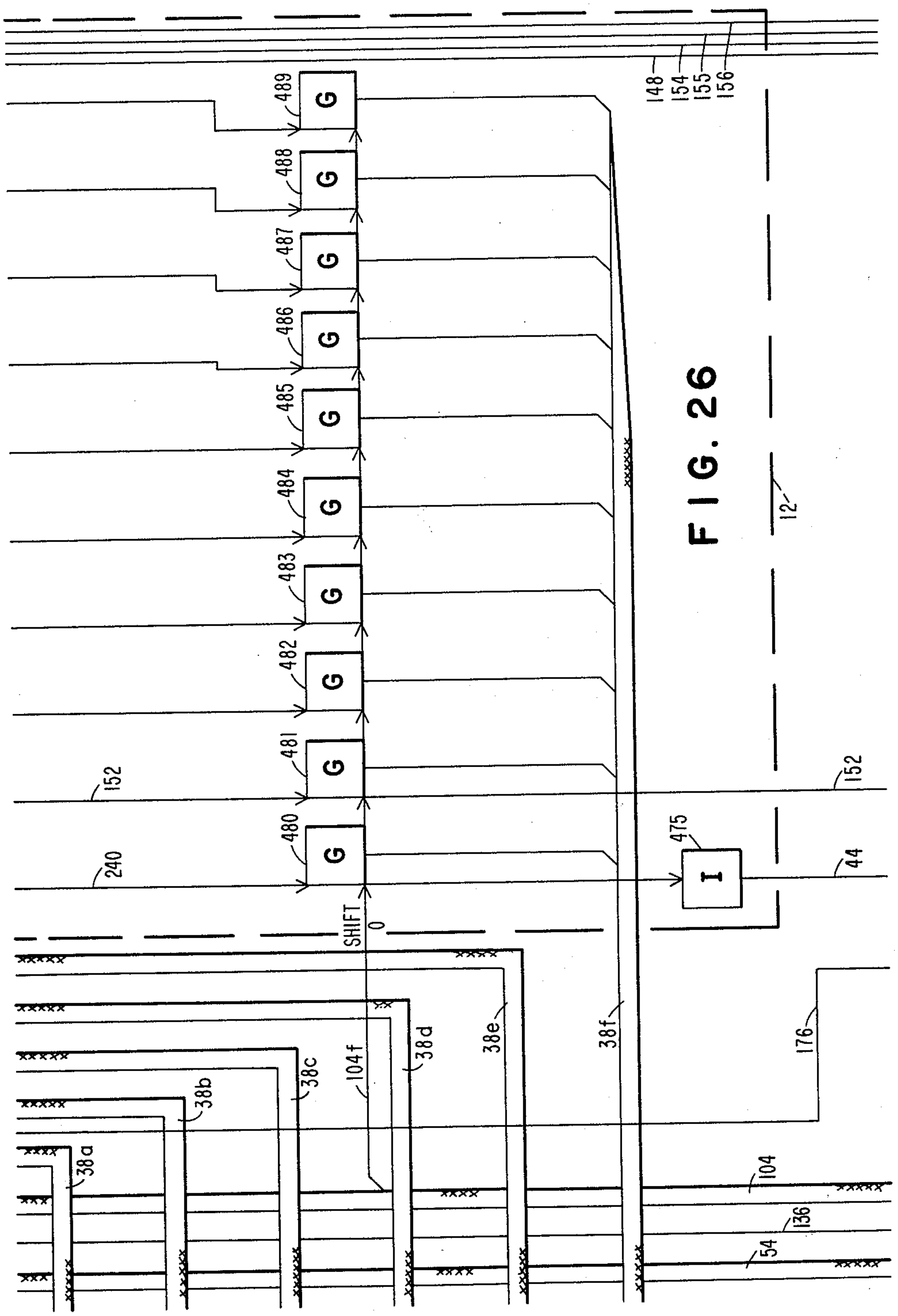

A first row of gates 280, and 282 through 311 in FIGS. 16 through 19 are termed the shift one gates, a second row of gates 320 and 323 through 353 are termed the shift two gates, a third row of gates 360 and 364 through 393 are termed the shift three gates, a fourth row of gates 400, 401 and 405 through 433 are termed the shift four gates, a fifth row of gates 440, 441 and 446 through 473 are termed the shift five gates, and a sixth row of gates 480 through 489 in FIG. 26 are termed the shift zero gates. A certain row of these gates is conditioned in response to a shift request signal. The shift request signals are supplied to these gates through the cable 104 (FIGS. 16, 20 and 26). A line **104*a* is connected from the cable 104 to the shift one gates in FIG. 16. Likewise, lines 104*b*, 104*c*, 104*d*, 104*e* and 104*f* are connected from the cable 104 to the shift two, three, four, five and zero gates respectively. The line 104*f* also is connected through an inverter 237 in FIG. 16 to gate 235. The inverter 237 supplies a signal to the gate 235 when a shift of zero is requested to decondition the gate 235 and prevent a latch control signal on the line 136 from affecting the individual latch registers 210 through 230**.

Figure 24:
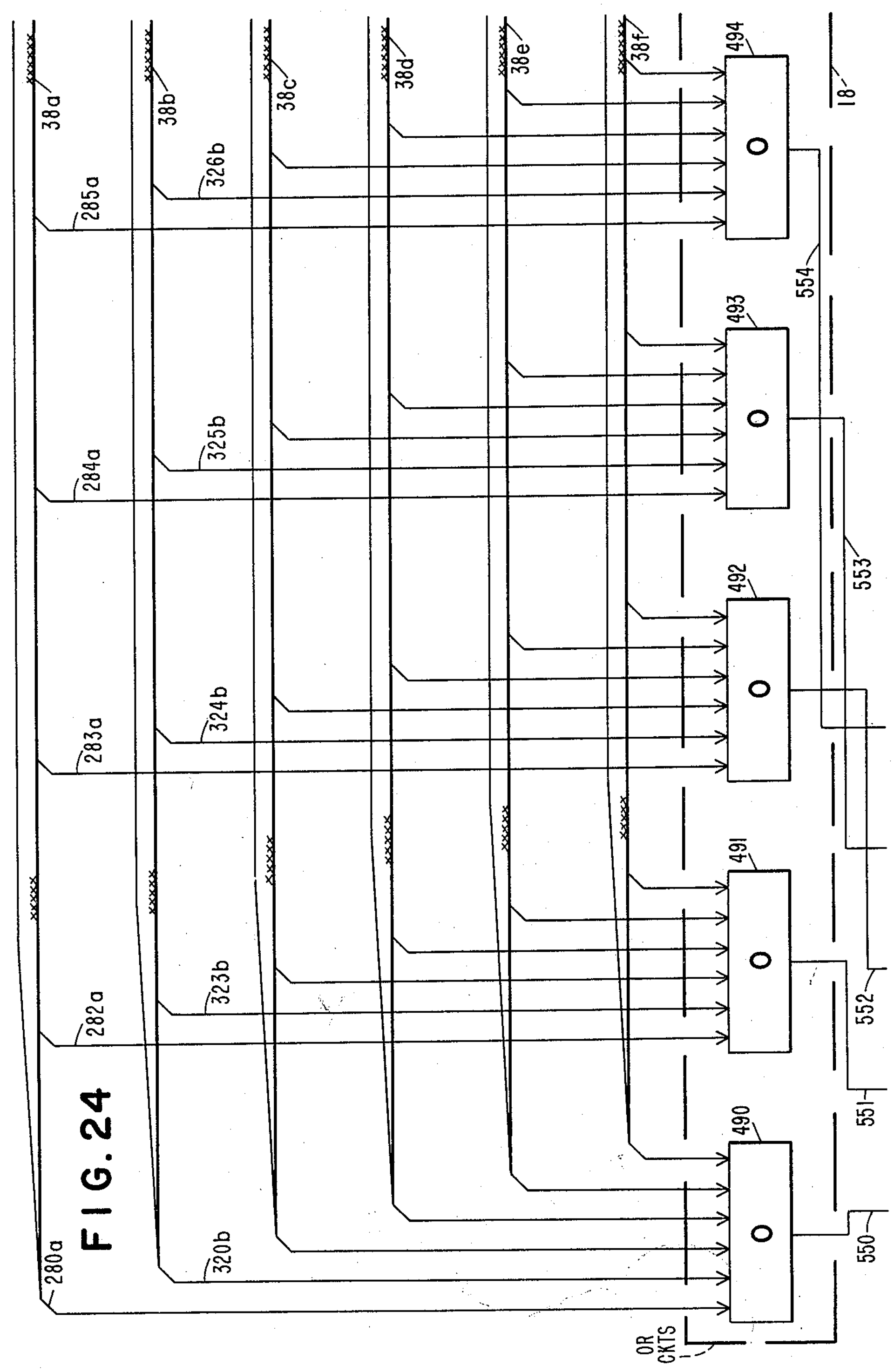
Figure 25:
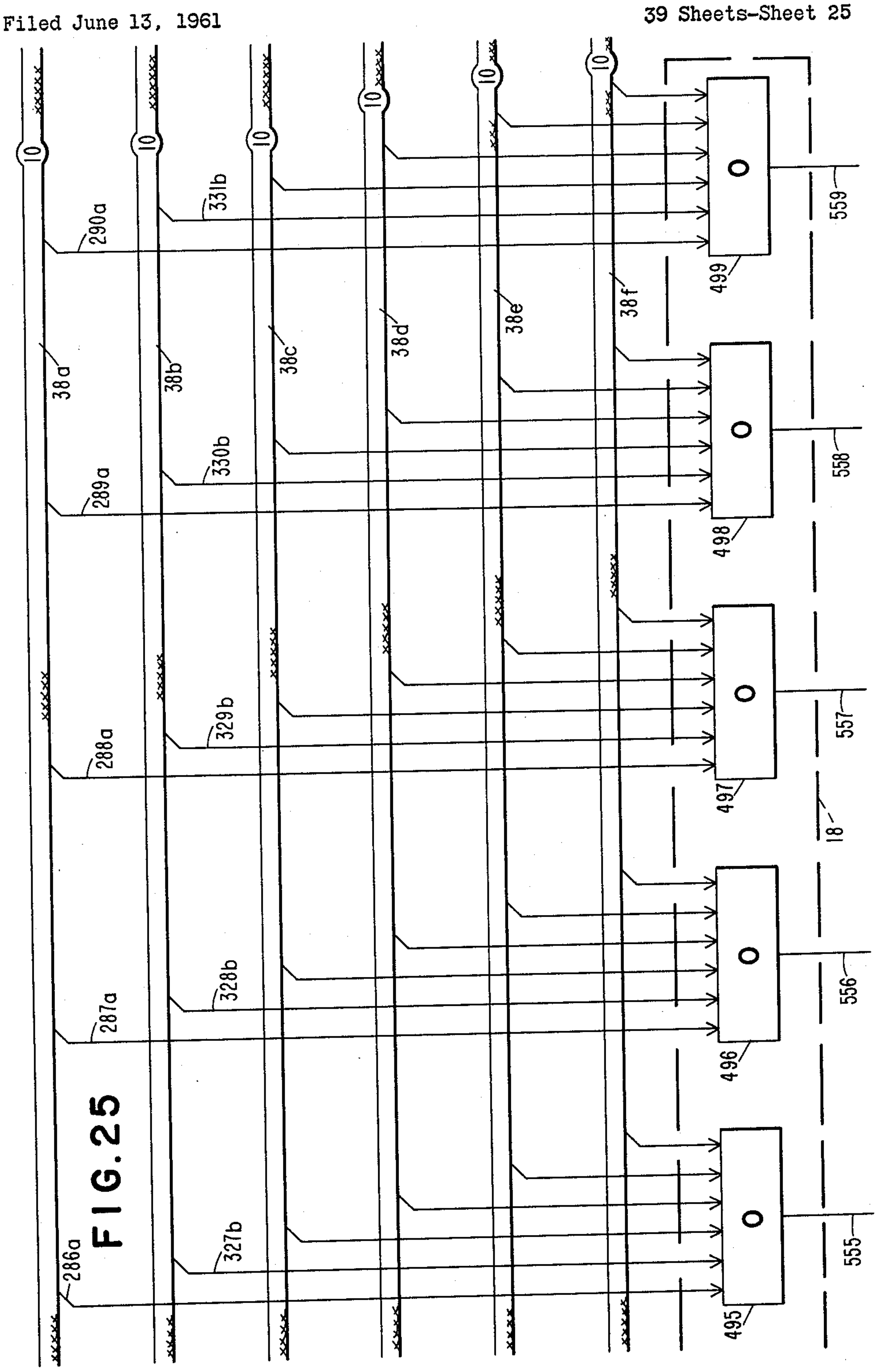

Output lines 280a and 282a through 290a are connected from the respective shift one gates 280 and 282 through 290 through the cable 38a to respective OR circuits 490 through 499 in FIGS. 24 and 25. The gates 320 and 323 through 331 are connected through respective output lines 320b and 323b through 331b and the cable 38b to the OR circuits 490 through 499 respectively. The outputs from the shift three gates 360 and 364 through 372, the shift four gates 400, 401 and 405 through 413, the shift five gates 440, 441 and 446 through 454, and the shift zero gates 480 through 489 are connected through respective cables 38c, 38d, 38e and 38f to the OR circuits 490 through 499 in FIGS. 24 and 25 in a like manner.

Figure 13:
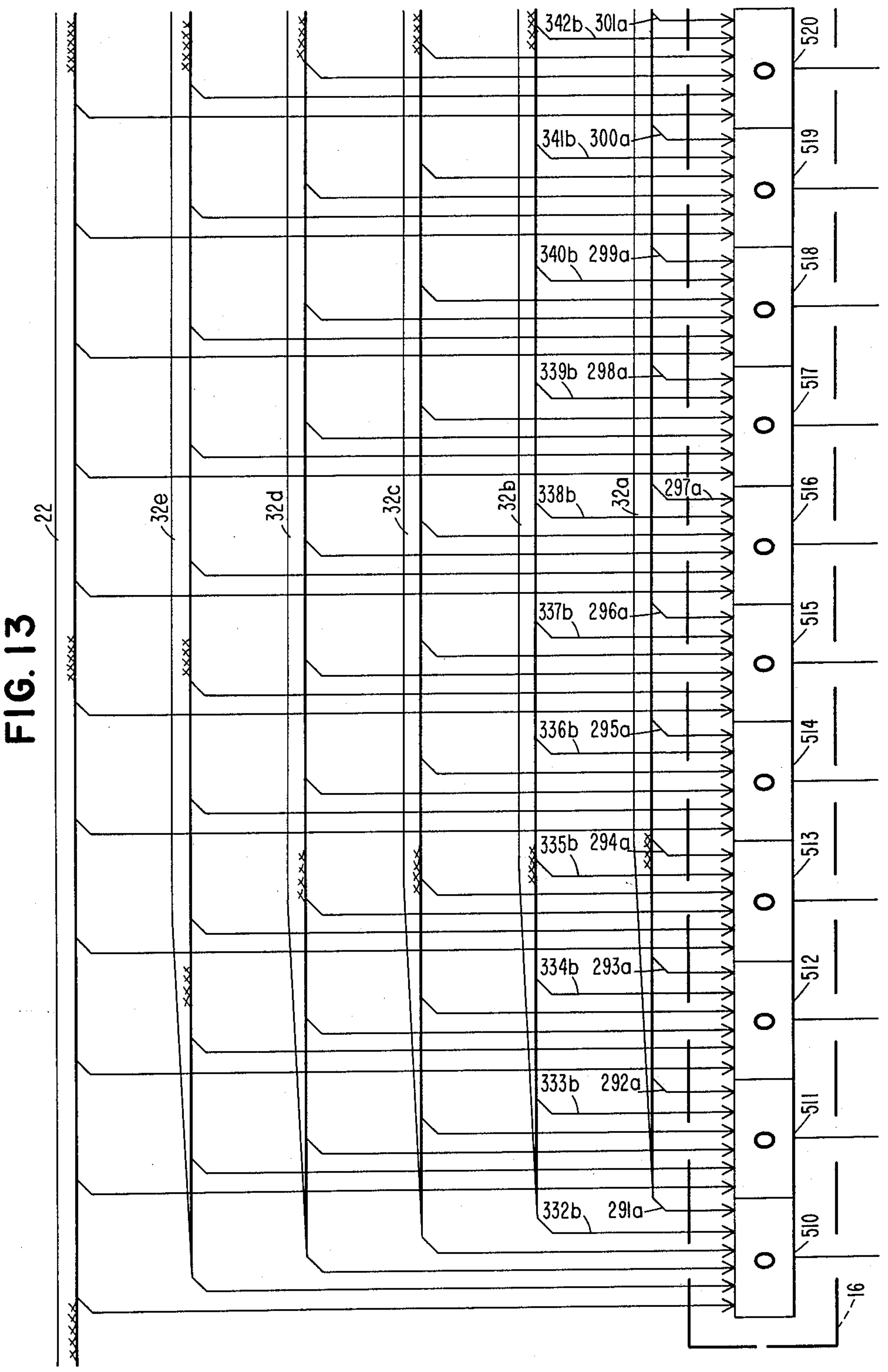
Figure 14:
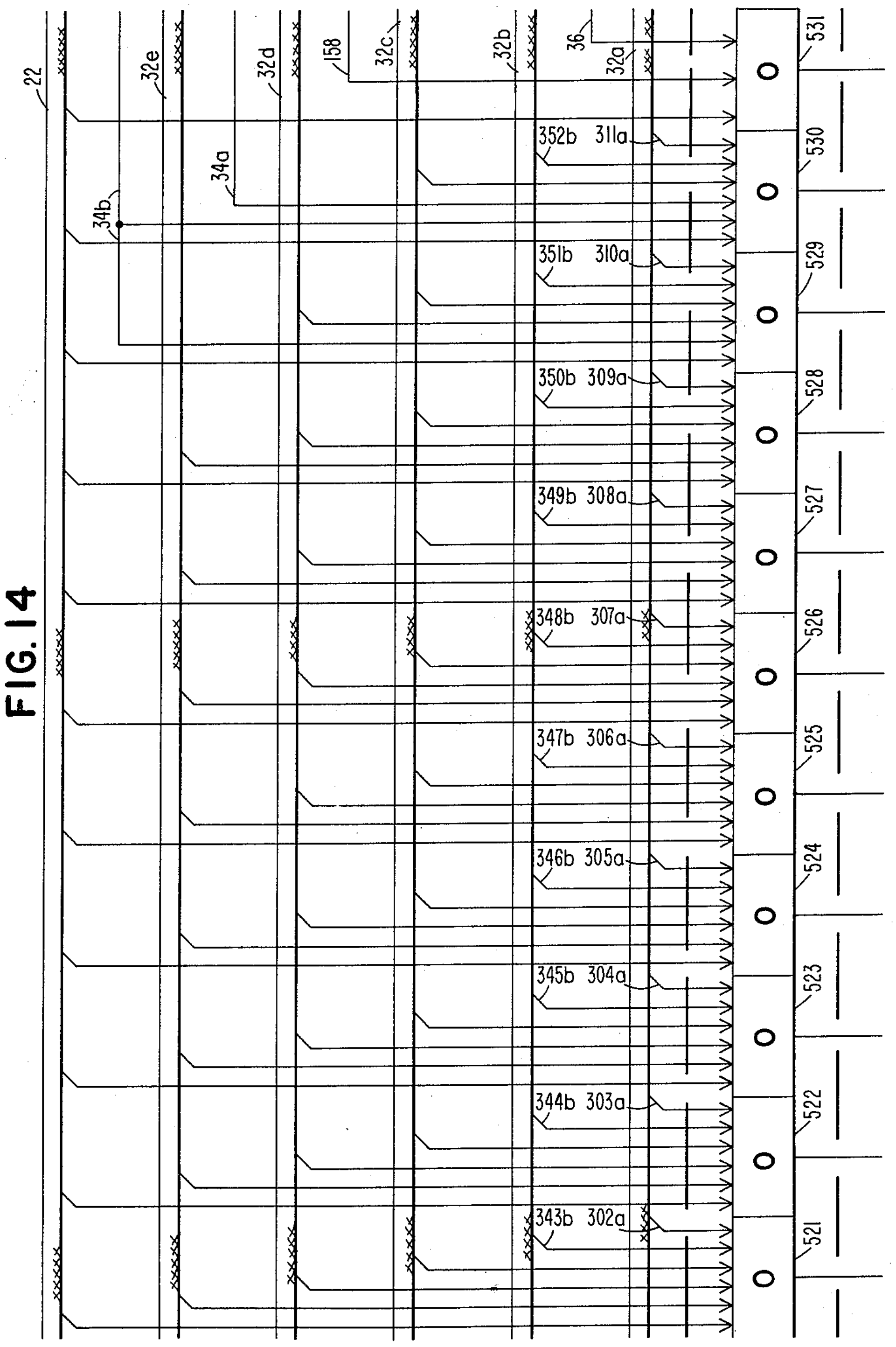
Figure 17:
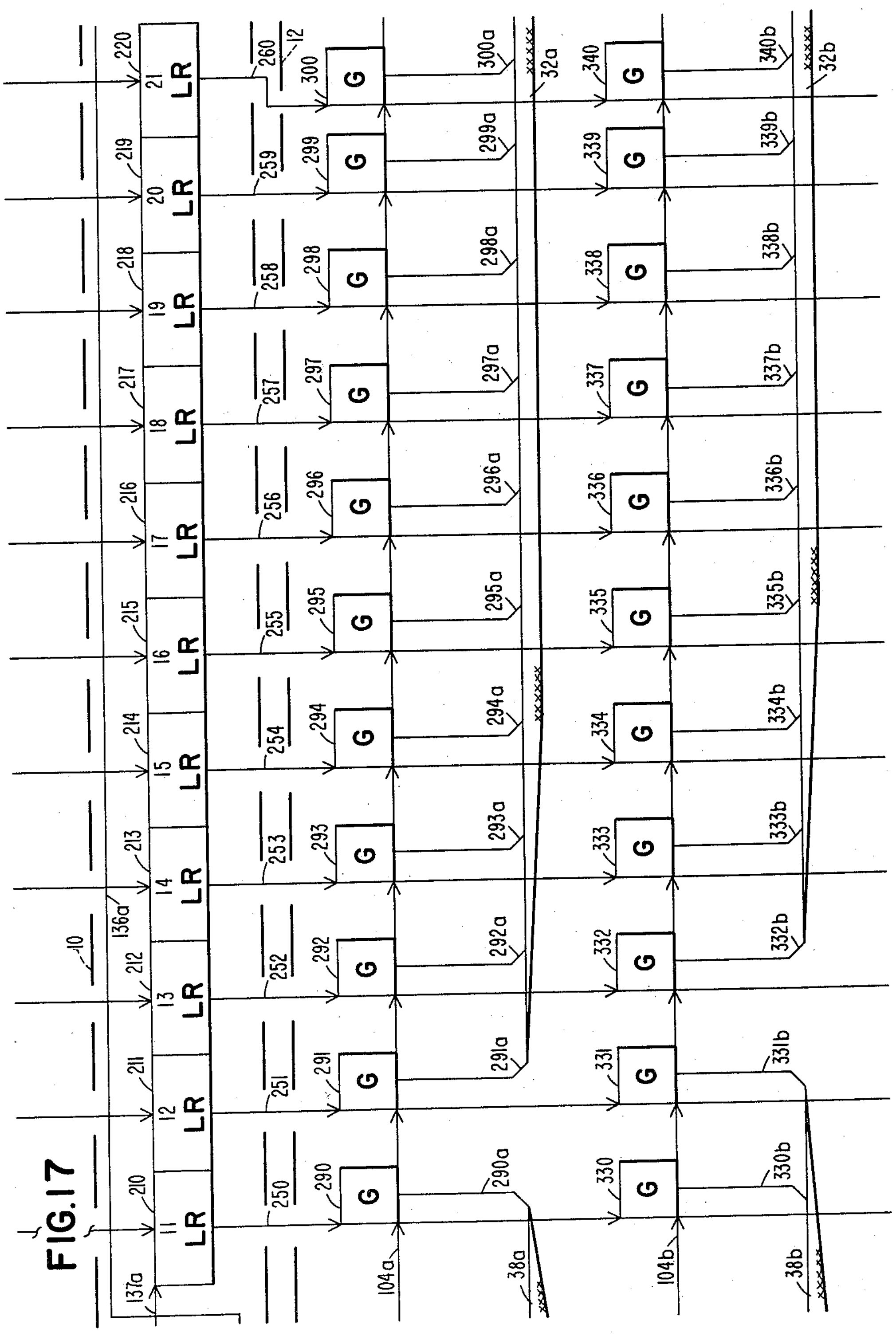
Figure 21:
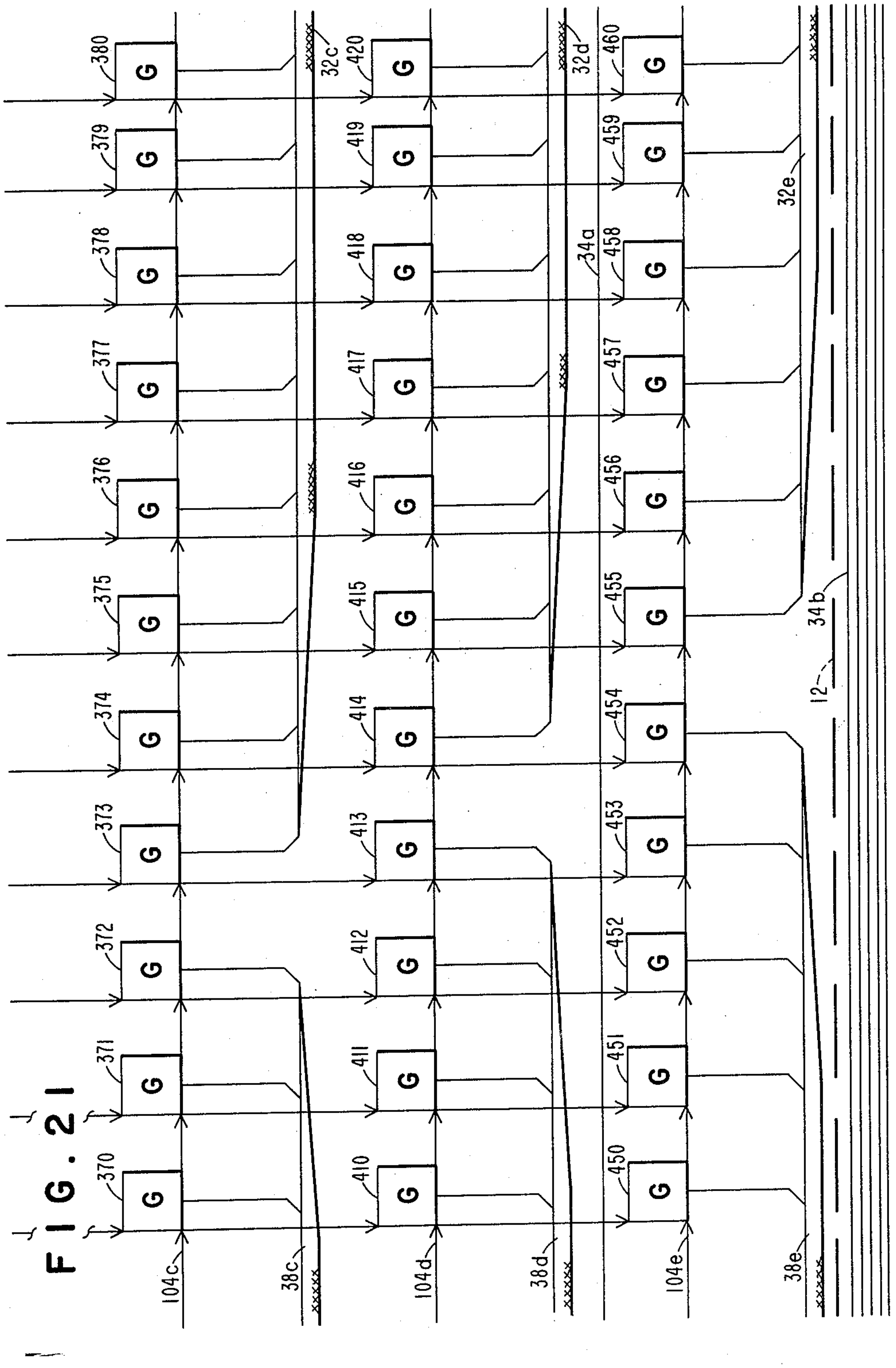
Figure 22:
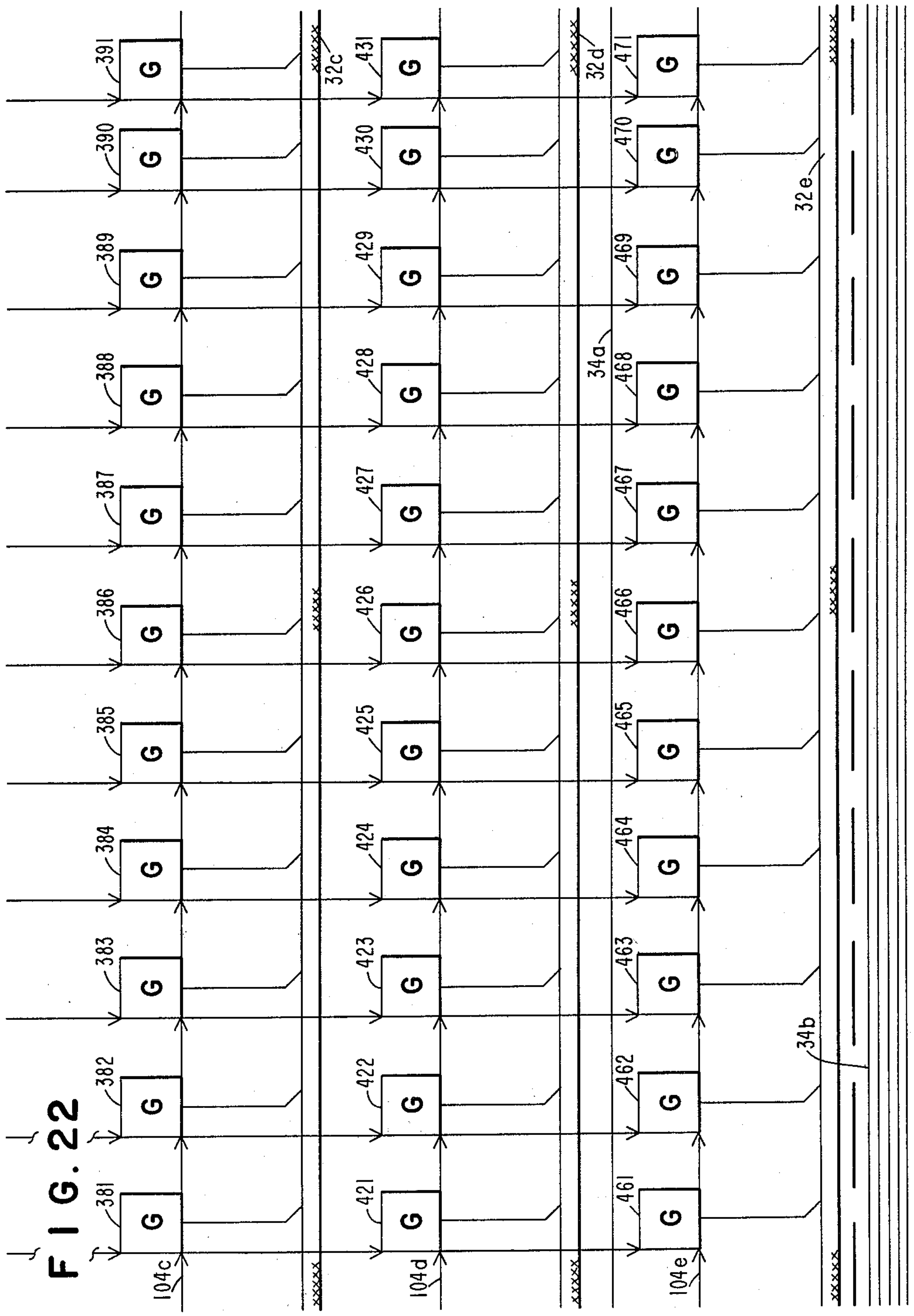
Figure 23:
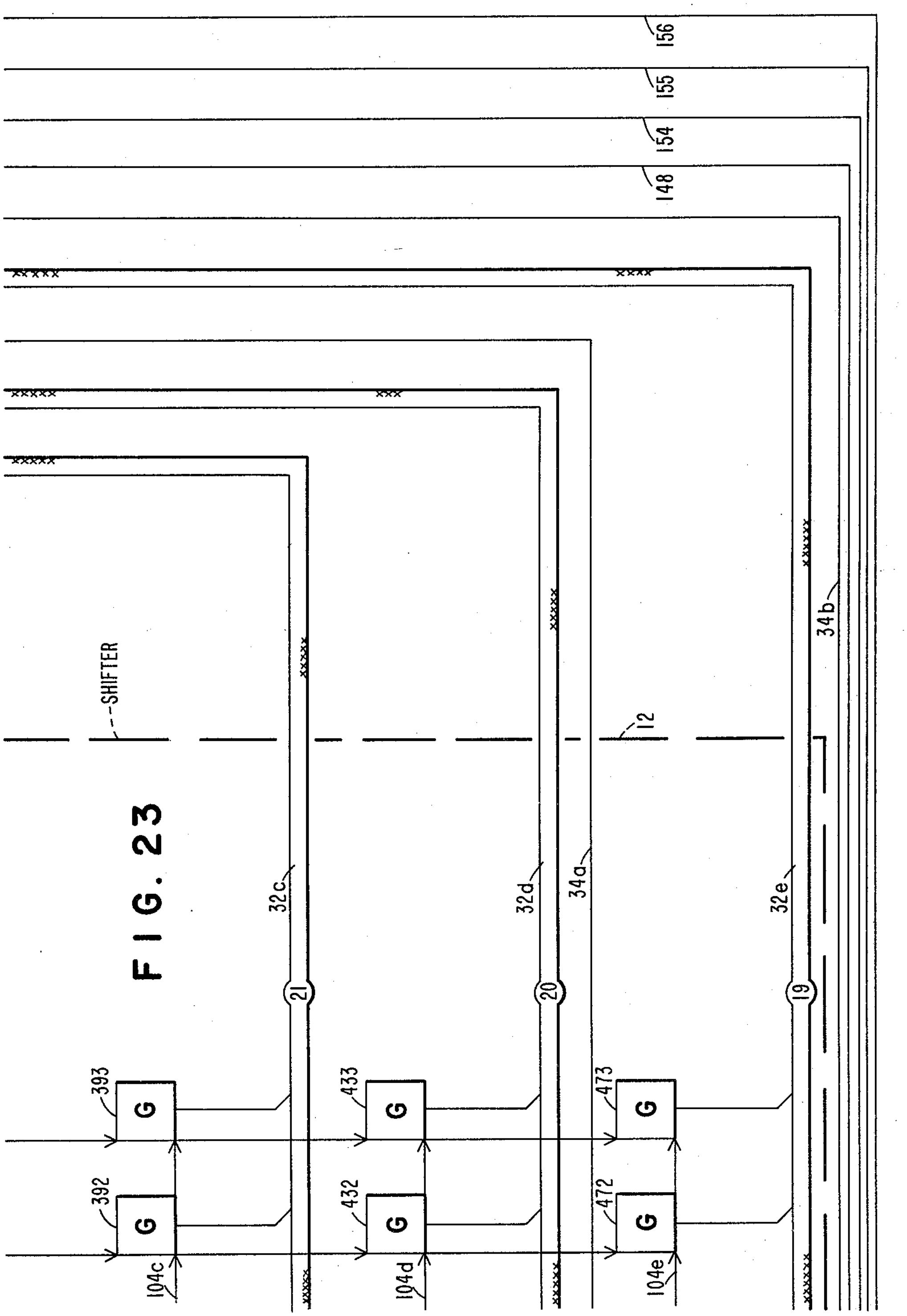

The outputs from the shift one gates 291 through 311 are connected through respective lines 291a through 311a and the cable 32a to OR circuits 510 through 530, respectively, in FIGS. 13 and 14. The outputs from the shift two gates 332 through 352 in FIGS. 17 through 19 are connected through respective lines 332b through 352b and the cable 32b to the OR circuits 510 through 530 in FIGS. 13 and 14. The outputs from the shift three gates 373 through 393 in FIGS. 21 through 23 are connected through the cable 32c to the respective OR circuits 510 through 530. The shift four gates 414 through 433 in FIGS. 21 through 23 are connected through a cable 32d to the respective OR circuits 510 through 529. The outputs of the shift five gates 455 through 473 are connected through a cable 32e to the respective OR circuits 510 through 528.

A line 34a, which is within the cable 34 connected between the shifter 12 and the OR circuits 16 in FIG. 1, is connected from the shift four gate 401 in FIG. 20 to the OR circuit 530 in FIG. 14. In a similar manner, a line 34b is connected from the shift five gate 441 in FIG. 20 to the OR circuits 529 and 530 in FIG. 14.

Figure 12:
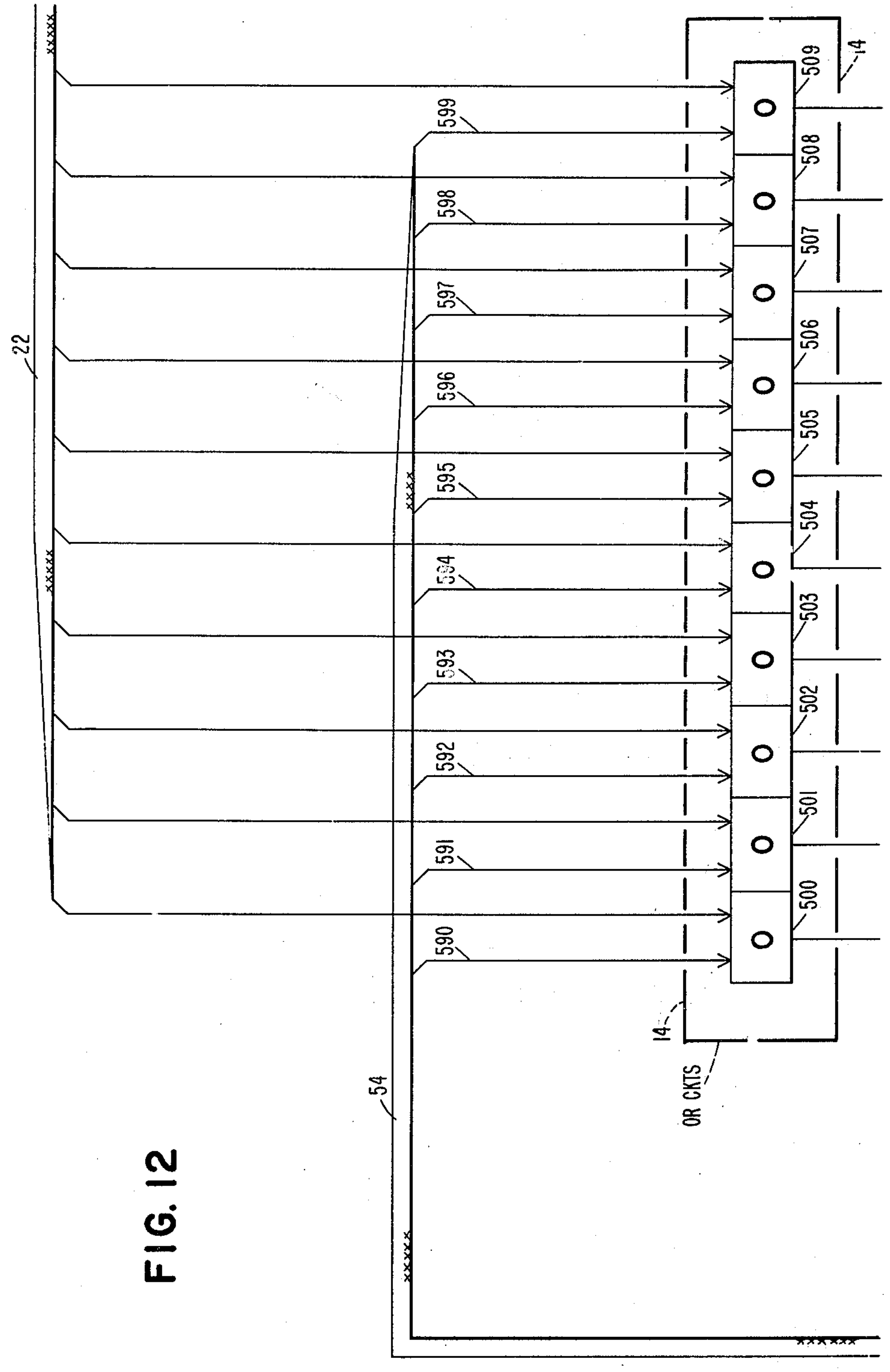
Figure 15:
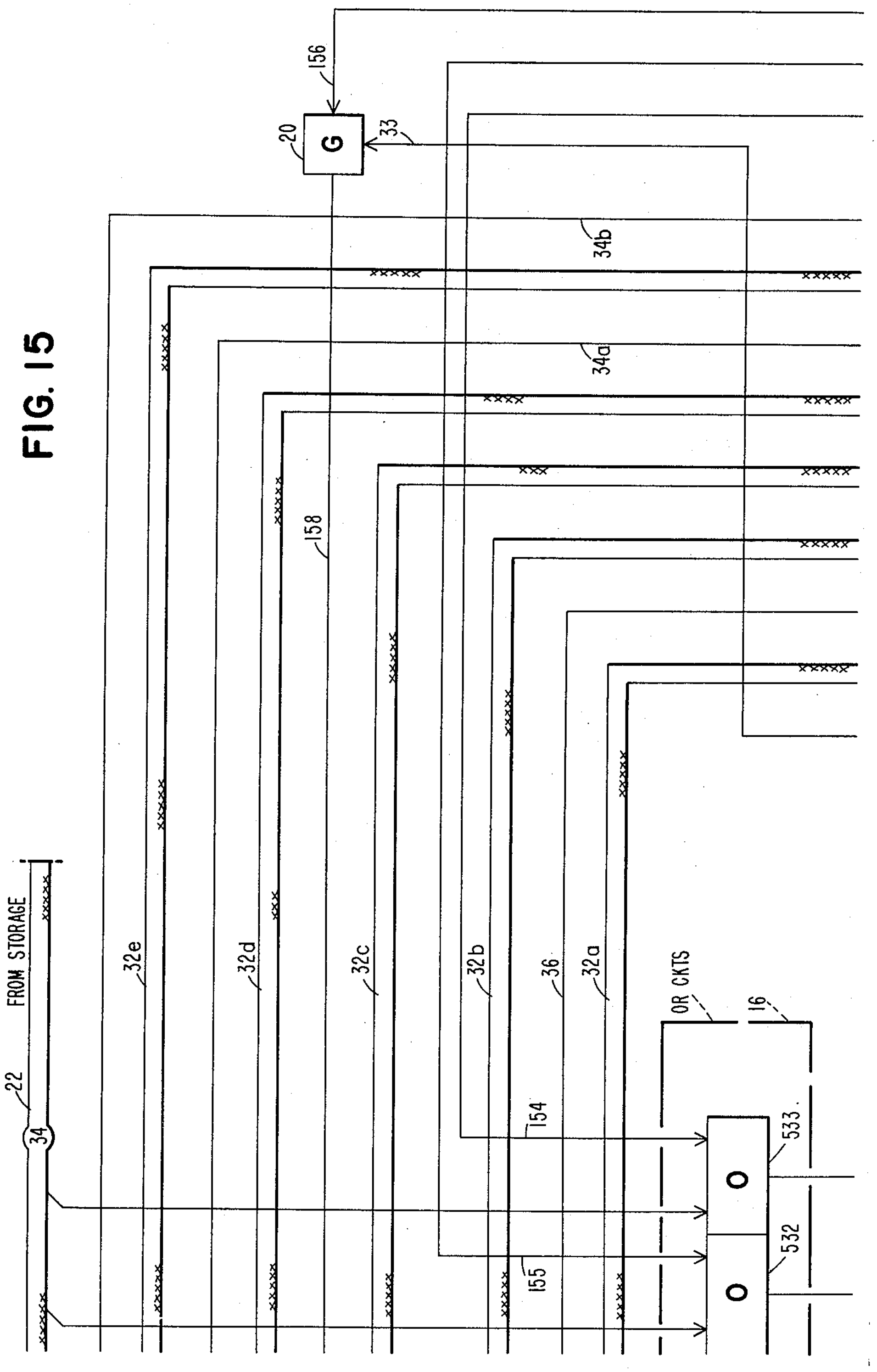

The OR circuits 14, shown in block form in FIG. 1, include OR circuits 500 through 509 in FIG. 12. The OR circuits 16, shown in block form in FIG. 1, include the OR circuits 510 through 533 in FIGS. 13 through 15. The cable 22 (FIG. 15) includes thirty-four lines each of which is connected to one of the OR circuits 500 through 533 in FIGS. 12 through 15. The outputs from the OR circuits 500 through 509 in FIG. 12 are connected as inputs to the individual latch registers 200 through 209 in FIG. 16. The outputs from the OR circuits 510 through 533 in FIGS. 13 through 15 are connected as inputs to the individual latch registers 210 through 233 in FIGS. 17 through 19. The cable 54 (FIG. 12) includes nine lines 590 through 599 which are connected to the respective OR circuits 500 through 509. The cable 22 supplies the initial dividend through the OR circuits 500 through 533 to the latch registers 200 through 233. The cable 54 returns a partial dividend from the adders to the latch registers 200 through 209 through the OR circuits 500 through 509.

The line 148 (FIG. 19), which supplies a signal when the three-fourths times divisor is used, is connected as an input to the latch register 234 in FIG. 19. The line 156 is connected from the quotient generator to the gate 20 in FIG. 15. The gate 20 is connected through the line 158 and the OR circuit 531 to the latch register 231 in FIG. 18. The line 156, the gate 20 and the line 158 supply the X quotient bit. The line 155, which supplies the Y quotient bit, is connected through the OR circuit 532 to the latch register 232 in FIG. 19. The line 154, which supplies the Z quotient bit, is connected through the OR circuit 533 to the latch register 233. The output of the latch register 234 in FIG. 19 is connected through the line 26 to an AND circuit 355. The line 104b also is connected to the AND circuit 355. The output of the AND circuit 355 is connected to a gate 354 and an inverter 356. The output of the shift two gate 353 is connected to the gate 354. The output of the gate 354 is connected through the line 36 and the OR circuit 531 to the latch register 231 in FIG. 18. This gate 354 supplies the Z quotient bit stored in the latch register 233 to the X quotient bit latch register 231 in FIG. 18 when the use of the three-fourths times divisor is followed by a shift of two. The inverter 356 in FIG. 19 is connected through the line 33 to the gate 20 to suppress the entry of a newly generated X quotient bit in this case. The operation of these circuits will be described in greater detail subsequently.

Figure 27:
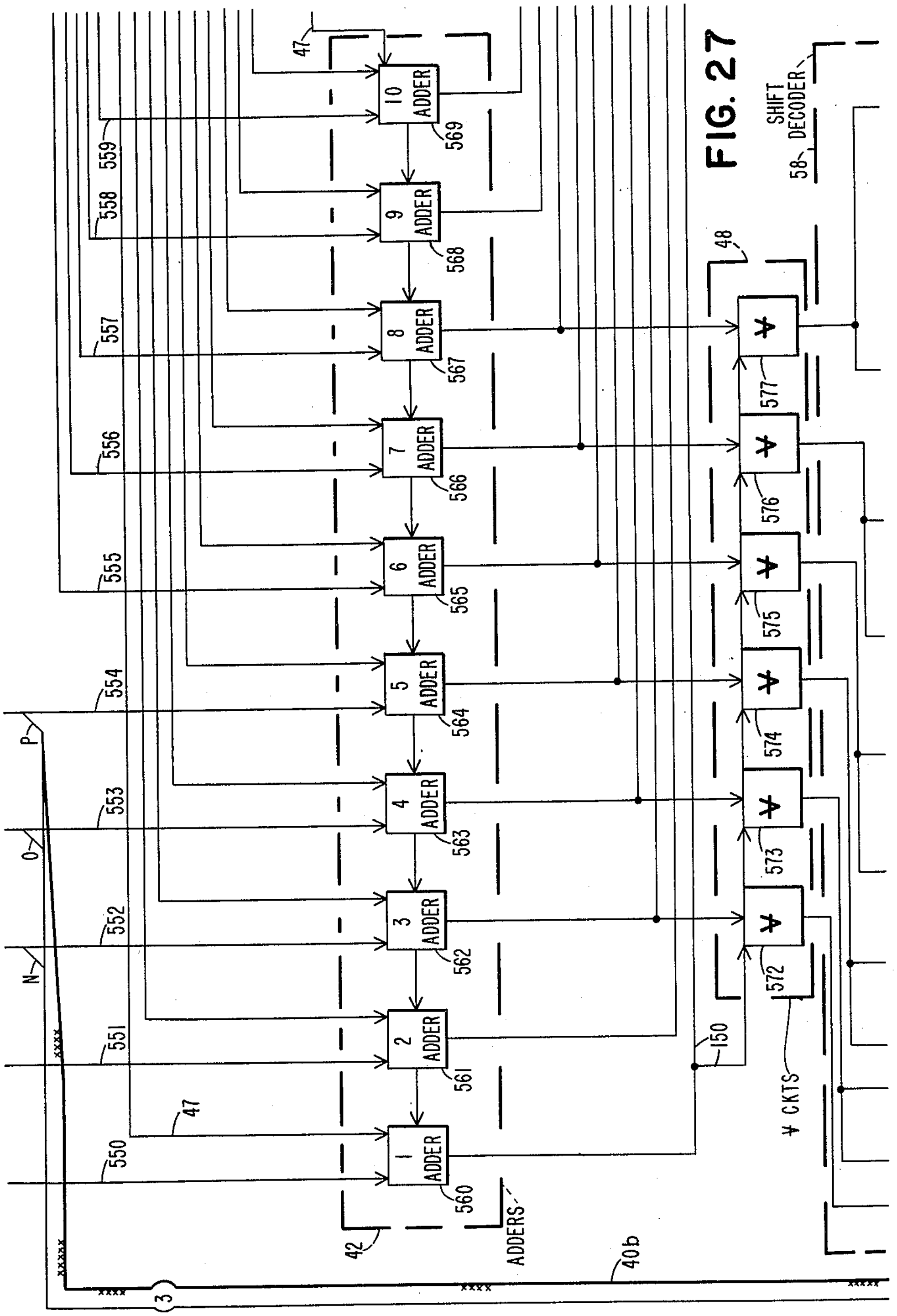

The outputs of the OR circuits 490 through 499 in FIGS. 24 and 25 are connected through respective lines 550 through 559 to adders 560 through 569, respectively, shown within the dashed line box 42 in FIG. 27. The true/complement line 44 is connected from the inverter 475 in FIG. 26, through the gate 45 in FIG. 28 and through the line 47 to the low order adder 569 in FIG. 27. This line 47 serves to force a one into the adder 569 whenever the complement of the divisor is used.

The output from the adder 560 in FIG. 27 is connected through the line 150 to exclusive OR circuits 572 through 577. The outputs of the adders 562 through 567 are connected to the respective exclusive OR circuits 572 through 577. The outputs of the adders 560 through 569 are connected to respective gates 580 through 589 in FIG. 28. The outputs of the gates 580 through 589 are connected through respective lines 590 through 599 and the cable 54 to the OR circuits 500 through 509, respectively, in FIG. 12. A line 52 is connected to each of the gates 580 through 589 to supply a negative inhibit signal to decondition these gates when initially storing information in the divider.

Figure 28:
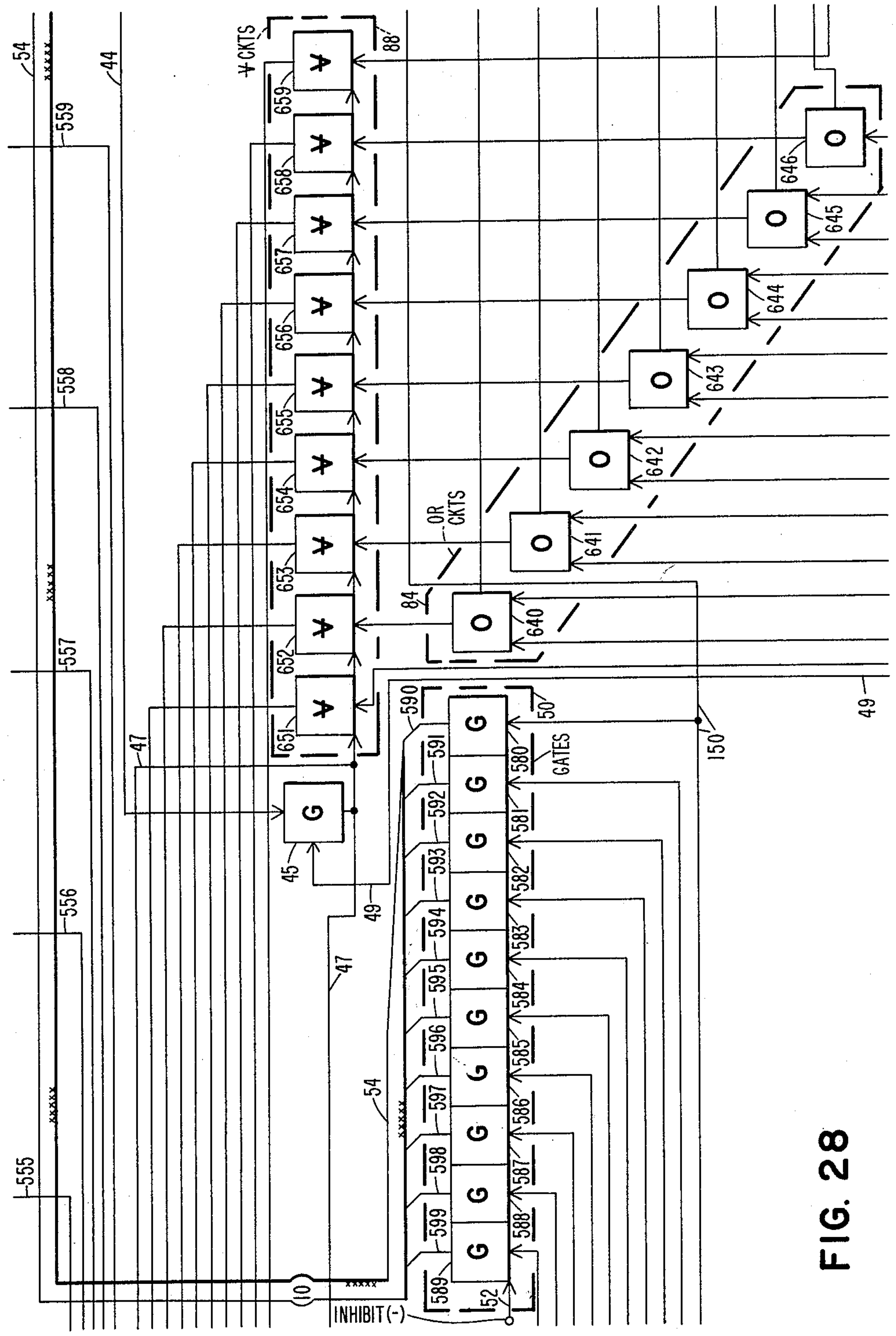
Figure 29:
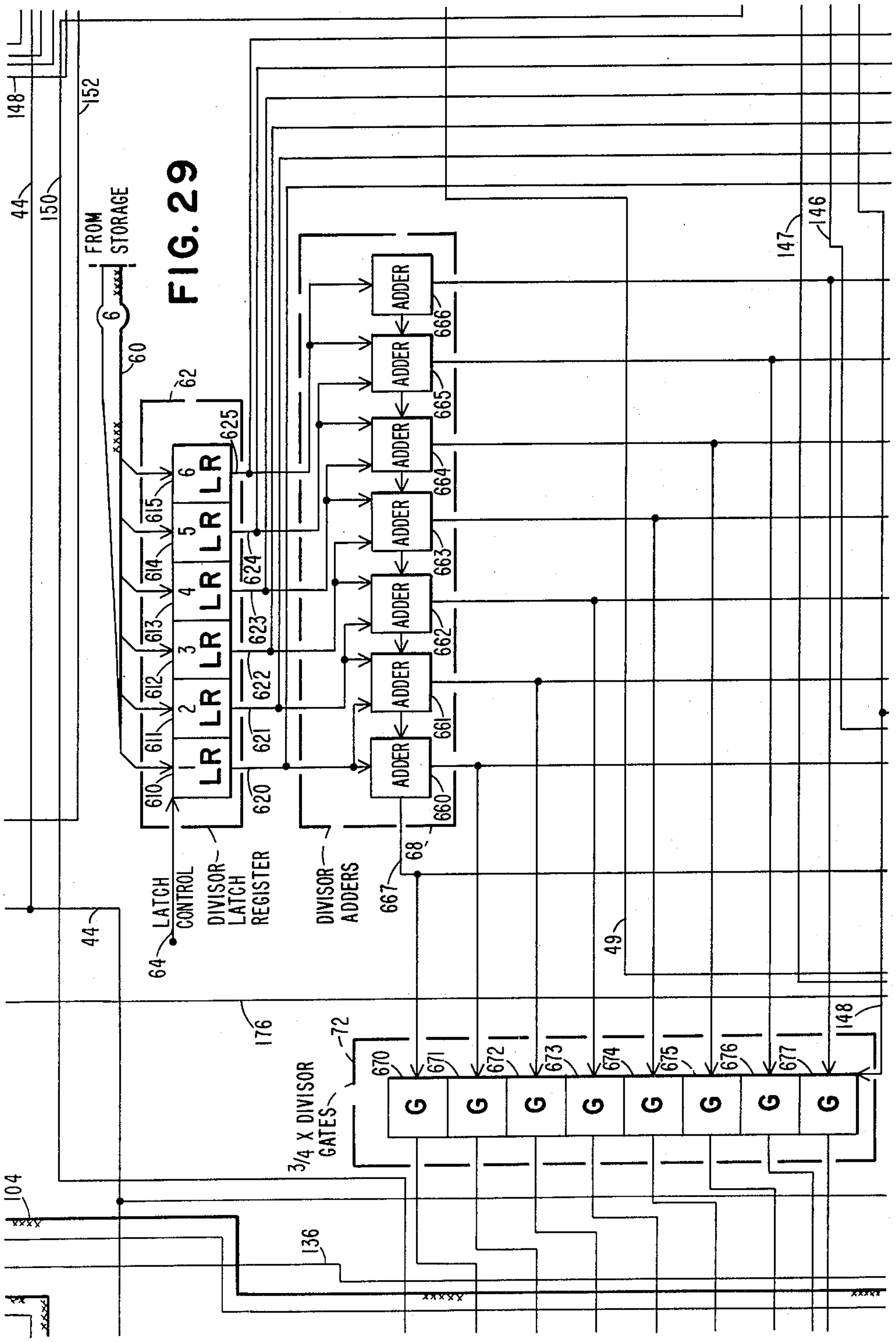

The divisor latch register shown within the dashed line box 61 in FIG. 29 includes six individual latch registers 610 through 615. The cable 60 is connected from a storage device (not shown) to the latch registers 610 through 615. The latch control line 64 is connected to each of the latch registers 610 through 615. The outputs from the latch registers 610 through 615 are connected through respective lines 620 through 625 to one times divisor gates 630 through 635 in FIG. 33. The outputs from the one times divisor gates 630 through 635 are connected to respective OR circuits 640 through 645 in FIG. 28. The outputs of the OR circuits 640 through 645 are connected to exclusive OR circuits 652 through 657, respectively. The line 146 is connected from the multiple selector shown within the dashed line box 140 in FIGS. 36 and 37 to each of the one times divisor gates 630 through 635 in FIG. 33.

The outputs from the divisor latch registers 610 through 615 are connected through the respective lines 620 through 625 to divisor adders 660 through 666, respectively, in FIG. 29. The line 620 also is connected to the adder 661, and the line 621 also is connected to the adder 662. The line 662 is connected to the adder 663, and the line 623 is connected to the adder 664. The line 624 is connected to the adder 665 and the line 625 is connected to the adder 666. The carry output from the adder 660 is connected through a line 667 to a three-fourths times divisor gate 670, and to a three-halves times divisor gate 680 in FIG. 33. The outputs from the adders 660 through 666 are connected to respective three-fourths times divisor gates 671 through 677, and to respective three-halves times divisor gates 681 through 687 in FIG. 33. The divisor adders 660 through 666 in FIG. 29 serve to provide one and one-half times the divisor applied to their inputs, i.e., these adders serve to add the one-times divisor with the one-half times divisor (which is the one-times divisor shifted one position to the right).

Figure 36:
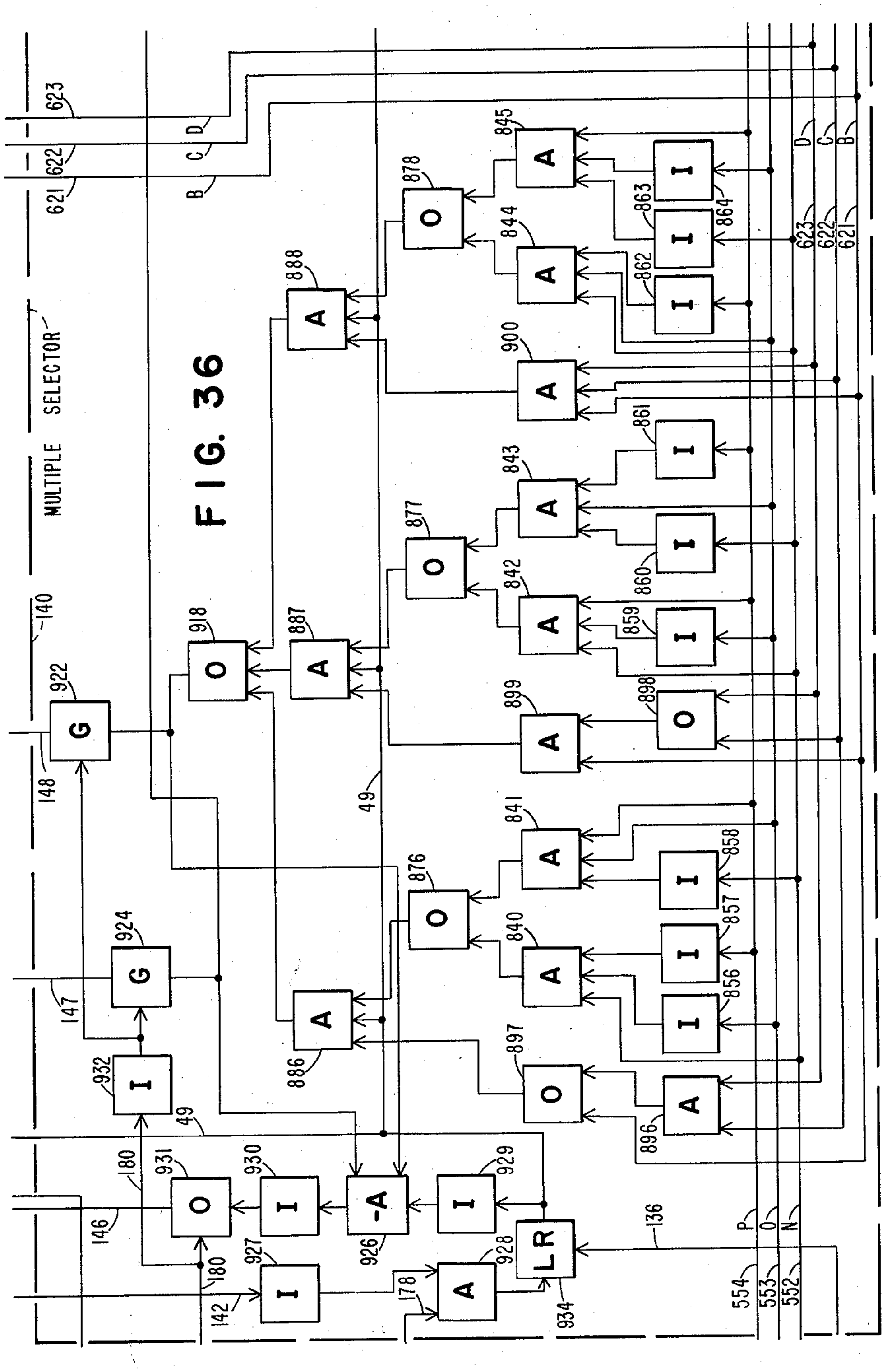

The line 148 is connected from the multiple selector 140 in FIGS. 36 and 37 to each of the three-fourths times divisor gates 670 through 677 in FIG. 29. The outputs of the gates 670 through 675 are connected to the respective OR circuits 640 through 645 in FIG. 28. The output of the three-fourth times divisor gate 676 in FIG. 29 is connected through an OR circuit 646 in FIG. 28 to an exclusive OR circuit 658. The output of the three-fourths times divisor gate 677 in FIG. 29 is connected to an exclusive OR circuit 659 in FIG. 28.

Figure 33:
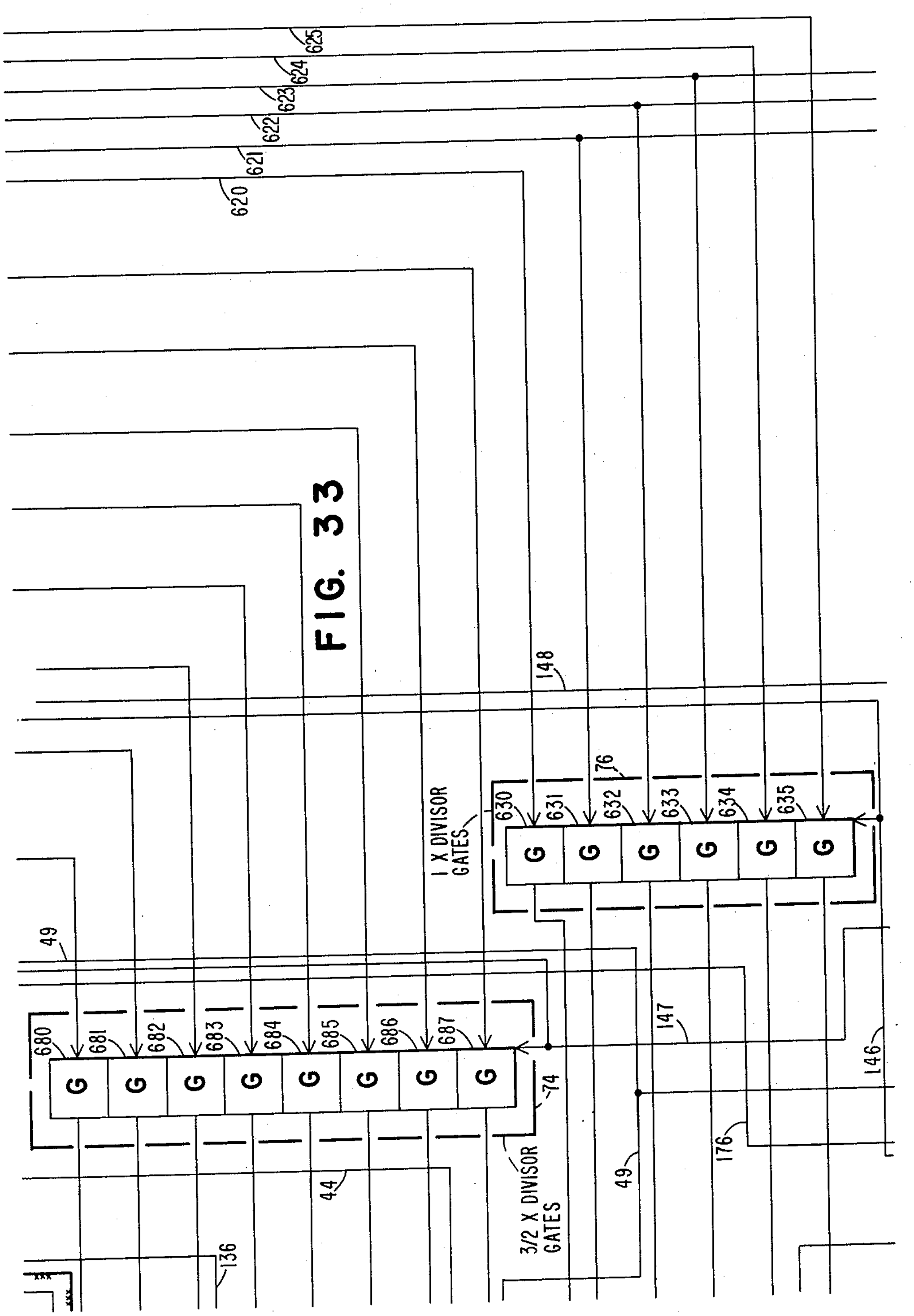

The line 147 is connected from the multiple selector 140 in FIGS. 36 and 37 to each of the three-halves times divisor gates 680 through 687. The outputs of the three-halves times divisor gates 681 through 687 are connected to the respective OR circuits 640 through 646 in FIG. 28. The output of the three-halves times divisor gate 680 in FIG. 33 is connected to an exclusive OR circuit 651 in FIG. 28. The OR circuits 640 through 646 in FIG. 28 and the exclusive OR circuits 651 through 659 serve to shift the three-fourths times divisor with respect to the three-halves times divisor, and to provide at their outputs the true value or the one's complement of the one times divisor, the three-fourths times divisor or the three-halves times divisor. The true/complement line 44 is connected through the gate 45 and the line 47 in FIG. 28 to each of the exclusive OR circuits 651 through 659. This line 47 also is connected to the adder 560 in FIG. 27. The outputs of the exclusive OR circuits 651 through 659 in FIG. 28 are connected to the respective adders 561 through 569 in FIG. 27.

Figure 31:
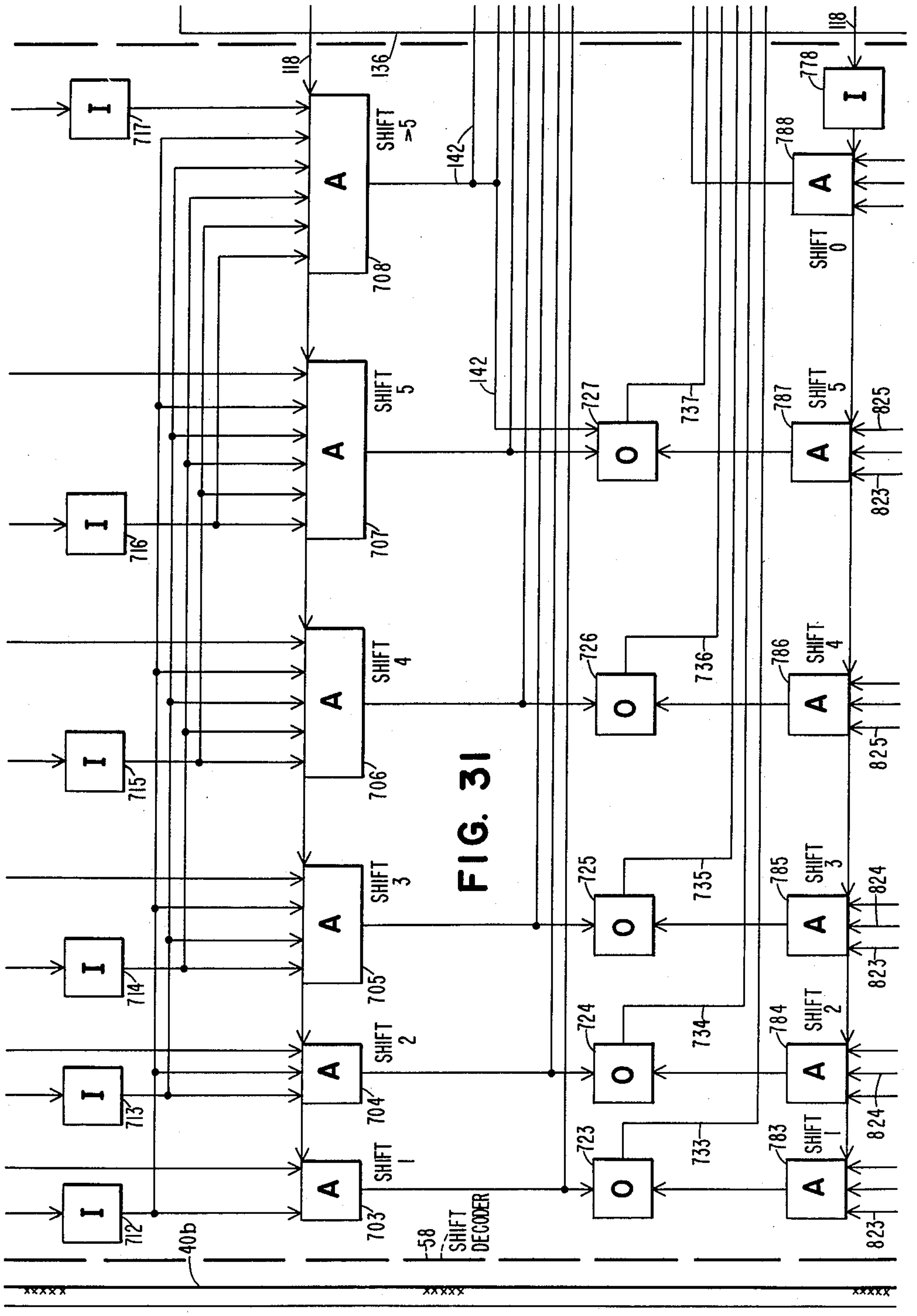
Figure 32:
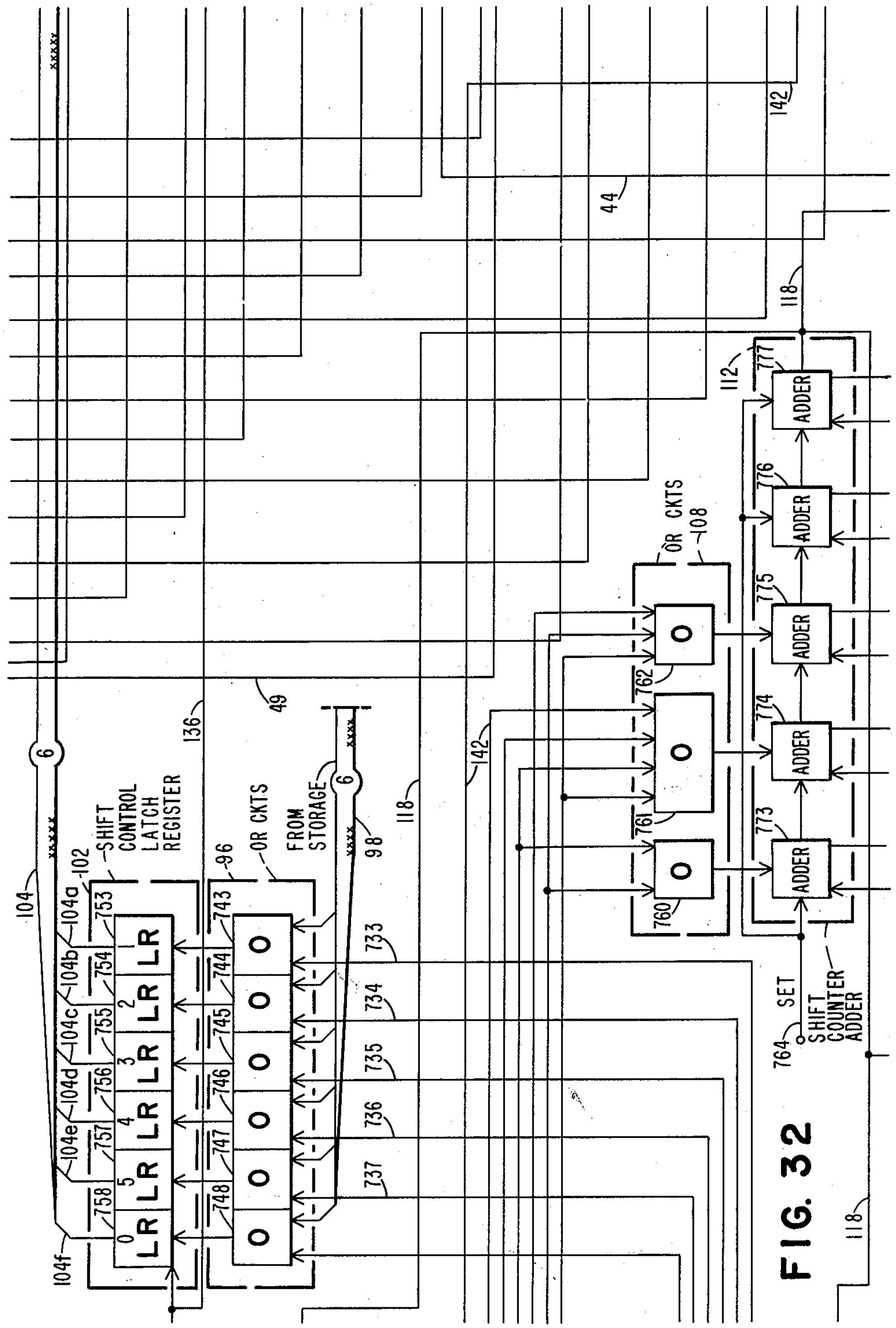
Figure 34:
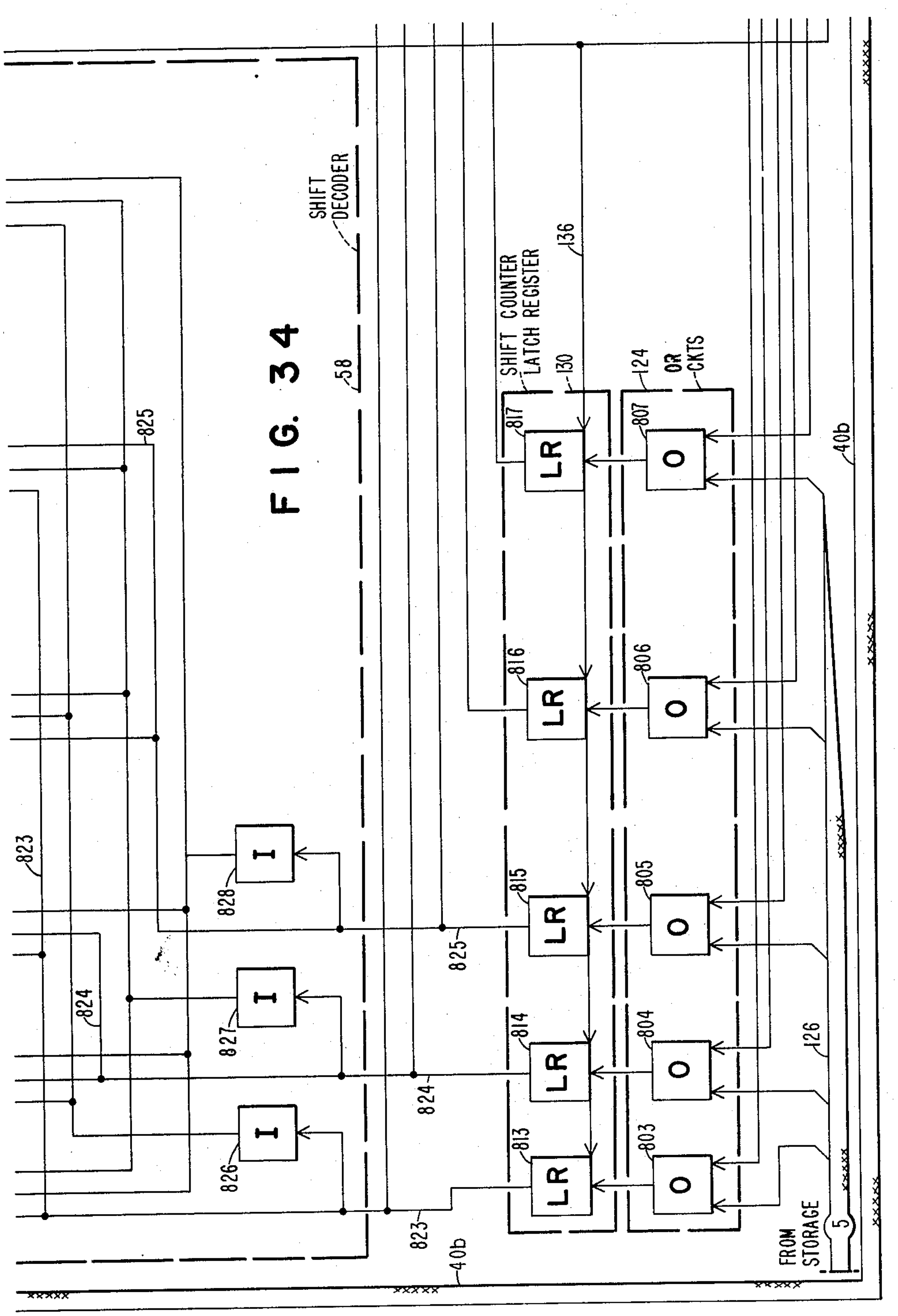

The shift decoder is shown within the dashed line box 58 in FIGS. 27, 31 and 34. The exclusive OR circuits 573 through 577 in FIG. 27 are connected to respective AND circuits 703 through 707 in FIG. 31. The exclusive OR circuits 572 through 577 are connected to respective inverters 712 through 717 in FIG. 31. The output of the inverter 712 is connected to the AND circuits 703 through 707 and an AND circuit 708. The output of the inverter 713 is connected to the AND circuits 704 through 708, and the output of the inverter 714 is connected to the AND circuits 705 through 708. The output of the inverter 715 is connected to the AND circuits 706 through 708, and the output of the inverter 716 is connected to the AND circuits 707 and 708. The output of the inverter 717 is connected to the AND circuit 708. The line 118 from the shift counter adder shown within the dashed line box 112 in FIG. 32 is connected to each of the AND circuits 703 through 708. The outputs of the AND circuits 703 through 708, when positive, represent shift one, two, three, four, five or greater than five, respectively.

The outputs of the AND circuits 703 through 707 are connected to respective OR circuits 723 through 727. The output of the AND circuit 708 is connected through the line 142 to the OR circuit 727. The outputs of the OR circuits 723 through 727 are connected through respective lines 733 through 737 to OR circuits 743 through 747 in FIG. 32. The cable 98 is connected to the OR circuits 743 through 747 and an OR circuit 748 from a storage device (not shown). The outputs of the OR circuits 743 through 748 are connected to respective latch registers 753 through 758. The latch control line 136 is connected to each of the latch registers 753 through 758. The outputs of the latch registers 753 through 758 are connected through respective lines 104*a* through 104*f* and the cable 104 to the shift one, two, three, four, five and zero gates, respectively, in FIGS. 16 through 23 and 26.

The outputs of the AND circuits 703 through 708 in FIG. 31 also are connected to OR circuits 760 through 762 in FIG. 32. The output of the AND circuit 703 is connected to the OR circuits 761 and 762 in FIG. 32. The output of the AND circuit 703 is connected to the OR circuits 761 and 762 in FIG. 32. The output of the AND circuit 704 is connected to the OR circuits 760 and 762. The output of the AND circuit 705 is connected to OR circuit 762. The output of the AND circuit 706 is connected to the OR circuits 760 and 761. The outputs from the AND circuits 707 and 708 are connected to the OR circuit 761.

The outputs of the OR circuits 760 through 762 in FIG. 32 are connected to respective adders 773 through 775 in the shift counter adder shown in the dashed line box 112. The shift counter adder includes the adders 773 through 775 and adders 776 and 777. A line 764 is connected to the adders 773, 776 and 777. This line 64 supplies a positive signal to the adders 773, 776 and 777 during a divide operation. The output line 118 from the high order adder 777 is connected to normally condition the AND circuits 703 through 708 in FIG. 31. The line 118 is connected through an inverter 778 in FIG. 31 to AND circuits 783 through 788.

Figure 35:
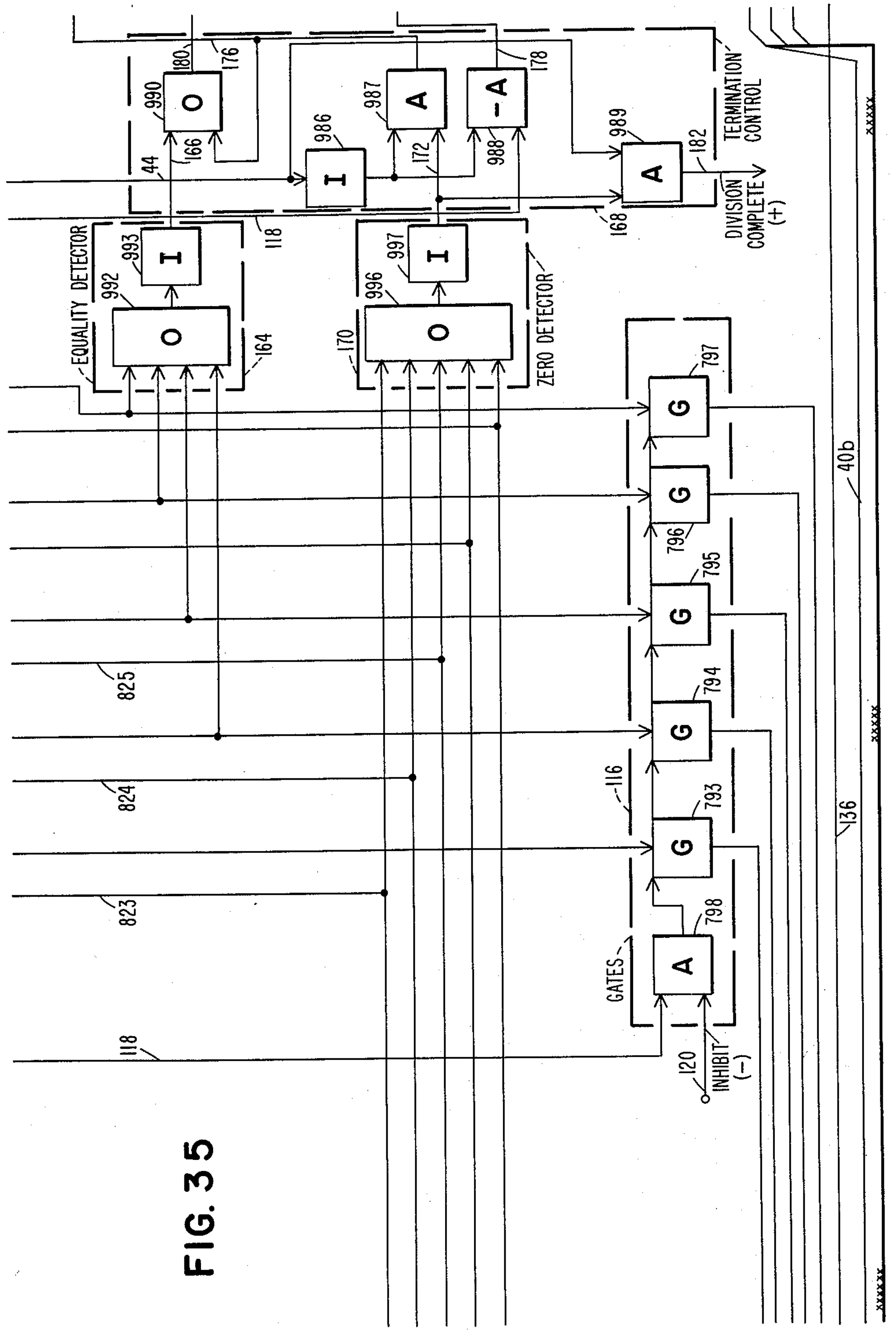

The outputs from the adders 773 through 777 in FIG. 32 are connected through respective gates 793 through 797 in FIG. 35 to OR circuits 803 through 807 in FIG. 34. The line 118 from the adder 777 in FIG. 32 is connected to an AND circuit 798 in FIG. 35. The inhibit line 120 also is connected to the AND circuit 798. The output of the AND circuit 798 is connected to each of the gates 793 through 797.

The cable 126 is connected from a storage device (not shown) to each of the OR circuits 803 through 807 in FIG. 34. The outputs from the OR circuits 803 through 807 are connected to respective latch registers 813 through 817 in the shift counter latch register shown within the dashed line box 130 in FIG. 34. The outputs from the latch registers 813 through 817 are connected to the respective adders 773 through 777 in FIG. 32. The adders 773 through 777 serve to subtract the shift requested from the shift available and supply the result back to the shift counter latch registers 813 through 817.

The latch register 813 in FIG. 34 is connected through a line 823 to the AND circuits 783, 785 and 787 in FIG. 31. The output of the latch register 814 in FIG. 34 is connected through a line 824 to the AND circuits 784 and 785 in FIG. 31. The output of the latch register 815 is connected through a line 825 to the AND circuits 786 and 787. The line 823 from the latch register 813 is connected through an inverter 826 to the AND circuits 784, 786 and 788. The line 824 from the latch register 814 is connected through an inverter 827 to the AND circuits 783, 786, 787 and 788 in FIG. 31. The line 825 from the latch register 815 is connected through an inverter 828 to the AND circuits 783, 784, 785 and 788. The outputs from the AND circuits 783 through 787 are connected to the respective OR circuits 723 through 727. The output from the AND circuit 788 is connected directly to the OR circuit 748 in FIG. 32. The outputs of the AND circuits 783 through 788 represent, when positive, shift one, two, three, four, five, or zero. One of these AND circuits serves to provide the remaining shifts available to the shift control latch register shown within the dashed line box 102 in FIG. 32 whenever the shift requested is larger than the shift available.

The multiple selector is shown within the dashed line box 140 in FIGS. 36 and 37. This selector serves to sense certain dividend bits and certain divisor bits (the one times true divisor) to select one of the three multiples. The multiple selector includes AND circuits 840 through 851 which operate to provide certain outputs in response to certain combinations of three dividend bits. The three dividend bits N, O and P are supplied by the respective OR circuits 492 through 494 in FIG. 24 through the respective lines 552 through 554 and the cable 40*b* to the multiple selector in FIGS. 36 and 37. The line 552 is connected directly to the AND circuit 840, through an inverter 858 to the AND circuit 841, directly to the AND circuit 842, through an inverter 860 to the AND circuit 843, directly to the AND circuit 844 and through an inverter 863 to the AND circuit 845 in FIG. 36. Also, the line 552 is connected directly to the AND circuit 846 in FIG. 37, through an inverter 866 to the AND circuit 847, directly to the AND circuit 848, through an inverter 869 to the AND circuit 849, directly to the AND circuit 850, and through an inverter 871 to the AND circuit 851. The line 553 is connected through an inverter 856 to the AND circuit 840 in FIG. 36, directly to the AND circuit 841, through an inverter 859 to the AND circuit 842, directly to the AND circuit 843, directly to the AND circuit 844 and through an inverter 864 to the AND circuit 845. The line 553 also is connected through an inverter 865 to the AND circuit 846 in FIG. 37, directly to the AND circuit 847, directly to the AND circuit 848, through an inverter 870 to the AND circuit 849, directly to the AND circuit 850 and through an inverter 872 to the AND circuit 851. The line 554 is connected through an inverter 857 to the AND circuit 840 in FIG. 36, directly to the AND circuit 841, directly to the AND circuit 842, through an inverter 861 to the AND circuit 843, through an inverter 862 to the AND circuit 844, and directly to the AND circuit 845. The line 554 also is connected directly to the AND circuit 846 in FIG. 37, through an inverter 867 to the AND circuit 847, through an inverter 868 to the AND circuit 848, directly to the AND circuit 849, directly to the AND circuit 850, and through an inverter 873 to the AND circuit 851.

The outputs from the AND circuits 840 and 841 in FIG. 36 are connected through an OR circuit 876 to an AND circuit 886. The outputs of the AND circuits 842 and 843 are connected through an OR circuit 877 to an AND circuit 887. The outputs from the AND circuits 844 and 845 are connected through an OR circuit 878 to an AND circuit 888. The outputs from the AND circuits 846 and 847 in FIG. 37 are connected through an OR circuit 879 to an AND circuit 889. The outputs from the AND circuits 848 and 849 are connected through an OR circuit 880 to an AND circuit 890. The outputs from the AND circuits 850 and 851 are connected through an OR circuit 881 to an AND circuit 891.

Three divisor bits B, C and D are supplied to the multiple selector in FIGS. 36 and 37 through the respective lines 621 through 623 from the respective divisor latch register 611 through 613 in FIG. 29. The line 621 is connected to an OR circuit 897 in FIG. 36, an AND circuit 899 and an AND circuit 900. The line 621 also is connected through an inverter 902 in FIG. 37 to an AND circuit 901, through an inverter 908 to an AND circuit 906, and through an inverter 914 to the AND circuit 891. The line 622 is connected to an AND circuit 896 in FIG. 36, an OR circuit 898, and the AND circuit 900. The line 622 also is connected through an inverter 903 in FIG. 37 to the AND circuit 901, through an inverter 910 to an OR circuit 911, and to an AND circuit 907. The line 623 is connected to the AND circuit 896 in FIG. 36, the OR circuit 898, and the AND circuit 900. The line 623 also is connected through an inverter 904 in FIG. 37 to the AND circuit 901 and through an inverter 909 to the AND circuit 907.

The output of the OR circuit 897 in FIG. 36 is connected to the AND circuit 886. The output of the AND circuit 899 is connected to the AND circuit 887, and the output of the AND circuit 900 is connected to the AND circuit 888. The output of the AND circuit 901 in FIG. 37 is connected to the AND circuit 889. The output of the AND circuit 907 is connected to the OR circuit 911. The output of the OR circuit 911 is connected to the AND circuit 906. The output of the AND circuit 906 is connected to the AND circuit 890. An AND circuit 928 is connected to a latch register 934, and the line 49 is connected from the latch register 934 to each of the AND circuits 886 through 891.

The outputs from the AND circuits 886 through 888 in FIG. 36 are connected through an OR circuit 918, a gate 922 and the line 148 to the three-fourths times divisor gates 670 through 677 in FIG. 29. The outputs from the AND circuits 889 through 891 in FIG. 37 are connected through an OR circuit 920, a gate 924 and the line 147 to the three-halves times divisor gates 680 through 687 in FIG. 33.

The line 142 is connected from the AND circuit 708 in FIG. 31 through an inverter 927 (FIG. 36) in the multiple selector to the AND circuit 928. The line 178 is connected to the AND circuit 928 from a negative AND circuit 988 in the termination control circuit shown within the dashed line box 168 in FIG. 35. The output of the AND circuit 928 is connected to the latch register 934 which is connected through an inverter 929 to a negative AND circuit 926. The output of the negative AND circuit 926 is connected through an inverter 930 to an OR circuit 931. The output of the OR circuit 931 is connected through the line 146 to the one times divisor gates 630 through 635 in FIG. 33. The negative AND circuit 926 in FIG. 36 serves to select the one times divisor gates by supplying a signal through the inverter 930 and the OR circuit 931 when neither the three-fourths times divisor nor the three-halves times divisor has been selected and the output of the latch register 934 is positive. The output of the AND circuit 928 is positive (and, therefore, the output of the latch register 934 is positive) unless a shift of greater than five is requested, or unless the shift requested is larger than the shift available and the dividend is true.

The line 180 is connected from an OR circuit 990 in the termination control circuit shown within the dashed line box 168 in FIG. 35 to the OR circuit 931 and an inverter 932 in the multiple selector in FIG. 36. The output of the inverter 932 is connected to the gates 922 and 924. Upon the occurrence of certain conditions, which will be described in greater detail subsequently, the line 180 supplies a signal through the OR circuit 931 to select the one-times divisor gates and through the inverter 932 to deselect the three-fourths times divisor gate 922 and the three-halves times divisor gate 924 in FIG. 36.

Figure 30:
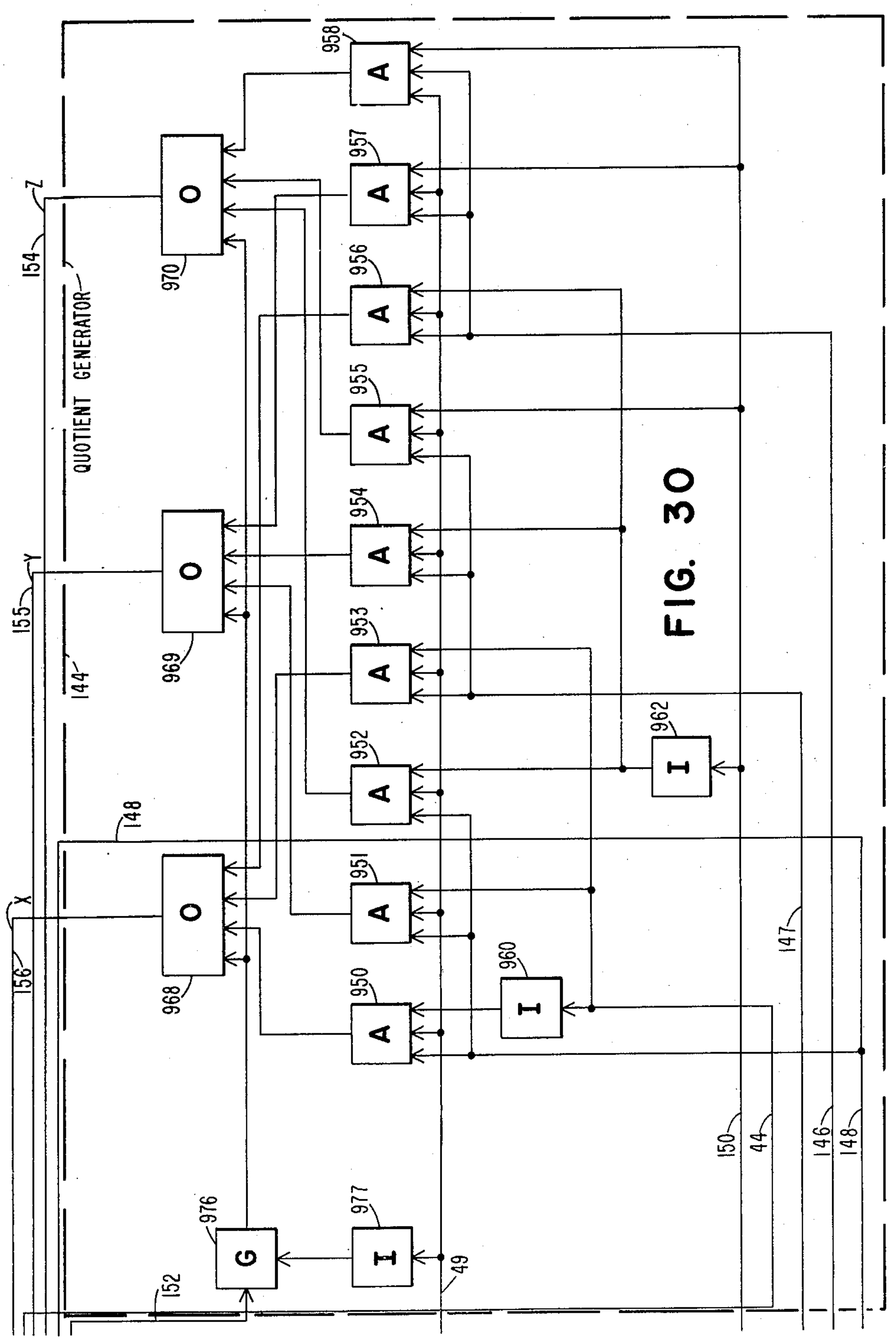

The quotient generator is shown within the dashed line box 144 in FIG. 30. This generator includes AND circuits 950 through 958. The true/complement line 44 is connected to the AND circuits 951 and 953, and through an inverter 960 to the AND circuit 950. The line 150 from the output of the adder 560 in FIG. 27 is connected to the AND circuits 955, 957 and 958, and through an inverter 962 to the AND circuits 952, 954 and 956. The select one times divisor line 146 is connected from the OR circuit 931 in FIG. 36 to the AND circuits 956 through 958. The select three-fourths times divisor line 148 is connected from the gate 922 in FIG. 36 to the AND circuits 950 through 952. The select three-halves times divisor line 147 is connected from the gate 924 in FIG. 36 to the AND circuits 953 through 955 in FIG. 30.

The line 49 is connected from the latch register 934 in FIG. 36 to each of the AND circuits 950 through 958. The line 49 supplies a positive signal when a shift of greater than five is requested. This line 49 is also connected to an inverter 977. The output of the inverter 977 is connected to a gate 976. The line 152 from the second dividend-quotient latch register 201 in FIG. 16 is connected to the gate 976. The output of the gate 976 is connected to OR circuits 968 through 970 in FIG. 30. This gate 976 supplies the bits being shifted across to the OR circuits 968 through 970 under certain conditions.

The outputs of the AND circuits 950, 953 and 956 are connected through the OR circuit 968 to the X quotient bit line 156. The outputs from the AND circuits 951, 954 and 957 are connected through the OR circuit 969 to the Y quotient bit line 155. The outputs from the AND circuits 952, 955 and 958 are connected through the OR circuit 970 to the Z quotient bit line 154. The output of the OR circuit 968 is connected through the line 156 to the gate 20 in FIG. 15. The output of the gate 20 in FIG. 15 is connected through the line 158 and the OR circuit 531 to the latch register 231 in FIG. 18. The output of the OR circuit 969 in FIG. 30 is connected through the line 155 and the OR circuit 532 to the latch register 232 in FIG. 19. The output of the OR circuit 970 in FIG. 30 is connected through the line 154 and the OR circuit 533 to the latch register 233.

The equality detector is shown within the dashed line box 164 in FIG. 35. This detector includes an OR circuit 992 and an inverter 993. The outputs of the adders 774 through 777 in the shift counter adder in FIG. 32 are connected to the OR circuit 992. The output of the OR circuit 992 is connected through the inverter 993 to the line 166. The line 166 is connected to an OR circuit 990 in the termination control circuit in FIG. 35. The equality detector 164 in FIG. 35 serves to provide a positive output on the line 166 when the shift requested is equal to the shift available, or when the shift requested is one less than the shift available.

The zero detector is shown within the dashed line box 170 in FIG. 35. This detector includes an OR circuit 996 connected to an inverter 997. The outputs from each of the shift counter latch registers 813 through 817 in FIG. 34 are connected to the OR circuit 996. The output of the inverter 997 is connected through the line 172 to an AND circuit 987 and an AND circuit 989 in the termination control circuit in FIG. 35. The zero detector supplies a positive output signal on the line 172 when the shift available is zero.

The termination control circuit is shown within the dashed line box 168 in FIG. 35. The line 166 from the equality detector is connected to the OR circuit 990 and the line 172 from the zero detector is connected to the AND circuits 987 and 989. The true/complement line 44 is connected to the AND circuit 989, and through an inverter 986 to the AND circuit 987 and the negative AND circuit 988. The output of the AND circuit 989 is connected to the line 182 which supplies a positive signal when the division is complete. The output of the AND circuit 987 is connected to the OR circuit 990. The output of the OR circuit 990 is connected through the line 180 to the OR circuit 931 and to the inverter 932 in the multiple selector in FIG. 36. The output of the AND circuit 987 also is connected through the line 176 to an inverter 238 in the dividend-quotient latch register 10 in FIG. 16. The inverter 238 is connected to the gate 236 in FIG. 16. The output of the negative AND circuit 988 in FIG. 35 is connected through the line 178 to the AND circuit 928 in FIG. 36.

The operation of the divider shown in detail in FIGS. 12 through 37 is the same as that described in connection with FIGS. 1 through 3. Initial data is supplied from a storage device (not shown) through the cable 22 in FIGS. 12 through 15 to the OR circuits 500 through 533. The dividend is supplied from the OR circuits 502 through 530 to the inputs of the individual latch registers 202 through 230 in FIGS. 16 through 19. Zeros are applied to the latch registers 200 and 201 if the dividend is true, and zeros are applied to the latch registers 231 through 233 (the generated quotient bit positions). This data is gated into these latch registers upon the occurrence of latch control signals on the lines 136*a* and 137*a*. When the latch control signals are applied, the data present at the inputs of the individual latch registers is gated into these latch registers, and when the latch control signals are removed, this data appears on the respective output lines 240, 152 and 242 through 273 of the individual latch registers. The latch register 234 in FIG. 19 is operated in the same manner and at the same time as the latch registers 231 through 233, but this particular latch register is employed to store only a signal indicating when the three-fourth times divisor is used. The purpose of this operation will be described in greater detail subsequently. A latch control signal is applied through the line 136 to the individual latch registers 200 through 209 in FIG. 16, and through the gate 236 and the line 136*a* to the latch registers 231 through 234. A latch control signal is supplied through the line 136, the gate 235 and the line 137*a* to the latch registers 210 through 230. The latch control signals applied to the line 136 in FIG. 16 are applied periodically throughout a divide operation to control the cycles of operation.

In a like manner, a divisor is supplied from a storage device (not shown) through the cable 60 in FIG. 29 to the divisor latch register 610 through 615. A latch control signal is supplied to these registers through the line 64 to gate the divisor into these registers. When the latch control signal on the line 64 is removed, the divisor is gated to the output lines 620 through 625 in FIG. 29, and the divisor is available on these output lines throughout a divide operation.

Information indicating an initial shift of zero is supplied from a storage device (not shown) through the cable 98 in FIG. 32 and the OR circuits 743 through 748 to the respective shift control latch registers 753 through 758. This initial shift is zero, and a positive signal entered into the latch register 758 and negative signals are entered into the latch registers 753 through 757 upon the occurrence of the latch control signal on the line 136. When this latch control signal is removed, a positive signal indicating a shift of zero is to be made is available at the output of the latch register 758.

The example which will be used in the detailed description of FIGS. 12 through 37 is the same example for the description of FIGS. 1 through 3, and this example is shown in the table in FIG. 11. Since twenty-three shifts will be made during the divide operation, this information is supplied from a storage device (not shown) through the cable 126 in FIG. 34 and through the OR circuits 803 through 807 to the shift counter latch registers 813 through 817. A positive signal is applied to the latch registers 813, 814, 815 and 817, and a negative signal is applied to the latch register 816. This information is stored in the latch registers 813 through 817 upon the occurrence of the latch control signal applied through the line 136.

During entry of the dividend, divisor, etc., into the divider, negative inhibit signals are applied to the gates 580 through 589 in FIG. 28 and the gates 793 through 797 in FIG. 35. The operation of these gates is inhibited to prevent them from supplying data to latch registers which are receiving the initial data from storage. A positive signal is applied through the line 764 in FIG. 32 to the adders 773, 776 and 777 to set these adders. This positive level is maintained throughout a divide operation, and provides a one input into the adders 773, 776 and 777.

When the first latch control signal is removed from the lines 136, and 64, the information stored in each of the latch registers in the divider when the latch control signals were applied now appears at the outputs of the latch registers. In the shift control latch register shown within the dashed line box 102 in FIG. 32, the latch register 758 supplies a positive signal to the line 104*f* since an initial shift of zero was stored in the shift control latch register. This positive signal is applied through the line 104*f* and the cable 104 to the shift zero gates 480 through 489 in FIG. 26. This positive level conditions the zero gates 480 through 489. These gates 480 through 489 pass the ten bits stored in the latch registers 200 through 209 in FIG. 16. These ten bits are applied through the cable 38*f* to the respective OR circuits 490 through 499 in FIGS. 24 and 25. These bits are applied from the OR circuits 490 through 499 through the respective lines 550 through 559 to the adders 560 through 569, respectively, in FIG. 27.

As shown in the left-hand column in the table shown in FIG. 11 the three-fourth times divisor is used in the first cycle. The multiple selector shown within the dashed line box 140 in FIGS. 36 and 37 makes the selection of the three-fourths times divisor by sensing certain dividend bits and certain divisor bits. The input lines 552, 553 and 554 to the multiple selector supply the respective N, O and P bits 101 (row 2, columns 3 through 5 of FIG. 11). A one is indicated by a positive level and a zero is indicated by a negative level. The input lines 621, 622 and 623 to the multiple selector supply the B, C and D divisor bits 101 (the three bits next to the high order bit of the one times true divisor).

The multiple selector 140 in FIGS. 36 and 37 is a decoder which operates to provide the decoding indicated by the heavy lines in the table in FIG. 9. The following is the mathematical basis for the decoding of the multiple selector:

The high order divisor bits=A B C D . . .
The high order dividend bits after shift=N O P Q . . .

$G = B \vee C\,D$
$H = B\,C \vee B\,D = B\,(C \vee D)$
$J = B\,C\,D$
$K = \overline{B}\,\overline{C}\,\overline{D}$
$L = \overline{B}\,\overline{C} \vee \overline{B}\,C\,\overline{D} = \overline{B}\,(\overline{C} \vee C\,\overline{D})$
$M = \overline{B}$ Use the three-fourths times divisor multiple if $$[(N\,\overline{O}\,\overline{P}) \vee (\overline{N}\,O\,P)]\,G \vee [(N\,\overline{O}\,P) \vee (\overline{N}\,O\,\overline{P})]\,H \vee [(N\,O\,\overline{P}) \vee (\overline{N}\,\overline{O}\,P)]\,J$$

Use the three-halves times divisor multiple if $$[(N\,\overline{O}\,P) \vee (\overline{N}\,O\,\overline{P})]\,K \vee [(N\,O\,\overline{P}) \vee (\overline{N}\,\overline{O}\,P)]\,L \vee [(N\,O\,P) \vee (\overline{N}\,\overline{O}\,\overline{P})]\,M$$

Use the one time divisor multiple if neither of the above conditions obtains.

The N, O, and P inputs to the multiple selector in FIGS. 36 and 37 are the respective lines 552, 553 and 554. The B, C and D inputs to the multiple selector are the respective lines 621, 622 and 623. As noted above, in the first cycle of operation, the N, O and P bits are respectively 101, and the B, C and D bits are respectively 101. A positive signal is applied from the line 552 (the N bit) to the AND circuit 842 in FIG. 36. A negative signal is applied from the line 553 (the O bit) to the inverter 859, and this inverter supplies a positive signal to the AND circuit 842. The line 554 (the P bit) supplies a positive signal to the AND circuit 842. This AND circuit 842 supplies a positive signal through the OR circuit 877 to the AND circuit 887. The line 621 (the B bit) supplies a positive signal to the AND circuit 899 in FIG. 36. The line 623 (the D bit) supplies a positive signal through the OR circuit 898 to the AND circuit 899. The AND circuit 899 supplies a positive signal to the AND circuit 887. At this time the line 49 supplies a positive signal from the latch register 934 to the AND circuit 887. The AND circuit 887 supplies a positive signal through the OR circuit 918 to the gate 922. At this time this gate 922 is conditioned, and it passes a positive signal through the line 148 to select the three-fourths times divisor gates 670 through 677 in FIG. 29.

The one times divisor is applied from the latch registers 610 through 615 in FIG. 29 to the respective divisor adders 660 through 665. These adders also receive a one-half times divisor since the one-times divisor is applied from the latch registers 610 through 615 to the respective adders 661 through 666. These adders 660 through 666 serve to add the one times divisor with the one-half times divisor to provide the three-halves times divisor on their output lines 660 through 667. Hence, the three-halves times divisor is applied to the three-fourths times divisor gates 670 through 677 in FIG. 29. The three-halves times divisor also is applied to the three-halves divisor gates 680 through 687 in FIG. 33, but these gates are not conditioned at this time. Although the three-halves times divisor is applied to both the three-fourths times divisor gates and the three-halves times divisor gates, the OR circuits 640 through 646 in FIG. 28 and the exclusive OR circuits 651 through 659 serve to shift the outputs of the three-fourths times divisor gates with respect to the outputs of the three-halves times divisor gates.

Since the three-fourths times divisor gates 670 through 677 are conditioned by the line 148, the gates 670 through 676 provide output signals through the respective OR circuits 640 through 646 in FIG. 28 to the respective exclusive OR circuits 652 through 658, and the gate 677 provides a signal to the exclusive OR circuit 659. Since the initial dividend is true as indicated by the zero in row 1, column 1 of FIG. 11, the complement of the divisor will be used. The true/complement line 44 supplies a positive signal through the gate 45 in FIG. 28 and the line 47 to each of the exclusive OR circuits 651 through 659. These exclusive OR circuits 651 through 659 provide at their outputs the one's complement of the divisor applied to their inputs (the three-fourths times divisor at this time) when the line 47 is positive. The outputs of the exclusive OR circuits 652 through 659 are applied to the respective adders 562 through 569 in FIG. 27. The exclusive OR circuit 651 in FIG. 28 receives a zero input from the three-halves times divisor gate 680 in FIG. 33 since this gate is deconditioned, and this exclusive OR circuit provides a one (or positive) output to the adder 561 in FIG. 27. The line 47 in FIG. 28 supplies a positive signal to the adder 560 in FIG. 27. This line 47 also supplies a positive signal to the adder 569 in FIG. 27 to force a one into this adder. Hence, the adders receive as inputs a portion of the dividend (along with the indication that it is true), the one's complement of the three-fourths times divisor (along with the indication that it is complement) plus a one. The one's complement of a number plus a one gives the two's complement of the number. Therefore, the adders 560 through 569 effectively add a portion of the dividend with the two's complement of the three-fourths times divisor at this time.

The outputs of the adders 560 through 569 are applied through the respective gates 580 through 589 in FIG. 28, the respective lines 590 through 599 and the cable 54 to the respective OR circuits 500 through 509 in FIG. 12. The outputs of the OR circuits 500 through 509 are applied to the inputs of the respective latch registers 200 through 209 in FIG. 16. Upon the occurrence of the next latch control signal on the line 136 (at the end of the present first cycle) the result of the addition will be entered into the latch registers 200 through 209, and when this latch control signal terminates, this result will be available at the outputs of the latch registers 200 through 209. This result in the first cycle is shown in row 4, columns 1 through 10 in the table in FIG. 11. The bits shown in columns 1 and 2 actually are not dividend bits but are the true/complement bit and the overflow bit, respectively.

The output of the adder 560 in FIG. 27 is applied to each of the exclusive OR circuits 572 through 577. In the first cycle shown in FIG. 11 this output is a zero and, therefore, a negative signal is applied through the line 150 to the exclusive OR circuits 572 through 577. The outputs of the adders 562 through 567 are applied to the respective exclusive OR circuits 572 through 577. In this case, the exclusive OR circuits 572 through 577 provide the same information at their outputs as is applied to their inputs since the line 150 is negative. If the output of the adder 560 had been a one (positive), the exclusive OR circuits 572 through 577 would provide the complement of the information applied to their inputs. The three adjacent zeros in row 4, columns 3 through 5 in FIG. 11 indicate that the shift to be made (in the next cycle) is a shift of three. The shift decoder shown within the dashed line box 58 in FIGS. 27, 31 and 34 decodes the result from the adders 560 and 562 through 567 to provide a signal indicating the shift to be made.

At this time, the outputs of the exclusive OR circuits 572 through 577 in FIG. 27 are respectively 000111. These outputs are applied directly to the AND circuits 703 through 708 in FIG. 31 and through the inverters 712 through 717 to these AND circuits. A positive signal is applied through the line 118 to each of the AND circuits 703 through 708. A negative signal (a zero) is applied from the exclusive OR circuits 573 and 574 in FIG. 27 to the AND circuits 703 and 704, respectively, in FIG. 31. Negative signals are applied to the inverters 712 through 714, and positive signals are applied to the inverters 715 through 717. The inverter 714 supplies a positive signal to the AND circuit 705. The inverters 712 and 713 also supply positive signals to the AND circuit 705. A positive signal is applied from the exclusive OR circuit 575 in FIG. 27 to the AND circuit 705. Hence, all of the inputs to the AND circuit 705 are positive and, therefore, this AND circuit provides a positive output which indicates a shift of three. The inverter 715 supplies a negative signal to each of the AND circuits 706 through 708. Hence, only the AND circuit 705 receives all positive inputs.

The shift three request from the AND circuit 705 is applied through the OR circuit 725 in FIG. 31, the line 735 and the OR circuit 745 in FIG. 32 to the latch register 755. Upon the occurrence of the next latch control signal on the line 136, the shift three request (a positive signal) is gated into the latch register 755 in FIG. 32. Upon the termination of this latch control signal, the shift three request is available at the output of the latch register 755.

The output of the AND circuit 705 in FIG. 31 also is applied through the OR circuit 762 in FIG. 32 to the adder 775. The AND circuits 703, 704 and 706 through 708 in FIG. 31 supply negative signals through the OR circuits 760 and 761 in FIG. 32 to the adders 773 and 774. The line 764 supplies a positive level to the adders 773, 776 and 777.

Since a total shift count of twenty-three was stored in the shift counter latch registers 813 through 817 in FIG. 34, the latch registers 813, 814, 815 and 817 supply positive inputs to the respective adders 773, 774, 775 and 777 in FIG. 32. The latch register 816 in FIG. 34 supplies a negative input to the adder 776 in FIG. 32. The adders 773 through 777 in the shift counter adder in FIG. 32 serve to subtract the shift requested from the shift available, and to provide the result (which is the remaining shift available) back to the shift counter latch registers 813 through 817 in FIG. 34.

The adder 773 in FIG. 32 receives positive inputs through lines 764 and 823 and a negative input from the OR circuit 760. This adder 773 supplies a negative output to the gate 793 in FIG. 35, and a positive carry to the adder 774 in FIG. 32. The adder 774 receives the positive carry from the adder 773, a positive input from the line 824 and a negative input from the OR circuit 761. This adder 774 provides a negative output to the gate 794 in FIG. 35 and a positive carry to the adder 775. The adder 775 receives the positive carry from the adder 774, a positive input from the line 825 and a positive input from the OR circuit 762. The adder 775 provides a positive output to the gate 795 in FIG. 35 and a positive carry to the adder 776. The adder 776 receives two positive inputs and one negative input, and provides a negative output to the gate 796 in FIG. 35 and a positive carry to the adder 777. The adder 777 receives three positive inputs, and provides a positive output to the gate 797 in FIG. 35 and a positive carry on the line 118. The line 118 is positive unless the shift requested becomes larger than the shift available. This line 118 supplies a positive signal to the AND circuit 798 in FIG. 35. The line 120 normally supplies a positive signal to the AND circuit 798. The line 120 is made negative only when initially entering the shift count into the shift counter latch register from storage.

The outputs of the adders 773 through 777 in FIG. 32 are applied through the respective gates 793 through 797 and the respective OR circuits 803 through 807 in FIG. 34 to the latch registers 813 through 817, respectively. The inputs to the latch registers 813 through 817 are respectively – – 1 – 1 (00101 which is the decimal number 20). Hence, the remaining shift available is twenty, and this information will be entered into the latch registers 813 through 817 upon the occurrence of the next latch control signal on the line 136. When this latch control signal terminates, this information is available at the outputs of latch registers 813 through 817.

The quotient generator in the dashed line block 144, FIG. 30, will supply certain X, Y and Z quotient bits as a result of the selection of multiple used and whether the dividend was true or complement. Line 148 which is used to select the three-fourth times divisor multiple will apply a positive signal to AND circuits 950 through 952. The latch register 934, FIG. 36, will supply a positive signal through the line 49 to AND circuits 950 through 952. The dividend is true, so line 44, the true/complement line, will supply a positive signal to AND circuits 951 and 952 and to inverter 960. The inverter 960 will supply a negative signal to AND circuit 950. Hence all inputs to AND circuits 951 and 952 are positive, but there is a negative input to AND circuit 950. The line 147, which would select the three halves times divisor applies a negative signal to AND circuits 953 through 955. The line 146, which would select the one times divisor supplies a negative signal to AND circuits 956 through 958. Hence, the outputs of AND circuits 951 and 952 are positive, and the outputs of AND circuits 950 and 953 through 958 are negative. The line 49 is applied through inverter 977 to gate 976, making the output of gate 976 negative. The inputs to OR circuit 968 are all negative; therefore, OR circuit 968 supplies a negative (zero) quotient bit to the line 156. The AND circuits 951 and 952 supply positive inputs to OR circuits 969 and 970 respectively. Therefore, OR circuits 969 and 970 supply positive signals (ones) to the respective Y and Z quotient bit lines 155 and 154.

The X quotient bit is applied through the line 156 to the gate 20 in FIG. 15. At this time the gate 20 is conditioned and it passes the X bit through the line 158 and the OR circuit 531 in FIG. 14 to the latch register 231 in FIG. 18. The Y and the Z quotient bits are applied through the respective lines 155 and 154 and the respective OR circuits 532 and 533 in FIG. 15 to the latch registers 232 and 233, respectively, in FIG. 19. The three-fourth times divisor line 148 supplies a positive signal to the latch register 234 in FIG. 19 to store the fact that the three-fourths times divisor was used. Upon the occurrence of a latch control signal on the line 136 through the gate 236 (FIG. 16) and the line 136*a*, the information present at the inputs of the latch registers 231 through 234 is gated into these latch registers. Upon the termination of this latch control signal, this information is available at the outputs of these registers.

The second cycle of operation of the divider begins when a latch control signal is applied to the line 136 in FIG. 16. When the latch control signal is applied to the line 136, the partial dividend appearing at the inputs of the latch registers 200 through 209 in FIG. 16 is gated into these latch registers, the X, Y and Z quotient bits are gated into the latch registers 231 through 233, the indication that the three-fourths times divisor was used is gated into the latch register 234, the shift three request is gated into the latch register 755 in FIG. 32 the previously indicated shift is made, and the remaining shift available is gated into the latch registers 813 through 817 in FIG. 34. When the latch control signal is removed from the line 136 the information applied to the inputs of the latch registers 200 through 209, 231 through 233, 234, 755 and 813 through 817 appears at their outputs.

The shift three request signal is applied from the latch register 755 in FIG. 32 through the line 104*c* and the cable 104 to condition the shift three gates 360, and 364 through 393 in FIGS. 20 through 23. The shift three gates 360 and 364 through 372 in FIGS. 20 and 21 gate the bits appearing at the outputs of the latch registers 200 and 204 through 212 in FIGS. 16 and 17 through the cable 38*c* to the OR circuits 490 through 499, respectively, in FIGS. 24 and 25. Upon the occurrence of the next latch control signal, the shift three gates 373 through 393 in FIGS. 21 through 23 gate the information appearing at the outputs of the respective latch registers 213 through 233 in FIGS. 17 through 19 through the cable 32*c* and through the respective OR circuits 510 through 530 in FIGS. 13 and 14 to the inputs of the latch registers 210 through 230, respectively, in FIGS. 17 and 18. At this time the latch control signal is present on the line 137*a*, and this signal gates the information into the latch registers 210 through 230. Upon the removal of the latch control signal on the line 137*a*, the information applied to the inputs of the latch registers 210 through 230 appears at their outputs.

As was discussed previously in connection with the description of FIGS. 1 through 3 and the Table I, since each of the X, Y and Z quotient bits generated when the three-fourths times divisor is used are definite bits, the Z bit must be shifted into the X bit position should the use of the three-fourths times divisor be followed by a shift of two. Assuming, for example, that a shift of two follows the first cycle shown in the table in FIG. 11, the latch register 234 in FIG. 19 supplies a positive signal through the line 26 to the AND circuit 355. This positive signal indicates that the three-fourths times divisor was used in the last cycle. When a shift of two occurs, the line 104*b* applies a positive input to the AND circuit 355 in FIG. 19. The AND circuit 355 supplies a positive signal to condition the gate 354. The gates 353 and 354 gate the Z bit, which was stored in the latch register 233 during the last cycle, through the line 36 and the OR circuit 531 in FIG. 14 to the input of the latch register 231 in FIG. 18. Since the quotient generator in FIG. 30 generates X, Y and Z bits each cycle, the generated X bit must not be entered into the latch register 231 in FIG. 18. The AND circuit 355 in FIG. 19 supplies a positive signal to the inverter 356. The inverter 356 supplies a negative signal through the line 33 to decondition the gate 20 in FIG. 15. Hence, the gate 20 in FIG. 15 will not pass a newly generated X quotient bit, and the X bit entered into the latch register 231 in FIG. 18 is the bit that is shifted from the latch register 233 in FIG. 19.

Only three quotient bits (X, Y and Z) are generated by the quotient generator in FIG. 30 during each cycle. However, in certain instances a shift of greater than three may occur which would leave certain of the latch registers in the dividend quotient latch register empty. In this case, the bits supplied to these latch registers are the same as the bits being shifted across. Assuming, a shift of four for example, the shift four gate 401 in FIG. 20 supplies the bit from the output of the latch register 201 in FIG. 16 (which bit is the same as those being shifted across) through the line 34*a* and the OR circuit 530 in FIG. 14 to the latch register 230 in FIG. 18. Should a shift of five occur, the shift five gate 441 in FIG. 20 applies the bit from the output of the latch register 201 in FIG. 16 through the line 34*b* and the OR circuits 529 and 530 in FIG. 14 to the respective latch registers 229 and 230 in FIG. 18.

The shifter 12 is capable of shifting only five bits at one time. A larger or a smaller shifter may be employed if desired. In some instances, a shift of greater than five occurs. In this case, a shift of five is made, no divisor is applied to the adders 560 through 569 and the quotient bits supplied by the quotient generator in FIG. 30 are the same as the bits shifted across. After the shift of five is made, the remaining shift is made in the normal manner.

When a shift of greater than five is indicated by the result of the addition by the adders 560 through 569 in FIG. 27, the AND circuit 708 in FIG. 31 supplies a positive output signal on the line 142. A shift of five is subtracted from the shift available in the shift counter adder shown within the dashed line box 112 in FIG. 32 in the normal manner. The line 142 supplies a positive signal to the inverter 927 in the multiple selector in FIG. 36. The inverter 927 supplies a negative signal to the AND circuit 928 and this signal is stored in the latch register 934. After a latch control signal is applied and removed from the latch register 934, this register supplies a negative signal to each of the AND circuits 886 through 891 in FIGS. 36 and 37 to prevent either the three-fourths times or the three-halves times divisor from being selected. The latch register 934 also supplies the negative signal to the inverter 929. The inverter 929 supplies a positive signal to the negative AND circuit 926 in FIG. 36. Since one of the inputs to the negative AND circuit 926 is positive, this AND circuit does not supply a negative output signal but supplies a positive output signal to the inverter 930. The inverter 930 supplies a negative signal through the OR circuit 931 and the line 146 to decondition the one times divisor gates 630 through 635 in FIG. 33. Negative signals are applied through the lines 147 and 148 to the respective three-halves times divisor gates and three-fourths times divisor gates. The latch register 934 in FIG. 36 also applies a negative signal through the line 49 to decondition the gate 45 in FIG. 28. The gate 45 applies negative signals through the line 47 to the adders 560 and 569 in FIG. 27 and to the exclusive OR circuits 651 through 659 in FIG. 28. Hence, the adders 560 through 569 receive only the partial dividened from the respective OR circuits 490 through 499 in FIGS. 24 and 25 when the shift of five is made.

The line 49 also supplies a negative signal to each of the AND circuits 950 through 958 in the quotient generator in FIG. 30. These AND circuits 950 through 958 apply negative signals (zeros) to the OR circuits 968 through 970. The line 49 supplies a negative signal through the inverter 977 to condition the gate 976. The line 152 is connected from the latch register 201 in FIG. 16 to the gate 976 to supply the bits being shifted across to that gate. The gate 976 supplies the bits being shifted across to each of the OR circuits 968 through 970 in the quotient generator. The bits being shifted across (all ones or all zeros) are applied through the OR circuits 968 through 970 to the respective X, Y and Z quotient bit lines 156, 155 and 154. These quotient bits are entered into the latch registers 231 through 233 in FIGS. 18 and 19 in the normal manner upon the occurence of a latch control signal on the line 136. The shift of five is made in the normal manner and the shift five gates 440, 441 and 446 through 454 supply the output from the respective latch registers 200, 201 and 206 through 214 to the OR circuits 490 through 499, respectively, in FIGS. 24 and 25. These bits are entered into the respective adders 560 through 569 in FIG. 27, and since all divisor gates are deconditioned as explained above, no divisor is applied to the adders 560 through 569. The operation of the divider continues in the normal manner and the remaining shift is made at the beginning of the next cycle. However, if the shift of greater than five discussed above had been greater than ten, for example, two consecutive shifts of five would be made followed by the remaining shift. When these shifts of five are made, the X, Y and Z quotient bits generated are the same as the bits being shifted across, and no divisor is entered into the adders 560 through 569 during these two cycles.

Referring again to the table shown in FIG. 11, the second cycle is commenced when a new portion of the dividend is applied to the adders 560 through 569. The one times divisor is used in the second cycle because the decoding circuits in the multiple selector indicate that neither the three-fourths times divisor nor the three-halves times divisor is to be used. The complement of the one times divisor is used because the partial dividend is true as indicated by the zero in row 6, column 1 in FIG. 11. The divider continues to operate in the manner described above. However, there are certain operations that must be performed upon termination. These operations were discussed in connection with the description of FIGS. 1 through 3, and they will be discussed further below.

At the last cycle of the division operation certain conditions are sensed by the termination control circuit shown within the dashed line box 168 in FIG. 35 and the quotient generator shown within the dashed line box 144 in FIG. 30 to terminate the division properly. If the dividend is true and the shift requested is larger than the shift available, the entry of a divisor is suppressed and the bits being shifted across are inserted into the X, the Y and the Z quotient bit positions in the same manner as when a shift greater than five is requested. The shift available is the shift that is made rather than the shift requested. The line 44 supplies a signal (positive) which indicates that the dividend is true to the inverter 986 in FIG. 35. The output of the inverter (a negative signal) is applied to the negative AND circuit 988. The line 118 from the adder 777 in FIG. 32 supplies a negative signal to the negative AND circuit 988 since the shift requested is larger than the shift available. The negative AND circuit 988 supplies a negative signal through the line 178 to the AND circuit 928 in FIG. 36. The latch register 934 supplies a negative output to each of the AND circuits 886 through 891 in FIGS. 36 and 37. These AND circuits 886 through 891 supply negative output signals and, therefore, neither the three-fourths times nor the three-halves times divisor is selected. The latch register 934 supplies the negative signal to the inverter 929 in FIG. 36. The inverter 929 supplies a positive signal to the negative AND circuit 926. The negative AND circuit 926 supplies a positive output to the inverter 930 which in turn supplies a negative output through the OR circuit 931 to the one times divisor gates 630 through 635 in FIG. 33 to decondition these gates. Hence, no divisor is selected. The output of the latch register 934 in FIG. 36 also is applied through the line 49 to decondition the gate 45 in FIG. 28. Hence, only zeros are applied from the exclusive OR circuits within the dashed line box 88 in FIG. 28 to the adders 560 through 569 in FIG. 27. The negative latch register 934 in FIG. 36 also supplies a negative signal through the line 49 to the inverter 977 in FIG. 30. The inverter 977 supplies a positive signal to the gate 976 to condition this gate to apply the bits being shifted across from the line 152 to the OR circuits 968 through 970 in the same manner as when a shift larger than five is requested.

If the dividend is complement and the shift allowed is zero, the zero shift is made, the true value of the one times divisor is added and no new X, Y and Z bits are entered into the dividend-quotient latch register since the bits already there in the X, Y and Z positions are correct. The line 44 supplies a signal through the inverter 986 in FIG. 35 to the AND circuit 987. The zero detector shown within the dashed line box 170 supplies a positive signal through the line 172 to the AND circuit 987. The output of the AND circuit 987 is applied through the OR circuit 990, the line 180, the OR circuit 931 and the line 146 to condition the one times divisor gates 630 through 635 in FIG. 33. The output of the OR circuit 990 also is applied through the inverter 932 in FIG. 36 to prevent the three-fourths times and the three-halves times divisors from being selected. The output of the AND circuit 987 in FIG. 35 also is applied through the line 176 to the inverter 238 in FIG. 16. The output of the inverter 238 is applied to the gate 236 to decondition this gate. With the gate 236 deconditioned, when the latch control signal is applied to the line 136, no latch control signal is applied through the line **136*a* to the latch registers 231 through 234** in FIGS. 18 and 19. This operation suppresses the entry of any new X, Y and Z quotient bits, and prevents the previously generated X, Y and Z quotient bits from being removed from these latch registers. The zero shift is made in the normal manner.

If the shift requested is equal to the shift available at termination, or if the shift available is one greater than the shift requested, the one times divisor multiple must be selected. The equality detector shown within the dashed line box 164 in FIG. 35 supplies a positive output signal under these conditions through the OR circuit 990, the line 180, the OR circuit 931 in FIG. 36, and the line 146 to condition the one times divisor gates 630 through 635 in FIG. 33. The output of the OR circuit 990 also is applied through the line 180 and the inverter 932 to decondition the three-halves times and the three-fourths times divisor gates 922 and 924 in FIG. 36.

If the dividend is true and the shift requested is equal to the shift available, the divider is operated in the normal manner. If the resulting adder output is in true form, division is complete when this output is entered into the latch registers 200 through 209 in FIG. 16. In this case, the line 44 supplies a positive signal to the AND circuit 989 in FIG. 35, and the zero detector supplies a positive signal through the line 172 to this AND circuit. The output of the AND circuit 989 is positive and is applied through the line 182 to indicate that the division operation is complete. If the resulting adder output is in complement form, one addition cycle is required to get the remainder into true form and this operation is controlled by the circuits discussed above which function when the dividend is complement and the shift allowed is zero.

If the dividend is complement and the shift requested is equal to or greater than the shift available, the allowed shift is made and division is continued in the normal manner. If the resulting remainder is in true form, the division is complete and the AND circuit 989 in FIG. 35 supplies a positive output. If the resulting remainder is in complement form, the resultant quotient is complete, but one additional cycle is required to get the remainder into true form. Under this latter condition, the circuits described above which function when the dividend is complement and the shift allowed is zero terminate the division.

If desired, the multiple selector in FIGS. 36 and 37 may be arranged to provide the optimum decoding indicated by the heavy stepped lines in FIG. 8 as explained previously. Also, simpler decoding than that employed in the present example (as indicated by the heavy lines in FIG. 9) may be utilized. The operation is not as efficient with simple decoding as it is with the decoding shown and described however. The multiple selector may be eliminated by employing double adders. In this case, one adder uses the one times multiple and the alternate adder uses the three-fourths or the three-halves times multiple. If the two high order bits of the true one times divisor are 11, the three-fourths times divisor is used in the alternate adder, or if these bits are 10 the three-halves times divisor is used in the alternate adder the output of the adder that results in the largest shift is used. The different efficiencies between the use of double adders, optimum decoding or four-way by sixteen-way decoding (FIG. 9) are shown in FIGS. 8 and 9.

A shifter capable of larger shifts also will increase efficiency. The Table II below approximately indicates the relative differences in efficiencies between the use of different length shifters, different decoding arrangements, and between the use of the three multiples versus the use of only the one times multiple.

TABLE II

*Average bits shifted across per cycle*

| Shifter Limit | 1X only | 1X, ¾X and 3/2X | | |
|---|---|---|---|---|
| | | Simple Decoding | Double Adders | Optimum Decoding |
| None | 2.66 | 3.59 | 3.75 | 3.82 |
| 8 | 2.64 | 3.54 | 3.59 | 3.76 |
| 6 | 2.54 | 3.40 | 3.54 | 3.60 |
| 5 | 2.54 | 3.37 | 3.51 | 3.58 |
| 4 | 2.39 | 2.98 | 3.08 | 3.03 |

The AND circuits, the OR circuits, the exclusive OR circuits, the gates and the inverter circuits employed in the illustrative dividers of the present invention may be any one of various suitable types, and a detailed consideration of them is not considered necessary since they are quite widely known.

FIG. 38*a* shows the block symbol of a latch register which is shown in detailed logic block form in FIG. 38*b*. Latch registers such as the one shown in FIG. 38*b* are utilized throughout the various figures, such as, the dividend-quotient latch register shown in detail in FIGS. 16 through 19. A latch register is a device having two inputs which are a gate signal input and a latch control input. The latch register accepts information at the time the latch control signal changes from a de-energized condition to an energized condition. The data signal input must maintain its desired condition for a small interval of time immediately preceding, during and following the application of the latch control signal, this interval of time being measurable in terms of circuit transit times. At all other times, regardless of whether the latch control signal is energized or de-energized, the output from the latch register is not controlled by the state of the data input signal which signal may be changed at will.

The latch register in 38*b* includes circuits 1010 through 1015 which constitute a first latch 1016, and circuits 1021 through 1025 which constitute a second latch 1026. By "latch" is meant a circuit having a control input and a data input, the output of which follows the data input when the control input is de-energized. The output remains constant at the state it had when the control input changed so long as the control input is energized regardless of any changes in the data input during this time. A latch register differs from a flip-flop since a flip-flop is a bistable device which, when set to one state, retains that state until set to the other state.

The two latch circuits 1016 and 1026 in FIG. 38*b* are connected in series; that is, the output of the first latch circuit 1016 is connected as the input to the second latch circuit 1026. The data input signal is applied to the first latch 1016 through a line 1007, and the latch control signal is applied to the latch circuit 1016 through an input line 1008. The output from the second latch circuit 1026 is taken through a line 1009. The latch control signals are connected in opposition; that is, when the first latch circuit 1016 is locked, the second latch circuit 1026 is free, and when the second latch circuit 1026 is locked, the first latch circuit 1016 is free.

The AND circuits 1014 and 1024, and the OR circuits 1011 through 1013 and 1021 through 1023 are assumed to be constructed with diodes, and the level setters 1010, 1015 and 1025 are constructed with transistors. The signal on the lower output of the level setters has the same polarity as the signal applied to the level setters and the polarity of the signal on the upper output is opposite to the polarity of the input signal. For example, if the input line A to the level setter 1010 in FIG. 38*b* is positive, the output line C is positive and the output line B is negative. For purposes of description, the transit time through one level setter is considered to represent one unit of time. The transit time through the AND and the OR circuits is assumed to be zero. The logic is assumed to be positive.

In order to illustrate the operation of the latch register 1006 shown in FIG. 38*b*, various points of the circuit are designated by various letters of the alphabet, and the signals at these points change their potential in a manner indicated in FIG. 39. FIG. 39 is a timing sequence diagram illustrating how the waveforms change at various points in the circuit of FIG. 38*b*. When he latch control signal on the line 1008 is positive, the first latch circuit 1016 is free and the second latch circuit 1026 is locked. The dashed arrows indicate circuit conditions when the latch control signal is positive. The point C is positive which causes the output of the OR circuit 1013 to be positive, thereby making U postive. This leaves points R and T to determine the condition of point H. Since B is negative (the opposite polarity of C), R is controlled only by G, and T is positive whenever G is positive. The potential of G is determined by the data input applied through the line 1007. Therefore, the potential at point H will follow the potential at point G and the potential at J will follow the potential at H, though the changes at J will lag one unit of time behind the corresponding change at H.

When the control signal at A is negative, the first latch circuit 1016 is locked and the second latch circuit 1026 is free. The solid arrows indicate circuit conditions when the control signal is negative. In this case, the condition of the signals at points J and K will not change even though the signals at G do change. Since the signal at B is positive in this case, the signal at R will remain positive. The signal at T will be positive if the signal at J is positive, though the signal at T will not be negative necessarily if G is negative. Since the signals at C is negative, the signal at U is controlled only by the condition of the signal at J. Therefore, if the signal at J is positive, it will be held positive by the feedback through the points U and T. If the signal at J is negative, there is no path by which the signal at G can bring the signal level at U positive.

In order to set a signal into the latch register, the data signal at G (input line 1007) must be held at its desired condition sufficiently long in advance of changing the singal at B and C for the signal at J to acquire the same condition as the signal at G, and the signal at G must maintain this condition until the switching of the signals at B and C is completed. The second latch circuit 1026 operates in the same manner as the first latch circuit 1016 except that the input to the former uses the signal level at K instead of the signal level at G, and the connections of the input lines of the level setter 1010 are reversed with respect to the OR circuit 1021 through 1023, i.e., the signals at B and C are inverted in the second latch circuit 1026 when compared with the first latch circuit 1016.

The sequence time chart in FIG. 39 illustrates that although the latch control signal locks the second latch circuit 1026 at the same time that it frees the first latch circuit 1016, the change in the output of the first latch circuit 1016 does not occur until one unit of time later. This operation allows sufficient time for the locking action of the second latch circuit 1026 to be completed. An overlap must be maintained here to assure reliable operation.

The use of the signal level at K as an input to the second latch circuit 1026 was selected to make the signal level at N, which has no other load on it, agree with the signal level at G. This also reduces the loading at the point J. However, if desired the signal level at J may be used at the input to the second latch circuit 1026 as well as for feedback. If this were done, the signal level at P would be set to agree with the signal level at G.

The level setters 1010, 1015 and 1025 illustrated in block form in FIG. 38*b* may be any one of various suitable types, and one suitable arrangement is illustrated in detail in FIG. 40. The level setter in FIG. 40 includes interconnected transistors 1031 and 1032. When a signal of one polarity is applied to input line 1033, a signal of the same polarity appears on an output line 1034. The output line 1035 has a signal of a polarity which is opposite to the polarity of the signal on the output line 1034.

In operation, a positive signal applied to the input line 1033 causes the transistor 1031 to be conductive and the transistor 1032 to be nonconductive. Accordingly, the potential on the output line 1034 approaches a value toward positive 6 volts. When a signal level of approximately zero volts is applied to the input terminal 1033, the transistor 1031 is rendered nonconductive and the transistor 1032 becomes conductive. Consequently, the potential on the output line 1034 approaches ground for the zero level. A zero level is more negative than the positive 6 volt level, and the zero level accordingly is referred to as a down or negative level.

The level setter in FIG. 40 serves to accept signal levels on the input line 1033 which signals vary within limits around plus 6 volts or zero volts, and provides output signals on the output line 1034 which are fixed in amplitude within certain precise limits. When the signal on the output line 1034 is 6 volts positive, a signal on the output line 1035 is approximately zero volts. When the signal on the output line 1034 is approximately zero volts, the signal on the output line 1035 is approximately 6 volts positive.

The adder circuit employed within the dividers of the present invention may be any one of many suitable types. One suitable adder circuit 1040 is illustrated in FIG. 41. This adder circuit includes exclusive OR circuits 1041 and 1042, circuits 1043 and 1044, and an OR circuit 1045 connected as shown. Three binary inputs to the adder in FIG. 41 are labeled $A_m$, $B_m$, and $C_m$. The outputs, which represent a sum and a carry from the addition of the quantity $A_m$, $B_m$, and $C_m$ are designated $S_m$ and $R_m$. A positive signal on the input lines represents a binary one and a negative signal represents a binary zero. A positive signal on the input lines $S_m$ represents a sum of one, and a positive signal on the output line $R_m$ represents a carry of one.

Whenever the $A_m$ and the $B_m$ inputs are unlike, the exclusive OR circuit 1041 supplies a positive signal to the exclusive OR circuit 1042. Whenever the signal supplied by the exlusive OR circuit 1041 to the exclusive OR circuit 1042 is unlike $C_m$, a positive signal is supplied on the output line $S_m$ and this positive signal represents a binary sum of one. For all other conditions the output signal on the line $S_m$ is a negative signal representing a binary sum of zero.

The exclusive OR circuit 1041 supplies a signal to the AND circuit 1043, and the input line $C_n$ supplies a signal to the AND circuit 1043. Whenever both of these lines are positive, the AND circuit 1043 provides a positive signal through the OR circuit 1045 to the output line $R_n$. A positive signal on the line $R_n$ represents a carry of one. The lines $A_n$ and $B_n$ are connected to the AND circuit 1044 which in turn is connected through the OR circuit 1045 to the output line $R_n$. Whenever both the $A_n$ and the $B_n$ inputs are positive, the output line $R_n$ is rendered positive, thereby indicating a carry of one. When neither of the AND circuit 1043 nor the AND circuit 1044 provide a positive signal to the OR circuit 1045, a negative signal appears on the output line $R_n$ representing a carry of zero. Accordingly, the adder circuit 1040 in FIG. 41 responds to signals on the input lines $A_n$, $B_n$ and $C_n$ and provides signals on the output lines $S_n$ and $R_n$ representative of a sum and a carry, respectively.

It now should be apparent that the present invention provides a divider which, through the selection of multiples of one times, three-fourth times or three-halves times the divisor, affects the distribution of the dividend bits in a manner such that certain variable length groups of dividend bits may be skipped. By skipping dividend bits the number of add cycles necessary to complete a division problem is reduced. Since the speed of division generally is proportional to the number of addition steps necessary to complete the division, the present divider operates at substantially higher speeds than dividers heretofore.

While the invention has been particularly shown and described with reference to a preferred embodiment thereof, it will be understood by those skilled in the art that various changes in form and details may be made therein without departing from the spirit and scope of the invention.

What is claimed is:

1. A binary divider circuit including a dividend storage register, an arithmetic device, means coupling the dividend storage register to said arithmetic device, first means responsive to signals representative of a divisor which provides signals representative of three-fourths times the divisor, one times the divisor, and three-halves times the divisor, second means selectively coupling one of the quantities three-fourths time the division, one times the divisor, and three-halves times the divisor from said first means to said arithmetic device, said arithmetic device being operated in successive cycles to provide the next partial dividend, second means coupled at least to the dividend storage register for shifting the conten thereof in N places each cycle and for determining N quotient bits, where N is any integer, third means for indicating intially the number of quotient bits to be developed, and thereafter indicating in each cycle the remaining number of quotient bits to be developed, fourth means responsive to the remaining number of quotient bits of the third means and the number of shifts N for each cycle of said second means for indicating when the last cycle of operation is ready to take place, and fifth means coupled to the fourth means which is operated in the last cycle of operation to develop the correct number of remaining quotient bits and to put the final remainder in correct form including the use of an extra cycle of operation for complementing if necessary.

2. A divider including a dividend register for storing signals representing a dividend or a partial dividend having a plurality of orders, first means responsive to signals representing a divisor having a plurality of orders for providing signals representing the quantities of three-fourths times the divisor, one times the divisor and three-halves times the divisor where each quantity has a plurality of orders, an arithmetic device, means coupling the dividend from said dividend register to said arithmetic device, second means coupling a selected on of the quantities of three-fourths times the divisor, one times the divisor and three-halves times the divisor from said first means to said arithmetic device, said arithmetic device being operated in successive cycles for finding the difference between the dividend and a selected one of the quantities of three-fourths times the divisor, one times the divisor and three-halves times the divisor during each cycle, third means coupled to the dividend register for selectively shifting the content thereof, said divider including further means to operate said third means to shift the content of the dividend register as many orders as there are N successive like digits of a given type in a string in the high order of a partial dividend and provide N quotient, where is any integer, first control means for indicating initially the number of quotient bits to be developed and thereafter indicating in each cycle the remaining number of quotient bits to be developed, second control means responsive to the remaining number of quotient bits of the first control means and the number of shifts N of the further means for indicating when the last cycle of operation is ready to take place, and termination control means coupled to the second control means which is operated in the last cycle of operation to develop the correct number of remaining quotient bits and put the final remainder in proper form including the use of an extra cycle of operation for complementing if necessary.

3. A divider including a dividend register for storing signals representing a dividend or a partial dividend having a plurality of orders, a divisor register for storing signals representing a divisor having a plurality of orders, first means coupled to the divisor register for providing signals representing three-fourths times the divisor and three-halves times the divisor, an arithmetic device, second means coupled to said divisor register and said first means for selectively supplying to said arithmetic device signals representing the divisor, three-fourths times the divisor and three-halves times the divisor, said arithmetic device being operated in successive cycles for finding the difference between a partial dividend and a selected one of the quantities of the divisor, three-fourths times the divisor and three-halves times the divisor during each cycle, third means coupled to the dividend register for selectively shifting the content thereof, fourth means including a decoder coupled to said third means for operating said third means to shift the content of the dividend register as many orders as there are successive like digits of a given type in the high orders of a partial dividend, and means for providing quotient digits including a first circuit coupled to the high orders of the dividend register for providing $N-3$ quotient digits during a cycle of operation of said arithmetic device whenever a string of N successive like digits of a given type are in the high orders of a partial dividend, where N is any integer equal to or greater than three, and a second circuit responsive at least to the result in the arithmetic device for providing three quotient digits for each cycle of operation of said arithmetic device.

4. A divider including first means for storing and shift-signals representing a dividend or a partial dividend having a plurality of orders, second means responsive to signals representing a divisor having a plurality of orders for providing signals representing the quantities of three-fourths times the divisor, one times the divisor and three-halves times the divisor where each quantity has a plurality of orders, an arithmetic device, means coupling the dividend from said dividend register to said arithmetic device, third means coupling a selected one of the quantities of three-fourths times the divisor, one times the divisor and three-halves times the divisor from said first means to said arithmetic device, said arithmetic device being operated in successive cycles for finding the difference between the dividend and a selected one of the quantities of three-fourths times the divisor, one times the divisor and three-halves times the divisor during each cycle, and fourth means coupled to said first means and said second means for providing a plurality of quotient orders during an arithmetic cycle, first control means for indicating initially the number of quotient bits to be developed and thereafter indicating in each cycle the remaining number of quotient bits to be developed, second control means responsive to the remaining number of quotient bits of the first control means and the number of shifts for each cycle of said first means for indicating when the last cycle of operation is ready to take place, and termination control means coupled to the second control means which is operative in the last cycle of operation to develop the correct number of remaining quotient bits and to put the final remainder in proper form including the use of an extra cycle of operation of complementing if necessary.

5. A binary divider circuit including a dividend storage register, an arithmetic device coupled to the dividend storage register, first means for providing signals representative of three-fourths times the divisor, one times the divisor and three-halves times the divisor, second means means coupling a selected one of the quantities three-fourths times the divisor, one times the divisor, and three-halves times the divisor from said first means to said arithmetic device, said arithmetic device being operated in successive cycles to find the difference between the dividend and one of the quantities three-fourth times the divisor one times the divisor and three-halves times the divisor, and means for providing N quotient bits including first circuit means coupled to the divided storage register for providing $N-3$ quotient bits where N is any integer and second circuit means coupled to at least the arithmetic device and the second means for providing three quotient bits.

6. A divider including a dividend register for storing signals representing a dividend or a partial dividend having a plurality of orders, first means for providing signals representing three-fourths times the divisor, one times the divisor and three-halves times the divisor, an arithmetic device, second means coupling said first means means to said arithmetic device for selectively supplying to said arithmetic device signals representing three-fourths times the divisor, one times the divisor and three-halves times the divisor, said arithmetic device being operated in successive cycles for finding the difference between the dividend and a selected one of the quantities three-fourths times the divisor, one times the divisor and three-halves times the divisor during each cycle, third means coupled to the dividend register for selectively shifting the content thereof, fourth means including a decoder coupled to said third means for operating said third means to shift the content of the dividend register as many orders as there are successive like digits of a given type in a string in the high orders of a partial dividend, and means for providing a quotient including a first circuit coupled to the high orders of the dividend register for providing $N-3$ quotient digits whenever a string of $N$ successive like digits of a given type are in the high orders of the partial dividend where N is any integer equal to or greater than three and a second circuit coupled to the second means and the arithmetic device for providing three quotient digits.

References Cited by the Examiner

UNITED STATES PATENTS

| | | | |
|---|---|---|---|
| 2,651,458 | 9/53 | Bennett et al. | 235—157 |
| 2,901,166 | 8/59 | Hamilton et al. | 235—157 |
| 2,914,248 | 11/59 | Ross et al. | 235—157 |
| 3,023,961 | 3/62 | Stafford et al. | 235—164 |

OTHER REFERENCES

Pages 67–91, January 1961—"High-Speed Arithmetic in Binary Computers," MacSorley, Proceedings of the IRE.

Pages 48–64, December 1959—"The Engineering Design of the Stretch Computer," Bloch Proceedings of the Eastern Joint Computer Conference.

MALCOLM A. MORRISON, *Primary Examiner.*

WALTER W. BURNS, Jr., *Examiner.*